(12) United States Patent
Kawabe et al.

(10) Patent No.: US 8,246,880 B2
(45) Date of Patent: Aug. 21, 2012

(54) METHOD OF PRODUCING CELLULOSE ESTER FILM, CELLULOSE ESTER FILM, POLARIZING PLATE AND LIQUID CRYSTAL DISPLAY

(75) Inventors: Satomi Kawabe, Tokyo (JP); Kazuto Kiyohara, Tokyo (JP); Kunio Shimizu, Yamanashi (JP); Isamu Michihata, Toyama (JP); Akihiko Takeda, Kanagawa (JP); Kazuaki Nakamura, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 1175 days.

(21) Appl. No.: 12/089,153

(22) PCT Filed: Sep. 29, 2006

(86) PCT No.: PCT/JP2006/319445
§ 371 (c)(1),
(2), (4) Date: Apr. 3, 2008

(87) PCT Pub. No.: WO2007/043358
PCT Pub. Date: Apr. 19, 2007

(65) Prior Publication Data
US 2010/0151156 A1  Jun. 17, 2010

(30) Foreign Application Priority Data
Oct. 7, 2005  (JP) .................... 2005-294736

(51) Int. Cl.
*B29C 39/38*  (2006.01)
(52) U.S. Cl. .................... 264/217; 264/299
(58) Field of Classification Search .......... 264/217, 264/299
See application file for complete search history.

(56) References Cited

U.S. PATENT DOCUMENTS

| | | | |
|---|---|---|---|
| 5,516,920 A * | 5/1996 | Nesvadba et al. | 549/307 |
| 5,594,068 A * | 1/1997 | Buchanan et al. | 525/54.3 |
| 6,740,254 B2 * | 5/2004 | Zhou et al. | 252/182.24 |

(Continued)

FOREIGN PATENT DOCUMENTS
JP  5197073  8/1993
(Continued)

OTHER PUBLICATIONS

Derwent abstract JP2003-113317A, 2003.*

*Primary Examiner* — Christina Johnson
*Assistant Examiner* — Xue Liu
(74) *Attorney, Agent, or Firm* — Lucas & Mercanti, LLP

(57) ABSTRACT

Disclosed is a method for producing a cellulose ester film wherein a film-forming material containing the following components A-C is heated and melted, and a cellulose ester film is formed therefrom by melt-casting. A: a cellulose resin, B: an ester compound obtained by condensing an organic acid represented by Formula (1) and a polyalcohol, and C: an aliphatic polyester or an aliphatic-aromatic copolymer.

Formula (1)

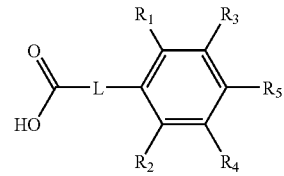

14 Claims, 5 Drawing Sheets

U.S. PATENT DOCUMENTS

| | | | |
|---|---|---|---|
| 2002/0045015 A1* | 4/2002 | Ito | 428/1.2 |
| 2003/0037703 A1* | 2/2003 | Saito | 106/169.33 |
| 2004/0161551 A1* | 8/2004 | Tasaka et al. | 428/1.3 |
| 2005/0112299 A1* | 5/2005 | Shimizu et al. | 428/1.31 |

FOREIGN PATENT DOCUMENTS

| | | |
|---|---|---|
| JP | 6501040 | 1/1994 |
| JP | 8510782 | 11/1996 |
| JP | 11124445 | 5/1999 |
| JP | 11246704 | 9/1999 |
| JP | 11349537 | 12/1999 |
| JP | 2000063560 | 2/2000 |
| JP | 2000352620 | 12/2000 |
| JP | 2001122979 | 5/2001 |
| JP | 2002022956 | 1/2002 |
| JP | 2002267846 | 9/2002 |
| JP | 200312823 | 1/2003 |
| JP | 2003113317 A * | 4/2003 |
| JP | 2004175971 | 6/2004 |
| JP | 2004175972 | 6/2004 |
| JP | 2004177459 | 12/2004 |
| JP | 200554100 | 3/2005 |
| JP | 2005134609 | 5/2005 |

\* cited by examiner

METHOD OF PRODUCING CELLULOSE ESTER FILM, CELLULOSE ESTER FILM, POLARIZING PLATE AND LIQUID CRYSTAL DISPLAY

This is a U.S. National Phase Application under 35 U.S.C. 371 of International Application PCT/JP2006/319445, filed on Sep. 29, 2006, which claims the priority of Japanese Application No. 2005-294736, filed Jul. 10, 2005, the entire content of both Applications are hereby incorporated by reference.

FIELD OF THE INVENTION

The present invention relates to a method of producing a cellulose ester film, a cellulose ester film, and a polarizing plate and a liquid crystal display employing the cellulose ester film.

BACKGROUND OF THE INVENTION

Cellulose ester film has been employed as a photographic negative film support, and in polarizing plates as a film which protects a polarizer employed in liquid crystal displays, due to its high transparency, low birefringence, and ease of adhesion to a polarizer.

In recent years, the production amount of liquid crystal displays has markedly increased due to the only limited depth and light weight, and the demand is increasing. Further, television sets, which employ a liquid crystal display, exhibit features such as thinness and light weight. Thereby, large-sized television sets, production of which had been difficult by employing a cathode ray tube, have been produced. Along with that trend, demand for polarizers and polarizer protecting films has been increasing.

So far, these cellulose ester films have been produced mainly employing a solution-casting method. The solution-casting method, as descried herein, refers to a film forming method in which a solution prepared by dissolving cellulose ester in a solvent is cast to form a film and the solvent is evaporated to obtain a dried film. The film which is cast employing the solution-casting method exhibits high flatness, whereby by employing the resulting film, it is possible to produce uniform and high image quality liquid crystal displays.

However, an inherent problem of the solution-casting method is the necessity of a large volume of organic solvents followed by a high environmental load. The cellulose ester film is cast employing a halogen-containing solvent which result in a high environmental load, due to the high solubility of cellulose ester in the halogen-containing solvent. Consequently, it has particularly demanded to reduce the amount of used solvents, whereby it has been difficult to increase the production of cellulose ester film employing the solution-casting method.

Accordingly, in recent years, challenges have been conducted in which cellulose ester is subjected to melt-casting for the use of silver salt photography (Patent Document 1) and as a polarizer protective film (Patent Document 2). However, cellulose ester is a polymer which exhibits a very high viscosity when melted and also exhibits a very high glass transition point. As a result, when cellulose ester is melted and extruded from a die to cast onto a cooling drum or belt, leveling of the film is not easy, since solidification occurs in a relatively short time after extrusion. Accordingly, the major problem has been that the flatness of the resulting film is lower than that of a solution-cast film.

In order to lower the melt viscosity and glass transition point of organic polymers such as cellulose ester, it is known that addition of plasticizers is effective.

In above Patent Documents 1 and 2, employed are phosphoric acid plasticizers such as triphenyl phosphate or phenylenebisdiphenyl phosphate.

However, as the result of examination conducted by the present inventors, it was found that, in these phosphoric acid plasticizers, phosphoric acid esters undergo decomposition due to moisture absorption or heat, resulting in generating phosphoric acid which deteriorates the cellulose ester and causes coloring of the film.

In Patent Documents 3, 4 and 5, ethylene glycol based plasticizers or polyalcohol esters which are esters of polyalcohols of trihydric or more with carboxylic acids have been disclosed as plasticizers employable in solution casting.

These plasticizers are favorable materials for cellulose ester since these materials exhibit high chemical stability and generate no strong acid which causes deterioration of cellulose ester even when hydrolyzed. However, since most of these materials are alkyl esters, effects of reducing moisture permeability is not fully enough. In order to obtain sufficient moisture permeability, the adding amount of a plasticizer may merely be increased, however, such simple increase of the plasticizer may result in bleeding out of the plasticizer on the surface of the cellulose ester film or in loss of transparency of the film.

The use of low molecular weight plasticizers such as triphenyl phosphate or dioctyl adipate may result in loss of flatness of the film due to deposition of vaporized plasticizer on the die when the film is melt-cast. Accordingly, a low volatile plasticizer is desired.

As examples of low volatile plasticizers, polyester plasticizers or polyurethane plasticizers have been proposed in Patent Documents 6-9, however, the plasticizers so far proposed tend to exhibit low compatibility with cellulose ester resulting in loss of transparency of the film.

Patent Document 1 teaches a stretching ratio of 2 to 4 to obtain a melt-cast cellulose ester film, however, a cellulose ester film is inherently a rather difficult polymer film to stretch, and as described in the document, it can be stretched at most 20 to 40% at ambient temperature. Accordingly, even at a higher temperature, it has been rather difficult to stretch a cellulose ester film in a ratio of 2 to 4 with sufficient manufacturing efficiency.

(Patent Document 1) Published Japanese Translation of International Publication No. 6-501040
(Patent Document 2) Japanese Patent Application Publication Open to Public Inspection (hereinafter referred to as JP-A) No. 2000-352620
(Patent Document 3) JP-A No. 11-246704
(Patent Document 4) JP-A No. 2000-63560
(Patent Document 5) JP-A No. 11-124445
(Patent Document 6) JP-A No. 2002-22956
(Patent Document 7) JP-A No. 2002-267846
(Patent Document 8) JP-A No. 2004-175971
(Patent Document 9) JP-A No. 2004-175972

SUMMARY OF THE INVENTION

An object of the present invention is to provide a method of producing a cellulose ester film via a melt-casting method in which no solvent is used when the film is formed, the cellulose ester film exhibiting: improved flatness, reduced moisture permeability, reduced bleeding out, reduced coloring of the film, less occurrence of problems with respect to winding such as horse back defect and easy stretchability, as well as to provide the cellulose ester film, a polarizing plate employing the cellulose ester film and a liquid crystal display employing the same.

One of the aspects of the present invention to achieve the above object is a method of producing a cellulose ester film comprising the steps of:

melting a film forming material comprising the following A to C; and melt casting the melted film forming material, A: a cellulose ester resin;

B: an ester compound obtained by condensing a polyalcohol and an organic acid represented by Formula (1); and C: an aliphatic polyester or an aliphatic-aromatic co-polyester,

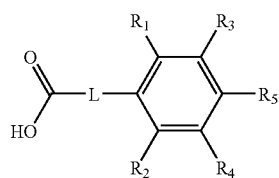

Formula (1)

wherein $R_1$-$R_5$ each represent a hydrogen atom, an alkyl group, a cycloalkyl group, an aryl group, an aralkyl group, an alkoxy group, a cyclo alkoxy group, an aryloxy group, an aralkyloxy group, an acyl group, a carbonyloxy group, an oxycarbonyl group or an oxycarbonyloxy group, wherein each of these groups may further have a substituent; and L represents a linkage group representing a substituted or unsubstituted alkylene group, an oxygen atom or a bond.

BEST MODE TO CARRY OUT THE INVENTION

Figure 1:
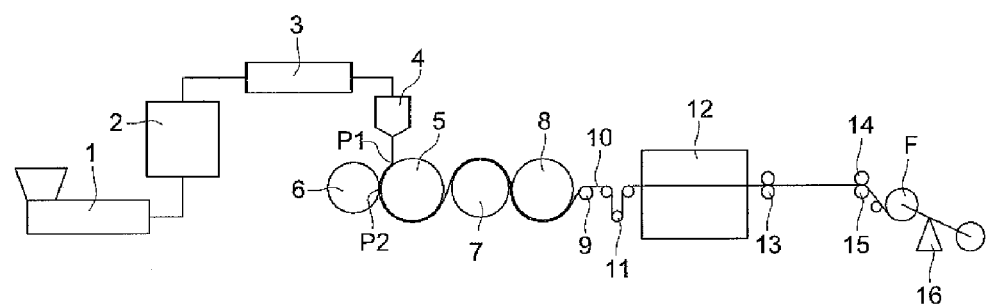
FIG. 1 is a schematic flow sheet of one of the embodiments of the producing apparatus of the cellulose ester film of the present invention.

The above object of the present invention is achieved by the following structures.

1. A method of producing a cellulose ester film comprising the steps of:

melting a film forming material comprising the following A to C; and melt casting the melted film forming material, A: a cellulose ester resin;

B: an ester compound obtained by condensing a polyalcohol and an organic acid represented by Formula (1); and C: an aliphatic polyester or an aliphatic-aromatic co-polyester,

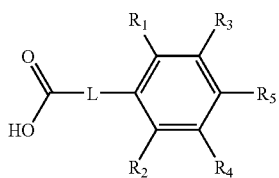

Formula (1)

wherein $R_1$-$R_5$ each represent a hydrogen atom, an alkyl group, a cycloalkyl group, an aryl group, an aralkyl group, an alkoxy group, a cyclo alkoxy group, an aryloxy group, an aralkyloxy group, an acyl group, a carbonyloxy group, an oxycarbonyl group or an oxycarbonyloxy group, wherein each of these groups may further have a substituent; and L represents a linkage group representing a substituted or unsubstituted alkylene group, an oxygen atom or a bond.

2. The method of Item 1, wherein C comprises both of the aliphatic polyester and the aliphatic-aromatic co-polyester.

3. The method of Item 1 or 2, wherein the aliphatic polyester comprises at least one repeating unit selected from the group consisting of Repeating unit (a) and Repeating unit (b):

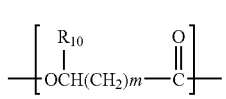

Repeating unit (a)

wherein m is an integer of 0 to 10, and $R_{10}$ represents at least one group selected from the group consisting of:

a hydrogen atom;

a non-substituted alkyl group of $C_1$ to $C_{12}$; an alkyl group of $C_1$ to $C_{12}$ substituted with at least one substituent selected from the group consisting of:

an aryl group of $C_6$ to $C_{10}$, and an alkoxy group of $C_1$ to $C_4$;

a non-substituted cycloalkyl group of $C_5$ to $C_{10}$; and a cycloalkyl group of $C_5$ to $C_{10}$ substituted with at least one substituent selected from the group consisting of:

an aryl group of $C_6$ to $C_{10}$, and an alkoxy group of $C_1$ to $C_4$,

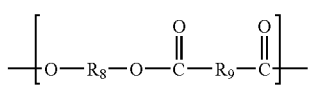

Repeating unit (b)

wherein

R$_8$ represents at least one group selected from the group consisting of:
- a non-substituted alkylene group of C$_2$ to C$_{12}$;
- an alkylene group of C$_2$ to C$_{12}$, substituted with at least one substituent selected from the group consisting of:
  - an aryl group of C$_6$ to C$_{10}$, and
  - an alkoxy group of C$_1$ to C$_4$;
- a non-substituted oxyalylene group of C$_2$ to C$_{12}$;
- an oxyalylene group substituted with at least one substituent selected from the group consisting of:
  - an aryl group of C$_6$ to C$_{10}$, and
  - an alkoxy group of C$_1$ to C$_4$;
- a non-substituted cycloalkylene group of C$_5$ to C$_{10}$; and
- a cycloalkylene group of C$_5$ to C$_{10}$ substituted with at least one substituent selected from the group consisting of:
  - an aryl group of C$_6$ to C$_{10}$, and
  - an alkoxy group of C$_1$ to C$_4$, and R$_9$ represents at least one group selected from the group consisting of:
- a non-substituted alkylene group of C$_2$ to C$_{12}$;
- an alkylene group of C$_2$ to C$_{12}$, substituted with at least one substituent selected from the group consisting of:
  - an aryl group of C$_6$ to C$_{10}$, and
  - an alkoxy group of C$_1$ to C$_4$;
- a non-substituted oxyalylene group of C$_2$ to C$_{12}$;
- an oxyalylene group of C$_2$ to C$_{12}$ substituted with at least one substituent selected from the group consisting of:
  - an aryl group of C$_6$ to C$_{10}$, and
  - an alkoxy group of C$_1$ to C$_4$;
- a non-substituted cycloalkylene group of C$_5$ to C$_{10}$; and
- a cycloalkylene group of C$_5$ to C$_{10}$ substituted with at least one substituent selected from the group consisting of:
  - an aryl group of C$_6$ to C$_{10}$, and
  - an alkoxy group of C$_1$ to C$_4$.

4. The method of any one of Items 1 to 3, wherein the aliphatic polyester is prepared from at least one material capable of forming a polyester selected from the group consisting of:
   (i) a hydroxy acid and a derivative of the hydroxy acid capable of forming a polyester;
   (ii) a dicarboxylic acid and a derivative thereof; or
   (iii) a diol.

5. The method of any one of Items 1 to 4, wherein the aliphatic-aromatic co-polyester comprises a repeat unit represented by Repeat unit (c):

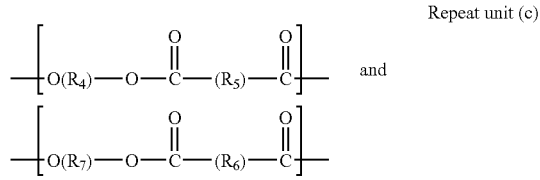

Repeat unit (c)

wherein

R$_4$ and R$_7$ each represents at least one group selected from the group consisting of:
- a non-substituted alkylene group of C$_2$ to C$_{12}$;
- an alkylene group of C$_2$ to C$_{12}$, substituted with at least one substituent selected from the group consisting of:
  - an aryl group of C$_6$ to C$_{10}$, and
  - an alkoxy group of C$_1$ to C$_4$;
- a non-substituted oxyalylene group of C$_2$ to C$_{12}$;
- an oxyalylene group of C$_2$ to C$_{12}$ substituted with at least one substituent selected from the group consisting of:
  - an aryl group of C$_6$ to C$_{10}$, and
  - an alkoxy group of C$_1$ to C$_4$;
- a non-substituted cycloalkylene group of C$_5$ to C$_{10}$; and
- a cycloalkylene group of C$_5$ to C$_{10}$ substituted with at least one substituent selected from the group consisting of:
  - an aryl group of C$_6$ to C$_{20}$, and
  - an alkoxy group of C$_1$ to C$_4$.

R$_5$ represents at least one group selected from the group consisting of:
- a non-substituted alkylene group of C$_1$ to C$_{12}$;
- an alkylene group of C$_2$ to C$_{12}$, substituted with at least one substituent selected from the group consisting of:
  - an aryl group of C$_6$ to C$_{10}$, and
  - an alkoxy group of C$_1$ to C$_4$;
- a non-substituted oxyalylene group of C$_2$ to C$_{12}$;
- an oxyalylene group of C$_2$ to C$_{12}$ substituted with at least one substituent selected from the group consisting of:
  - an aryl group of C$_6$ to C$_{10}$, and
  - an alkoxy group of C$_1$ to C$_4$;
- a non-substituted cycloalkylene group of C$_5$ to C$_{10}$; and
- a cycloalkylene group of C$_5$ to C$_{10}$ substituted with at least one substituent selected from the group consisting of:
  - an aryl group of C$_6$ to C$_{10}$, and
  - an alkoxy group of C$_1$ to C$_4$. and R$_6$ represents at least one group selected from the group consisting of:
- a non-substituted arylene group of C$_6$ to C$_{10}$ and
- an arylene group of C$_6$ to C$_{10}$ substituted with at least one group selected from
  - an alkyl group of C$_1$ to C$_4$ and
  - an alkoxyl group of C$_1$ to C$_4$.

6. The method of any one of Items 1 to 5, wherein the aliphatic-aromatic co-polyester is prepared from at least one compound capable of foaming a polyester selected from the group consisting of:
   (i) a dicarboxylic acid and a derivative thereof; or
   (ii) a diol.

7. The method of any one of Items 1 to 6, wherein the polyalcohol comprises 2 to 4 hydroxyl groups.

8. The method of any one of Items 1 to 7, wherein at least one of R$_1$ to R$_5$ of the ester compound comprises an organic acid comprising at least one group selected from:
   an alkoxy group, an acyl group, an oxycarbonyl group, a carbonyloxy group and an oxycarbonyloxy group, the ester compound being obtained by condensing a polyalcohol and an organic acid represented by Formula (1).

9. The method of any one of Items 1 to 8, wherein the film forming material comprises at least one antioxidant.

10. The method of Item 9, wherein the film forming material comprises at least one hindered phenol antioxidant and at least one phosphorus-containing antioxidant.

11. The method of Item 10, wherein the film forming material further comprises at least one compound represented by Formula (2):

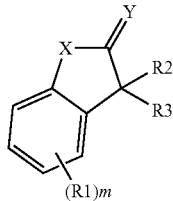

Formula (2)

wherein

X and Y each represent N—R (wherein R represents a hydrogen atom or a substituent), an oxygen atom or a sulfur atom, wherein X and Y may be the same or different;

$R_1$ represents a substituent;

$R_2$ and $R_3$ each represent a hydrogen atom or a substituent, wherein $R_2$ and $R_3$ may be combined to form a substituent comprising a double bond;

m represents an integer of 0 to 4, wherein, when m is 2 or more, plural $R_1$ groups may be the same or different; and at least one of $R_1$, $R_2$ and $R_3$ may be a group having a polymerizable group as a substructure.

12. The method of Item 11, wherein X and Y in the compound represented by Formula (2) each are an oxygen atom.
13. The method of any one of Items 1 to 12, wherein the film forming material comprises a UV absorbing copolymer prepared by using a UV absorbing monomer.
14. The method of any one of Items 1 to 13, wherein the film forming material comprises at least one blue dye.
15. A cellulose ester film produced by the method of any one of claims 1 to 14.
16. A polarizing plate comprising the cellulose ester film of Item 15.
17. A liquid crystal display employing the polarizing plate of Item 16.

That is, the present invention has been made to investigate a method to cast cellulose resin by thermal melting, and the inventors of the present invention have found, as a result of extensive study, that improvement in flatness, reduction of moisture permeability, reduction of bleed-out and reduction of coloration are possible by thermal melting of a film forming material containing at least one ester compound obtained by condensing an organic acid and a polyalcohol, at least one aliphatic polyester or aliphatic-aromatic copolyester and a cellulose resin. Further, surprisingly, it has been found that the above-described film forming material has an excellent stretching property due to the low viscosity of the melt, resulting in providing a high producibility of the cellulose ester. Thus the present invention has been completed.

A manufacturing method of cellulose ester film according to the present invention, a polarizing plate utilizing said cellulose ester film and a liquid crystal display utilizing said polarizing plate are characterized in that the cellulose ester film is manufactured by a melt casting method in which no solvent is used at the time of film formation and the film exhibits improved film flatness, reduced moisture permeability and reduced bleed-out as well as reduced coloration. Further, obtained is an excellent effect that a winding defect such as a horse-back defect hardly occurs.

In the following, the most preferable embodiment to practice the present invention will be detailed; however, the present invention is not limited thereto.

<Explanation of Ester Compound Obtained by Condensing Organic Acid and Polyalcohol>

In formula (1), $R_1$-$R_5$ are a hydrogen atom, an alkyl group, a cycloalkyl group, an aryl group, an aralkyl group, an alkoxy group, a cycloalkoxy group, an aryloxy group, an aralkyloxy group, an acyl group, a carbonyloxy group, an oxycarbonyl group or an oxycarbonyloxy group; which may be further provided with a substituent. L is a divalent linkage group, such as a substituted or unsubstituted alkylene group, an oxygen atom or a bonding hand.

Examples of an alkyl group represented by $R_1$-$R_5$ include groups of such as methyl, ethyl, propyl, 2-ethylhexyl, octyl, dodecyl and octadecyl; however, an alkyl group having a carbon number of 1-8 is preferable because cellulose ester is relatively hydrophilic polymer and compatibility of an ester compound with cellulose ester may be decreased when an excessively higher aliphatic group is introduced as a substituent. Further, these substituents may be further substituted and a preferable substituent includes a halogen atom such as a chlorine atom, a bromine atom and a fluorine atom; a hydroxyl group; an alokoxy group, a cycloalkoxy group; a phenyl group (this phenyl group may be further substituted by an alkyl group or a halogen atom); an aryloxy group (such as a phenoxy group (this phenyl group may be further substituted by an alkyl group or a halogen atom)); an acyl group having a carbon number of 2-8 such as an acetyl group and a propionyl group; and a carbonyloxy group such as an acetyloxy group and a propionyloxy group.

A cycloalkyl group represented by $R_1$-$R_5$ is preferably a cycloalkyl group having 3-8 carbon atoms, and is specifically preferably each group of such as cyclopropyl, cyclopentyl and cyclohexyl. These groups may be provided with a substituent and a preferable substituent includes a halogen atom such as a chlorine atom, a bromine atom and a fluorine atom; a hydroxyl group; an alkyl group; an alkoxy group; a cycloalkoxy group; an aralkyl group (this phenyl group may be further substituted by an alkyl group or a halogen atom); an alkenyl group such as a vinyl group and an allyl group; a phenyl group (this phenyl group may be further substituted by an alkyl group or a halogen atom); a phenoxy group (this phenyl group may be further substituted by an alkyl group or a halogen atom); an acyl group having a carbon number of 2-8 such as an acetyl group and a propionyl group; and a carbonyloxy group having a carbon number of 2-8 such as an acetyloxy group and a propionyloxy group.

An aryl group represented by $R_1$-$R_5$ is a group of such as phenyl and naphthyl, and these groups may be substituted. A preferable substituent similarly includes groups which may be substituted on the aforesaid cycloalkyl group.

An aralkyl group represented by $R_1$-$R_5$ is a benzyl group, a phenethyl group and a γ-phenylpropyl group, and these groups may be substituted. A preferable substituent similarly includes groups which may be substituted on the aforesaid cycloalkyl group.

An alkoxy group represented by $R_1$-$R_5$ is preferably an alkoxy group having a carbon number of 1-8, and is specifically preferably each alkoxy group of such as methoxy, ethoxy, n-propoxy, n-butoxy, n-octyloxy, isopropoxy, isobutoxy, 2-ethylhexyloxy or t-butoxy. Further, these groups may be provided with a substituent and a preferable substituent includes a halogen atom such as a chlorine atom, a bromine atom and a fluorine atom; a hydroxyl group; an alkoxy group; a cycloalkoxy group; an aralkyl group (this phenyl group may be further substituted by an alkyl group or a halogen atom); an alkenyl group; a phenyl group (this phenyl group may be further substituted by an alkyl group or a halogen atom); a aryloxy group (such as a phenoxy group (this phenyl group may be further substituted by an alkyl group or a halogen atom)); an acyl group such as an acetyl group and a propionyl group; an unsubstituted acyloxy group having a carbon number of 2-8 such as an acetyloxy group and a propionyloxy group; and an arylcarbonyloxy group such as a benzoyloxy group.

A cycloalkoxy group represented by $R_1$-$R_5$ includes a cycloalkoxy group having a carbon number of 1-8 as an unsubstituted cycloalkoxy group, and specifically includes each group of such as cyclopropyloxy, cyclopentyloxy and cyclohexyloxy. Further, these groups may be substituted and a preferable substituent similarly includes groups which may be substituted on the aforesaid cycloalkyl group.

An aryloxy group represented by $R_1$-$R_5$ includes a phenoxy group, and this phenyl group may be substituted by a substituent such as an alkyl group and a halogen atom which may be substituted on the aforesaid cycloalkyl group.

An aralkyloxy group represented by $R_1$-$R_5$ includes such as a benzyloxy group and a phenthyloxy group, and these substituents may be further substituted; a preferable substituent similarly includes substituents which may be substituted on the aforesaid cycloalkyl group.

An acyl group represented by $R_1$-$R_5$ includes an acyl group having a carbon number of 2-8 such as an acetyl group and a propionyl group (a hydrocarbon group of an acyl group includes an alkyl group, an alkenyl group and an alkynyl group), and these substituents may be further substituted; a preferable substituent includes those which may be substituted on the aforesaid cycloalkyl group.

A carbonyloxy group represented by $R_1$-$R_5$ includes an unsubstituted acyloxy group having a carbon number of 2-8 such as an acetyloxy group and a propionyloxy group (as a hydrocarbon group of an acy group includes an alkyl group, an alkenyl, and alkynyl group), and an aryloxycarbonyloxy group such as a benzyloxy group; and these substituents may be further substituted by a group which may be substituted on the aforesaid cycloalkyl group.

An oxycarbonyl group represented by $R_1$-$R_5$ includes an alkoxycarbonyl group such as a methoxycarbonyl group, ethoxycarbonyl group and a propyloxycarbonyl group and an aryloxycarbonyl group such as a phenoxycarbonyl group. These substituents may be further substituted and a preferable substituent includes those which may be substituted on the aforesaid cycloalkyl group.

Further, an oxycarbonyloxy group represented by $R_1$-$R_5$ includes an alkoxycarbonyloxy group having a carbon number of 1-8 such as a methoxycarbonyloxy group, and these substituents may be further substituted; a preferable substituent includes those which may be substituted on the aforesaid cycloalkyl group.

Any of $R_1$-$R_5$ may bond each other to form a ring structure.

Further, a linkage group represented by L is a substituted or unsubstituted alkylene group, an oxygen atom or a direct bond, and alkylene group is such as a methylene group, an ethylene group and a propylene group; these groups may be substituted by a substituent which may be substituted to the aforesaid group represented by $R_1$-$R_5$.

Particularly, a specifically preferable linkage group represented by L is a direct bond, which derives aromatic carboxylic acid.

Further, organic acid, which is represented by aforesaid formula (1) and constitutes an ester compound as a plasticizer in the present invention, is preferably those in which $R_1$-$R_5$ are a hydrogen atom and more preferably those in which at least one of $R_1$-$R_5$ is the aforesaid alkoxy group, acyl group, oxycarbonyl group, carbonyloxy group or oxycarbonyloxy group.

Further, preferably are those in which at least two of $R_1$-$R_5$, and furthermore preferably at least three of $R_1$-$R_5$ are the aforesaid alkoxy group, acyl group, oxycarbonyl group, carbonyloxy group or oxycarbonyloxy group.

Herein, in the present invention, organic, acid to substitute hydroxyl groups of polyalcohol may be either a single type or plural types. In the case of organic acid to substitute hydroxyl groups of polyalcohol being plural types, unsubstituted aromatic carboxylic acid, aliphatic carboxylic acid and alicyclic carboxylic acid may be contained, however, preferable is a polyalcohol ester compound in which not less than the half of hydroxyl groups of polyalcohol are substituted. Further, OH groups in polyalcohol either may be all estericated or a part of them may remain as an OH group; however, not less than a half of hydroxyl groups of polyalcohol are preferably substituted by organic acid.

In the present invention, a polyalcohol compound, which forms a polyalcohol ester compound by reacting with organic acid represented by aforesaid formula (1), is preferably aliphatic polyalcohol having 2-20 valences, and polyalcohol in the present invention is preferably those represented by following formula (IV).

R'—(OH)m     Formula (IV)

wherein, R' is an organic group having m valences; m is a positive integer of not less than 2; and an OH group is an alcoholic hydroxyl group. Specifically preferable is polyalcohol having m in a range of 2-4.

Examples of preferred polyalcohol include the following; however, the present invention is not limited thereto. Listed are such as adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 2-methyl-2,4-pentanediol, 2,2,4-trimethylpentane-1,3-diol, 1,6-hexanediol, 1,2,3-hexanetriol, 1,2,6-hexanetriol, glycerin, diglycerin, erythritol, pentaerythritol, dipentaerythritol, tripentaerythritol, galactitol, glucose, cellobiose, inositol, mannitol, methylpentane-1,3,5-triol, pinacol, sorbitol, trimethylolpropane, trimethylolethane and xylitol. Specifically preferable are diethylene glycol, triethylene glycol, glycerin, trimethylolethane, trimethylolpropane and pentaerythritol.

Ester of polyalcohol and organic acid represented by formula (1), can be synthesized according to a method well known in the art. A typical synthesis method is shown in an example, however, there are such as a method to condense and esterify polyalcohol and organic acid represented by formula (1) in the presence of acid, a method in which organic acid is converted into acid chloride or acid anhydride in advance followed by being reacted with polyalcohol, and a method to react phenyl ester of organic acid with polyalcohol; it is preferable to appropriately select an efficient method depending on the type of an aimed ester compound.

The molecular weight of polyalcohol prepared in this manner is not specifically limited, however, is preferably 300-1,500 and is more preferably 500-1,000. It is preferable the larger is the molecular weight because of low volatility, while it is preferable the smaller is the molecular weight with respect to moisture permeability and compatibility with cellulose ester.

In the following, specific compounds of an ester compound contained by condensing a polyalcohol and an organic acid according to the present invention will be shown.

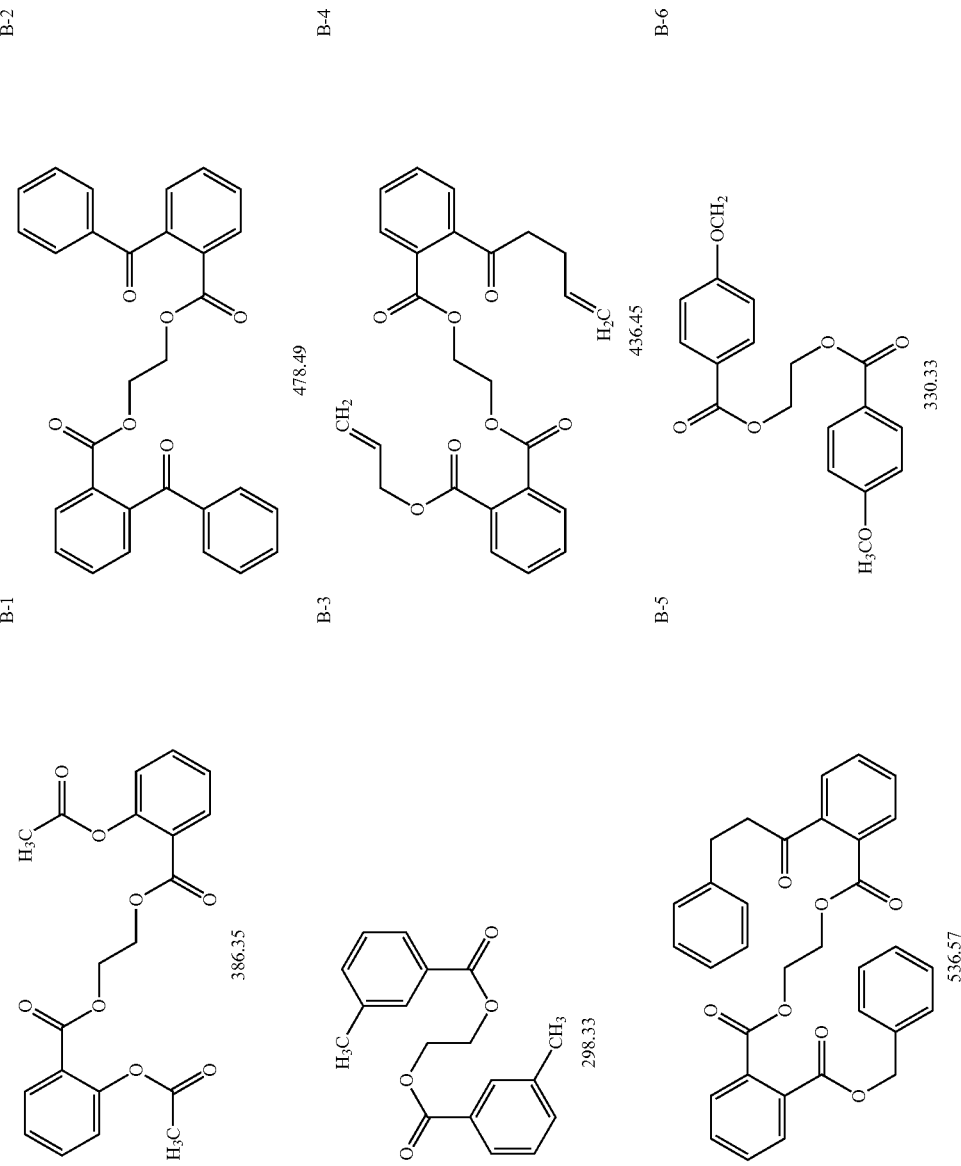

-continued
B-7
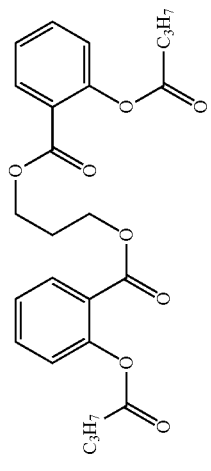
400.38
B-8
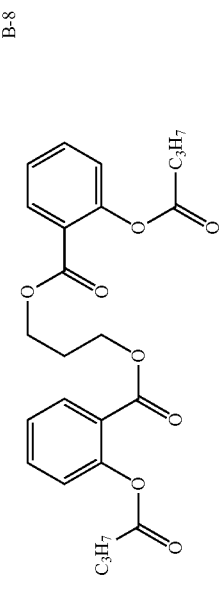
B-9
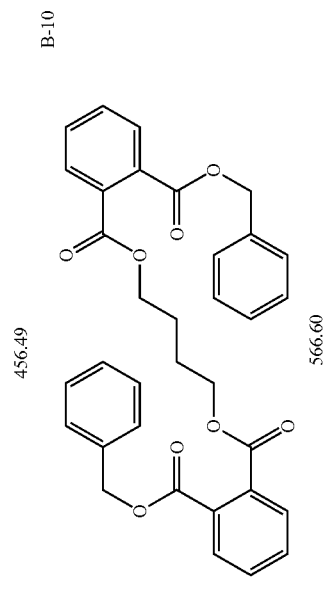
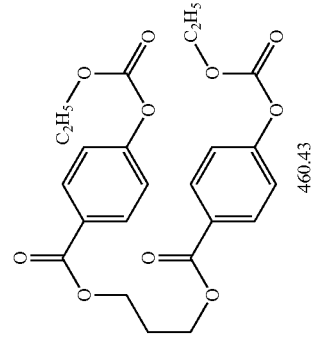
460.43
B-10
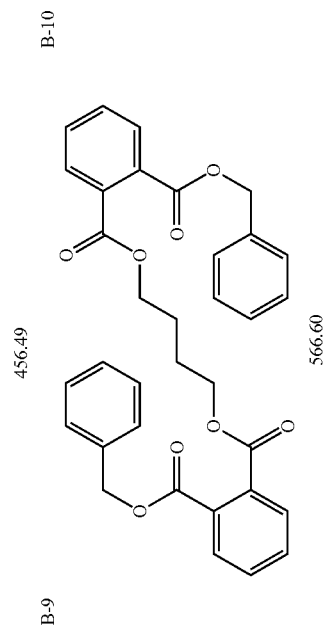
456.49
B-11
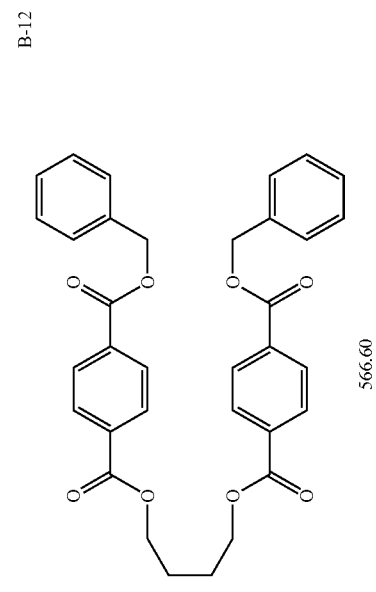
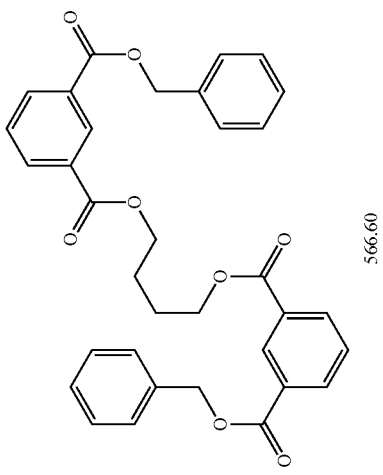
566.60
B-12
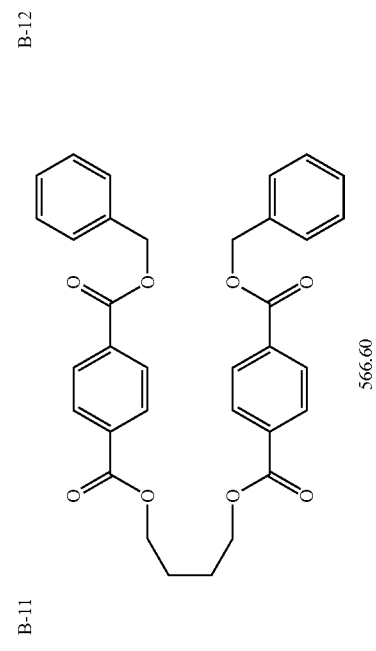
566.60

-continued
B-13
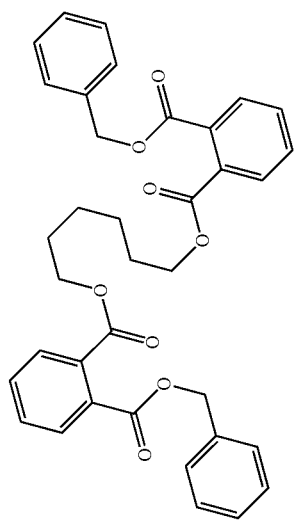
474.46
B-14
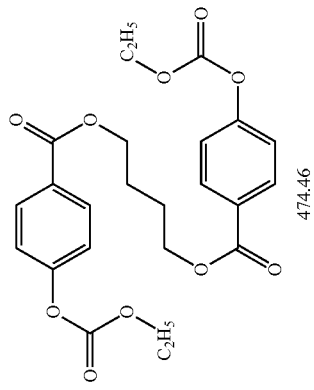
B-15
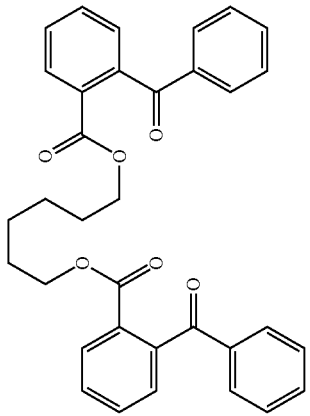
502.51
B-16
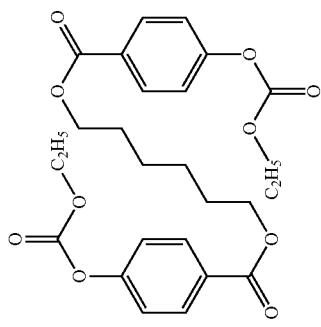
594.65
B-17
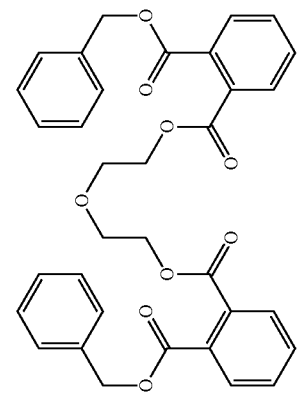
430.40
B-18
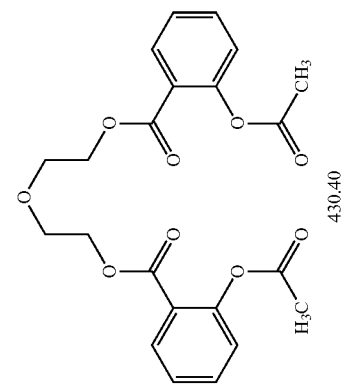
534.60
582.60

-continued
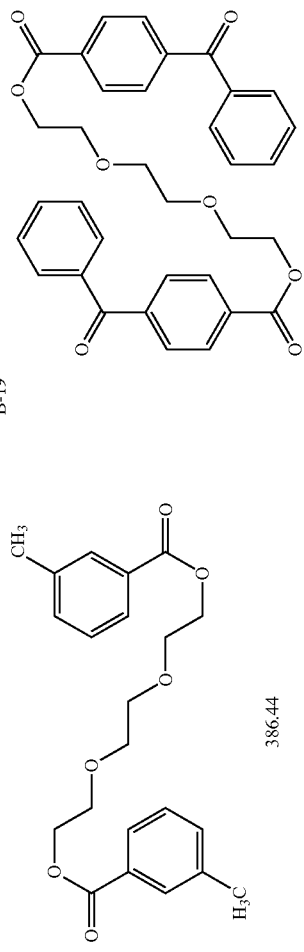
B-19
B-20
566.60
386.44
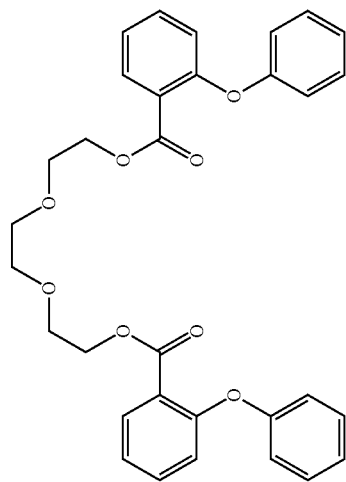
B-21
B-22
542.58
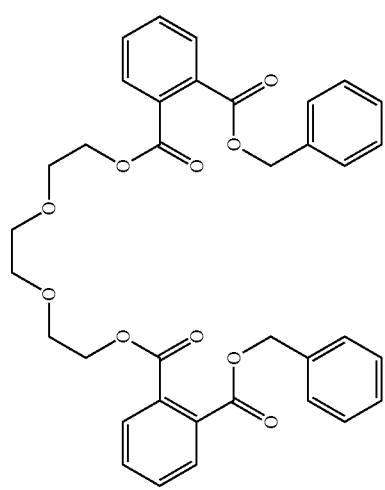
626.65
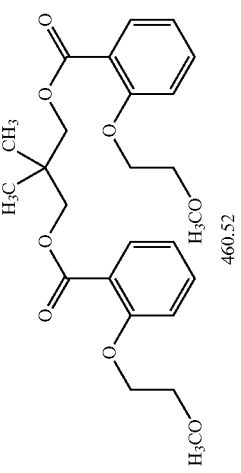
B-23
B-24
460.52
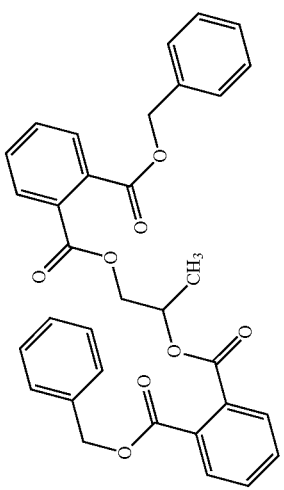
552.57

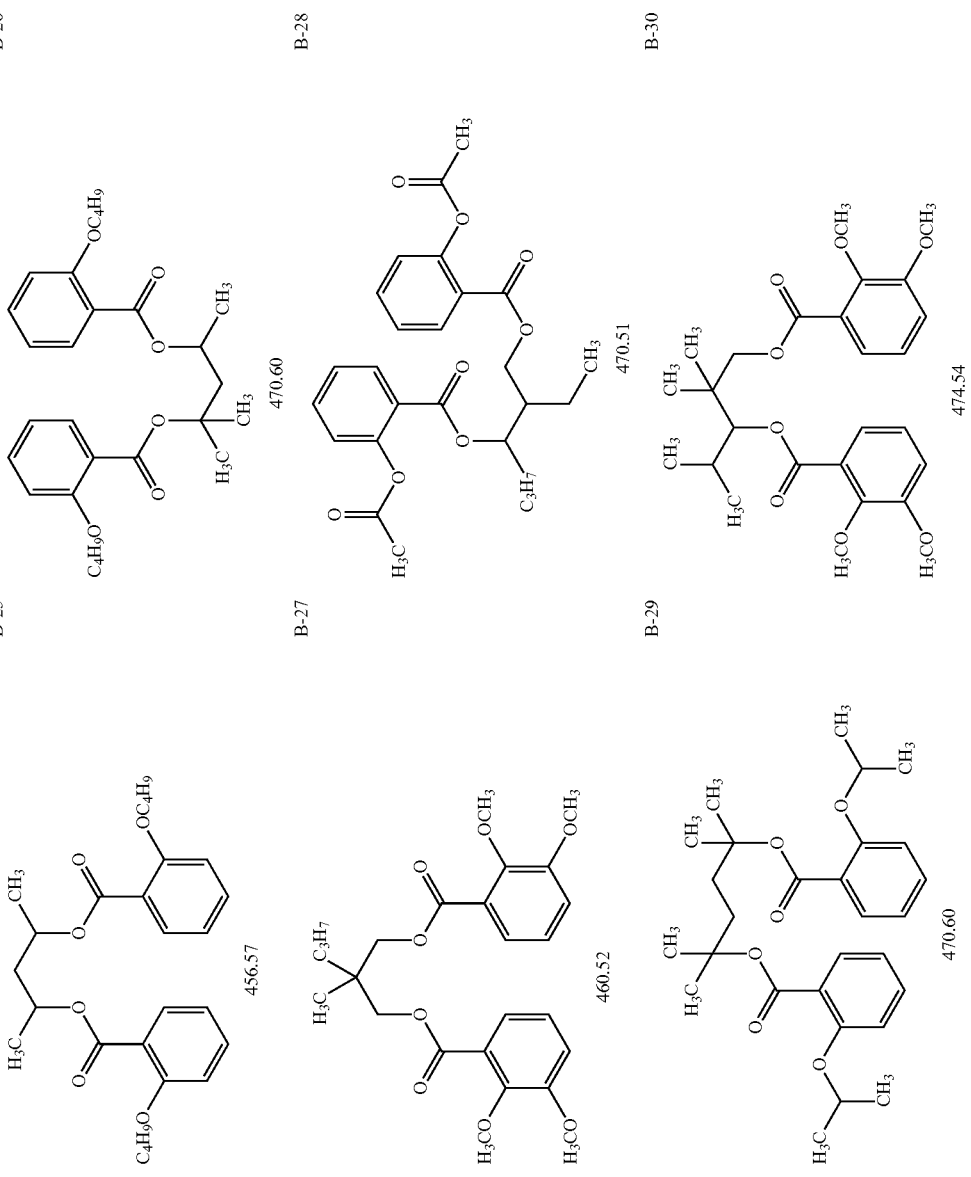

-continued
B-31
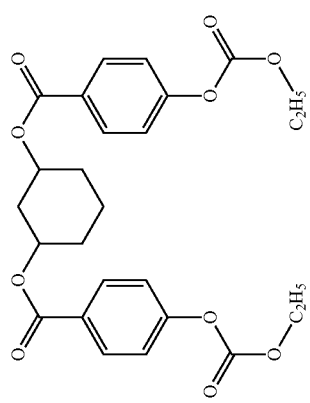
B-32
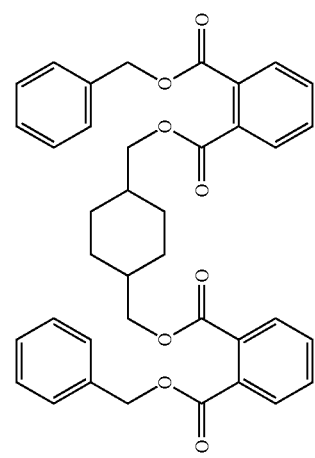
500.49
B-34
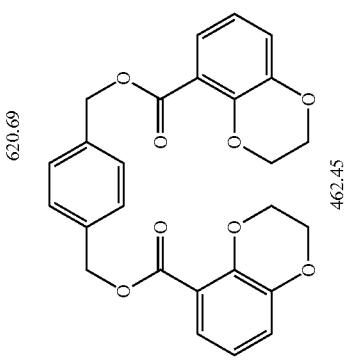
620.69
B-36
462.45
B-33
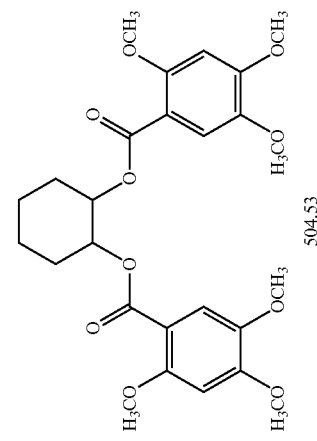
504.53
B-35
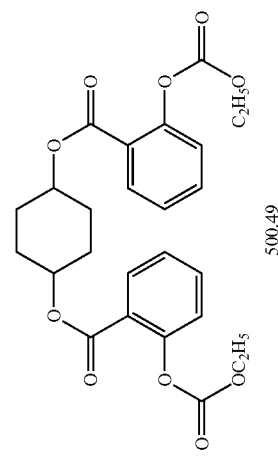
500.49
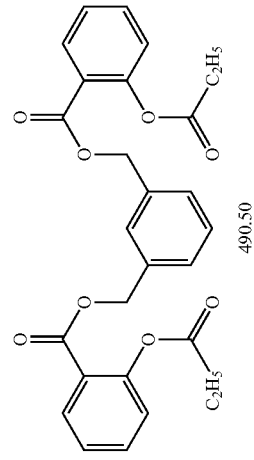
490.50

-continued
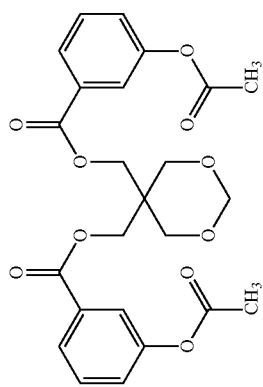
B-37
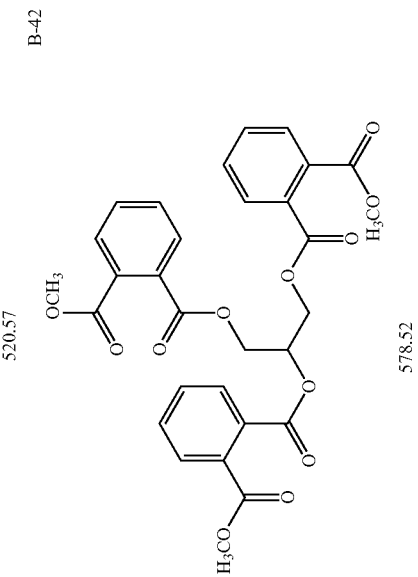
B-38
472.44
B-39
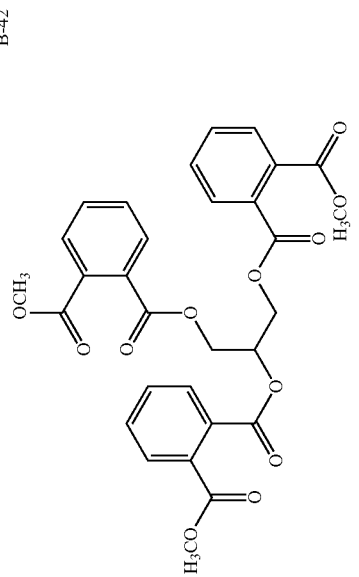
B-40
520.57
B-41
578.52
B-42
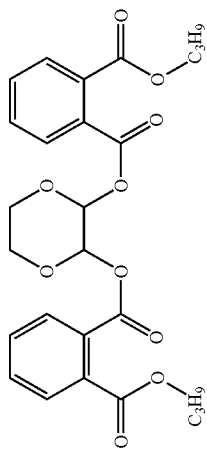
500.49
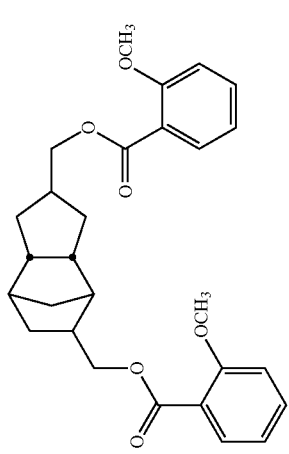
464.55
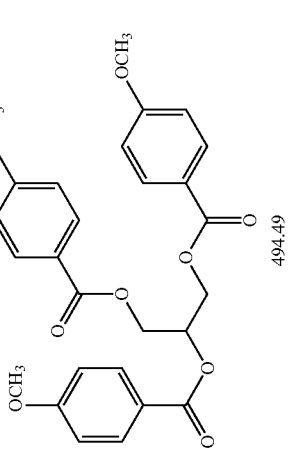
494.49

-continued
B-43
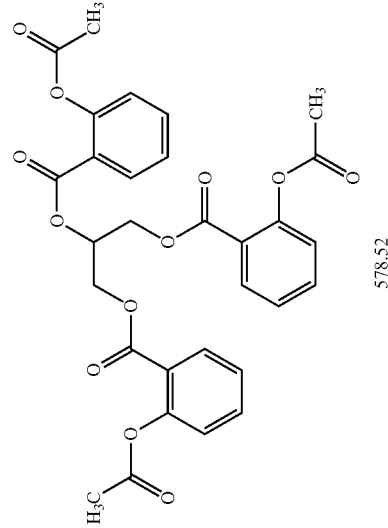
578.52
B-44
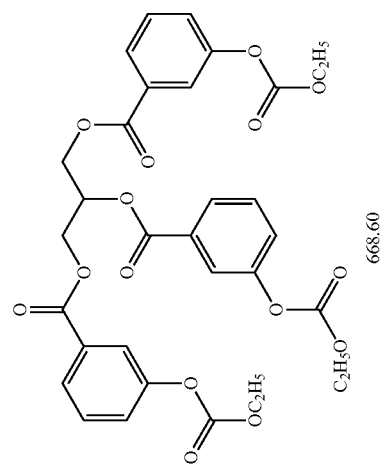
668.60
B-45
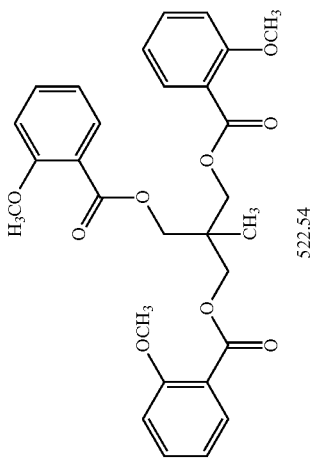
522.54
B-46
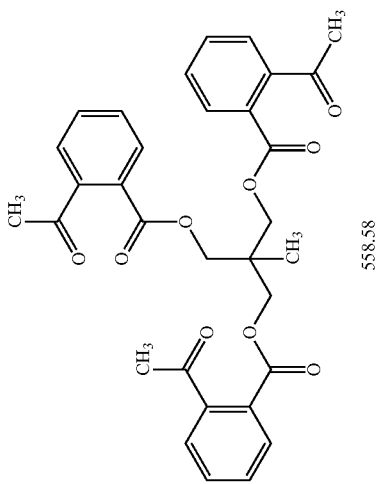
558.58

-continued
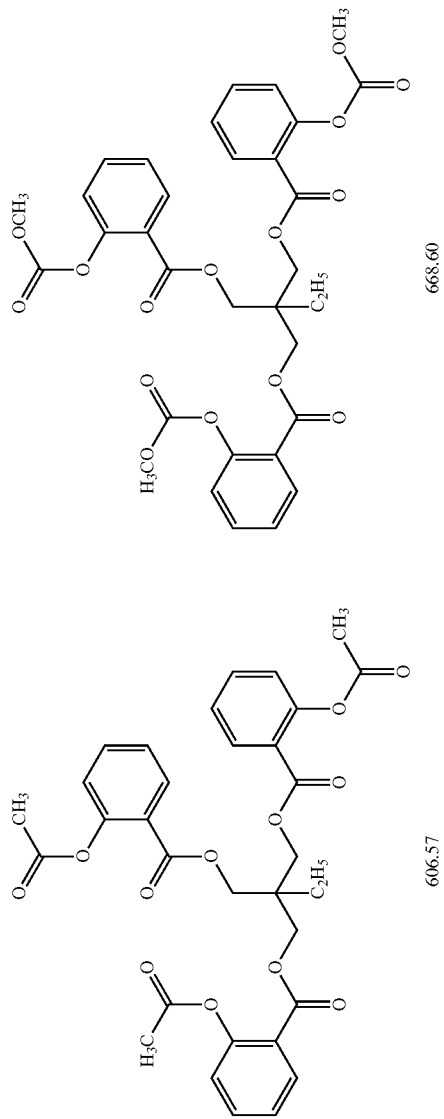
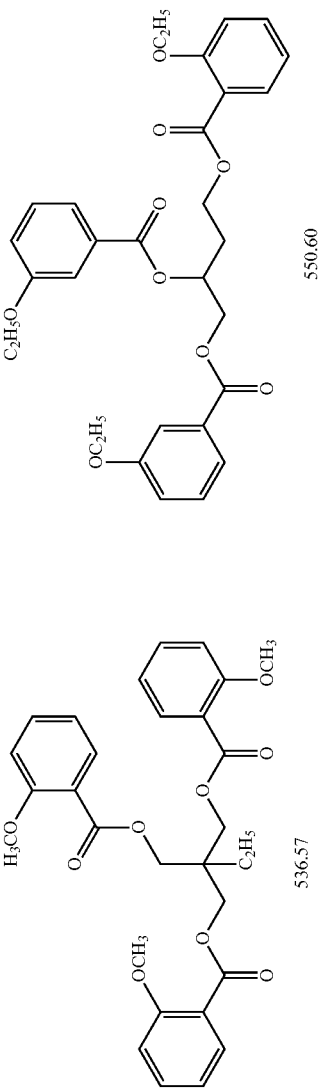

-continued
B-51
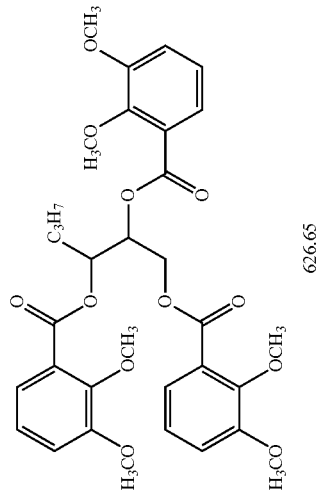
626.65
B-52
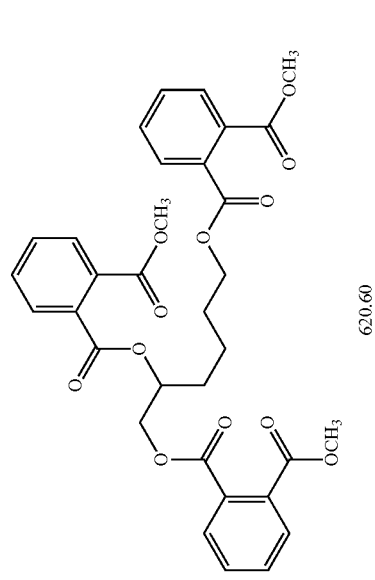
620.60
B-53
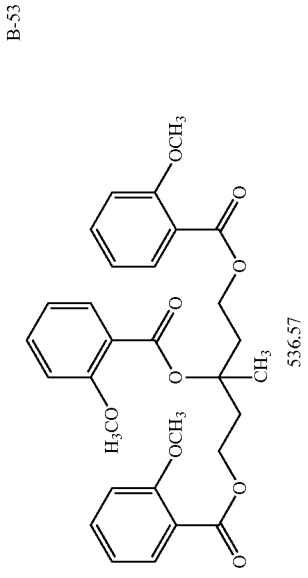
536.57
B-54
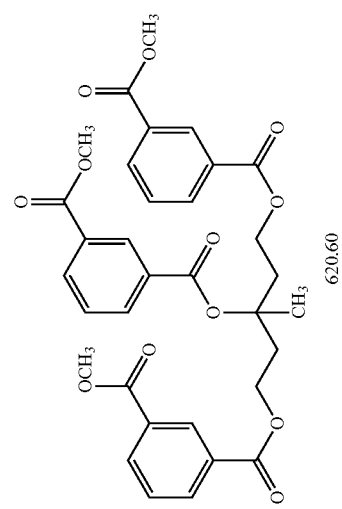
620.60

-continued
B-55
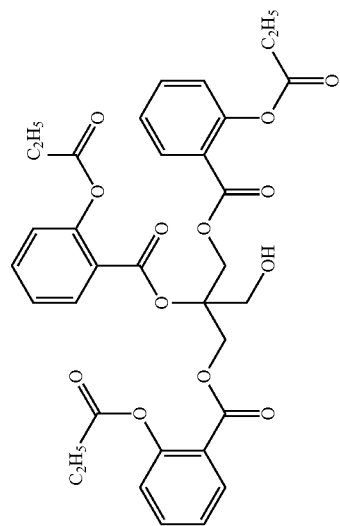
B-56
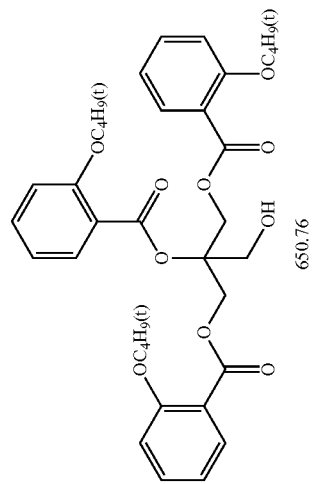
650.76
650.63
B-57
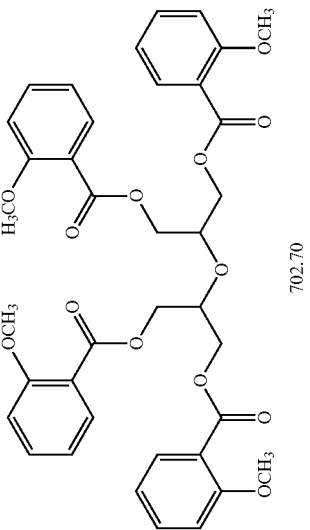
B-58
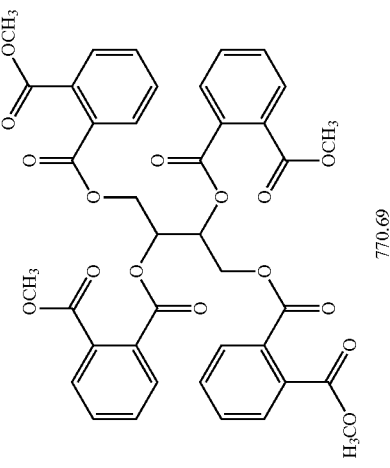
770.69
702.70

-continued
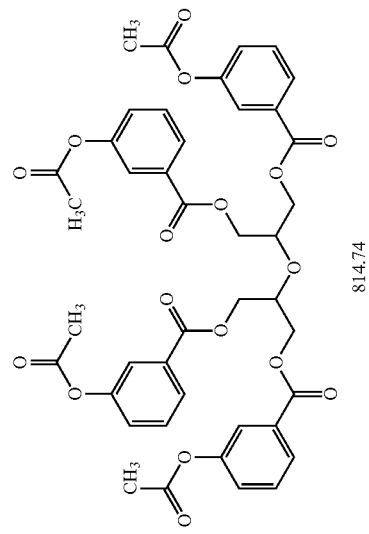
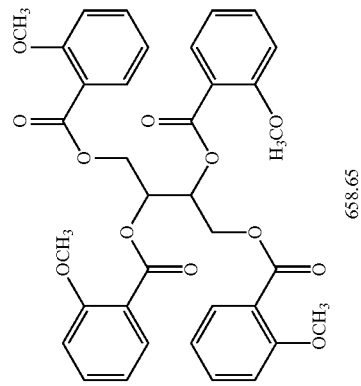
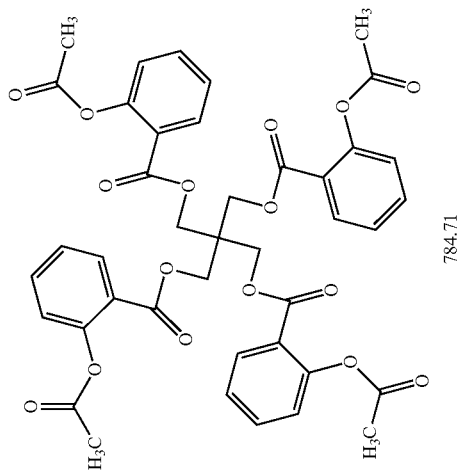
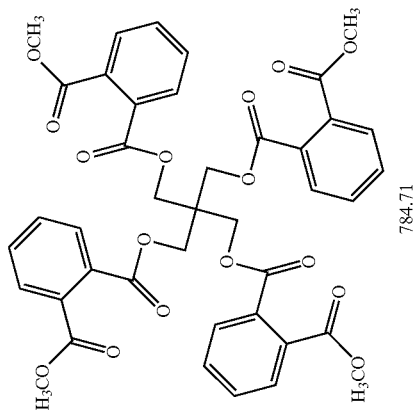

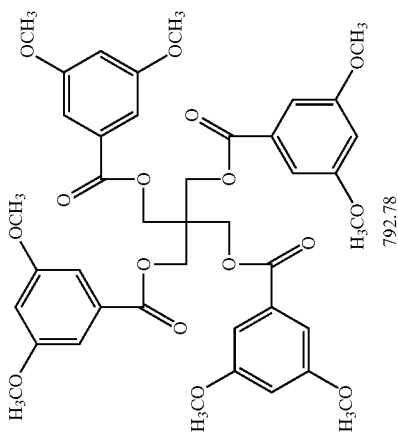
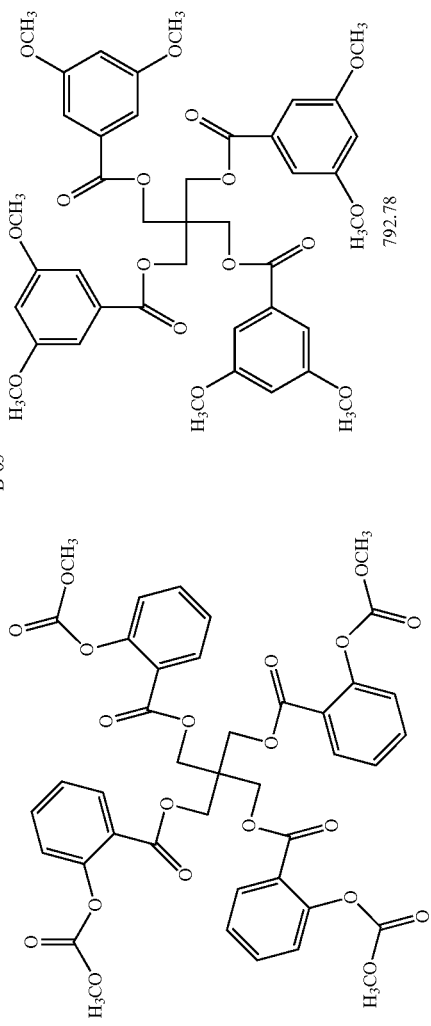
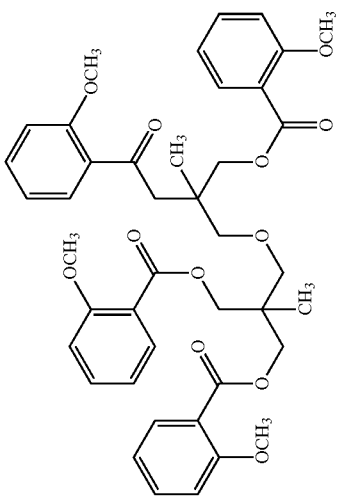
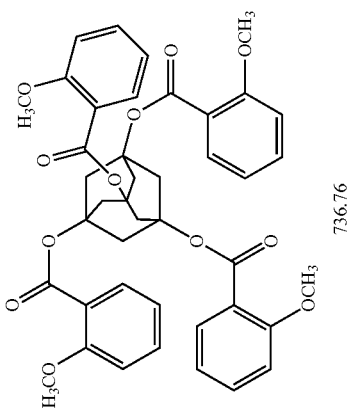

-continued
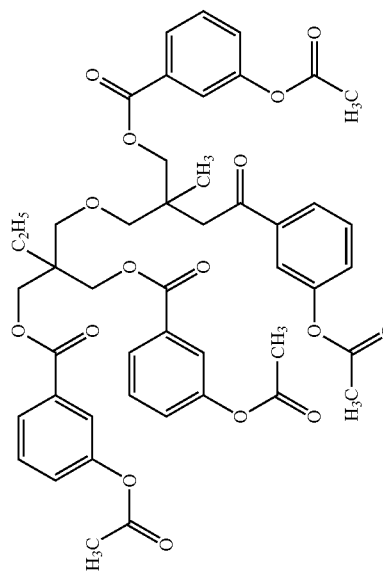
B-67
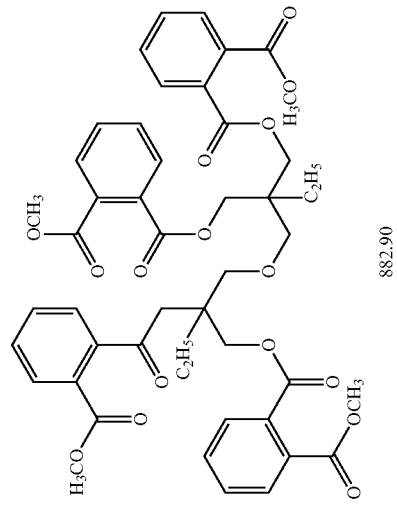
B-69
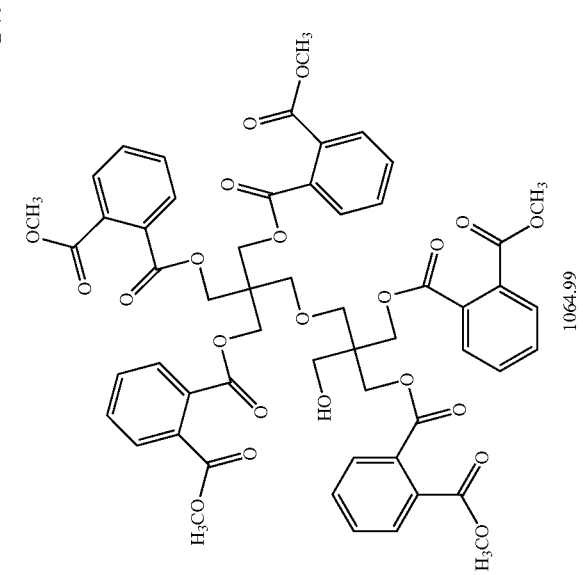
B-68
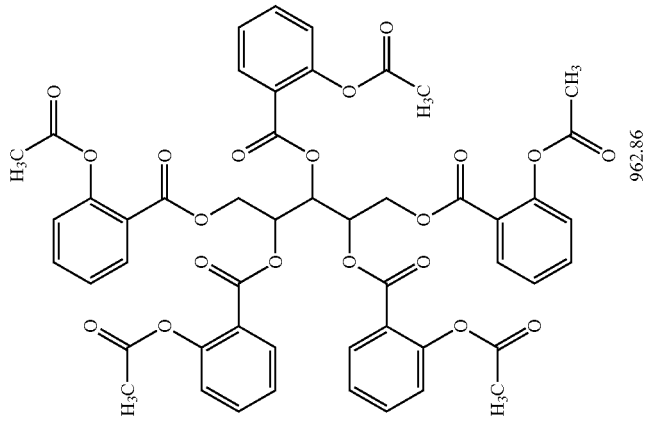
B-70

-continued
B-71
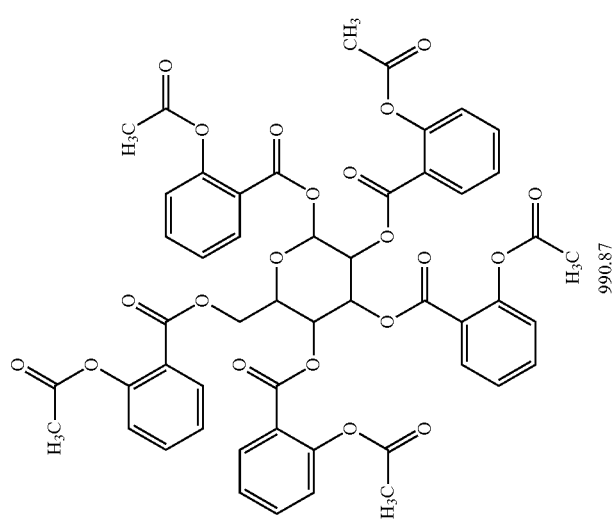
990.87
B-72
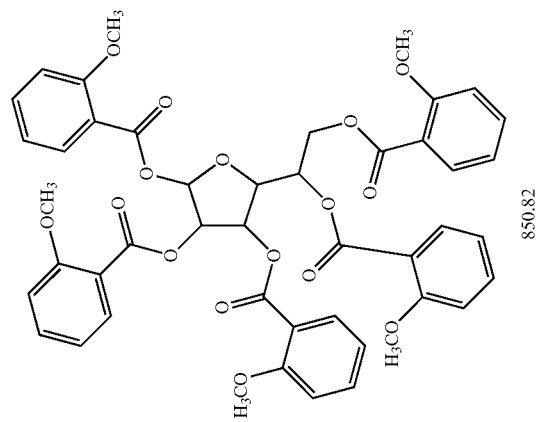
850.82

-continued
B-74
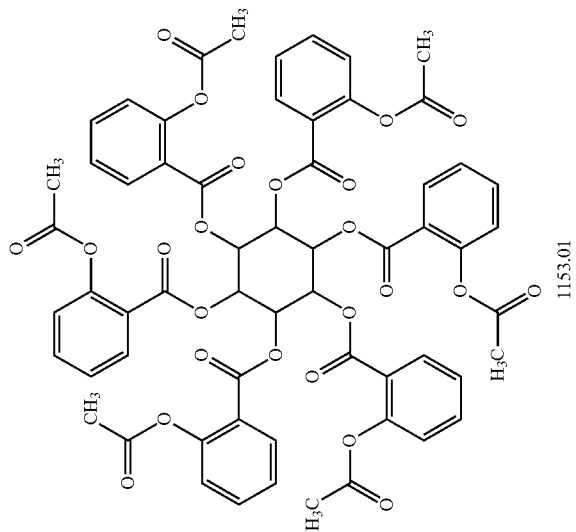
B-73
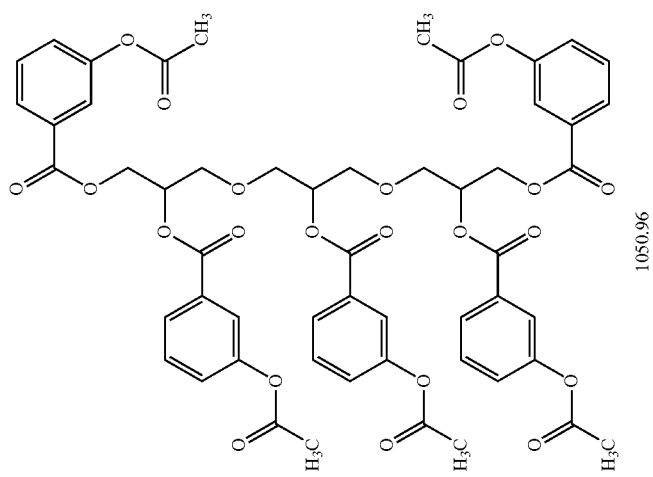

B-76
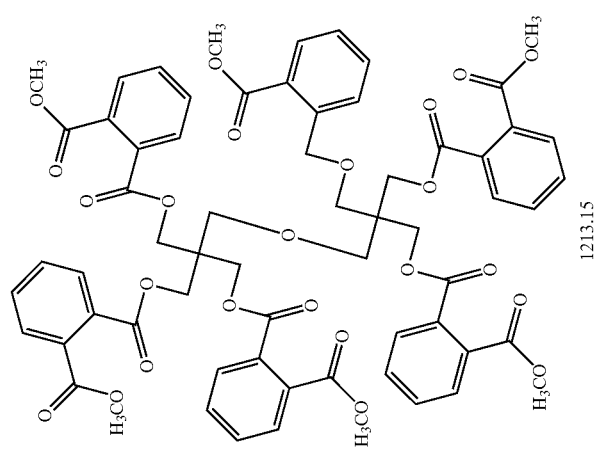
1213.15
-continued
B-75
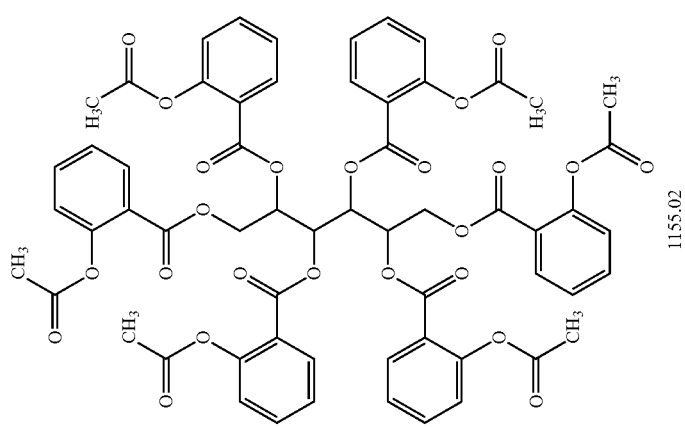
1155.02

-continued
B-77
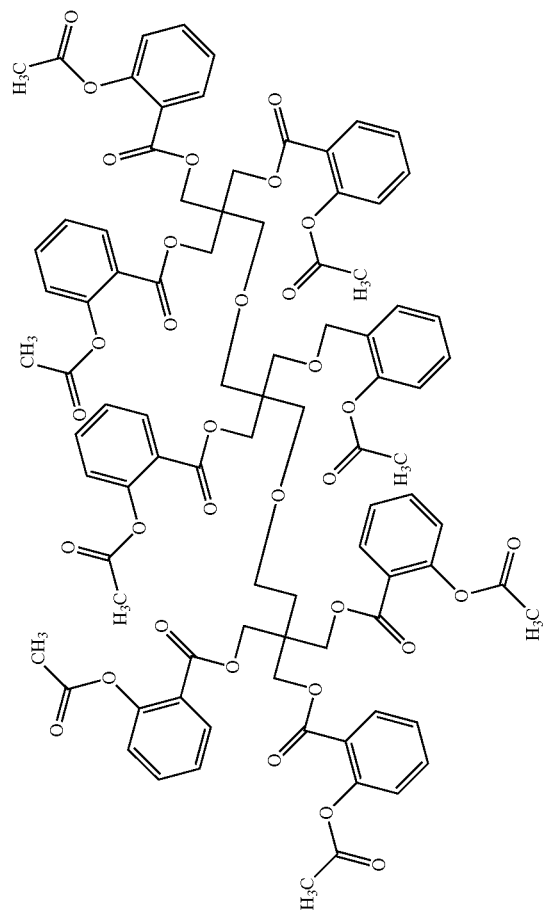
1669.59
B-78
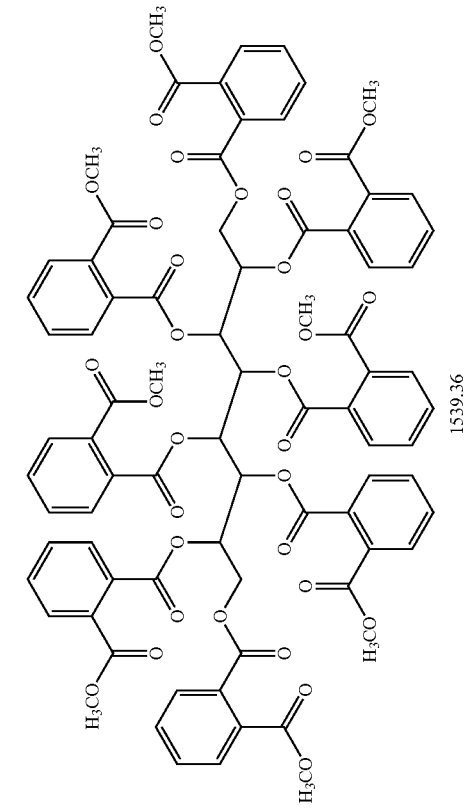
1539.36

-continued
B-79
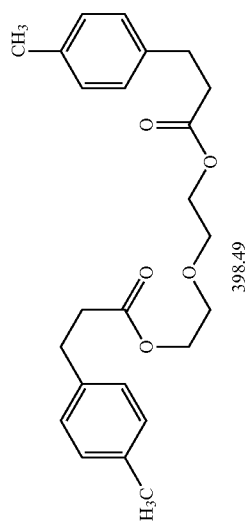
B-80
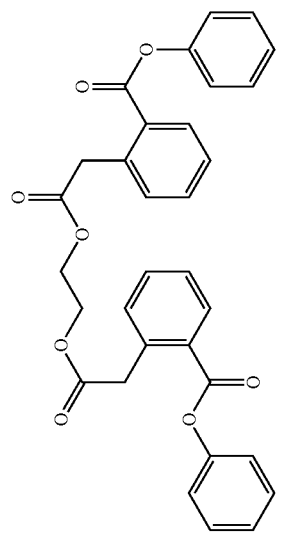
398.49
B-81
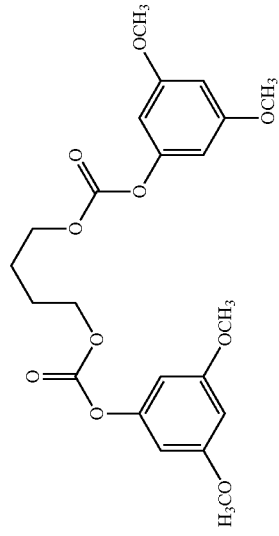
B-82
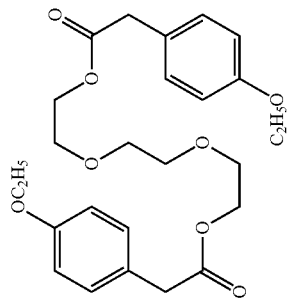
450.44
B-83
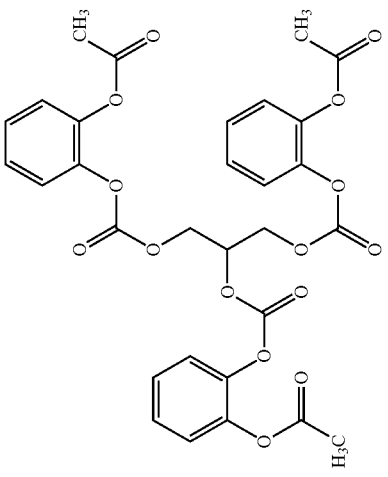
536.57
B-84
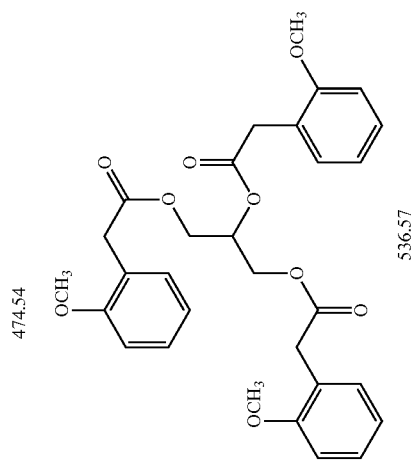
626.52

-continued
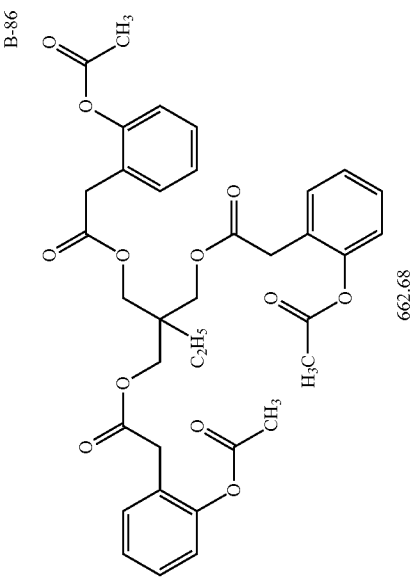
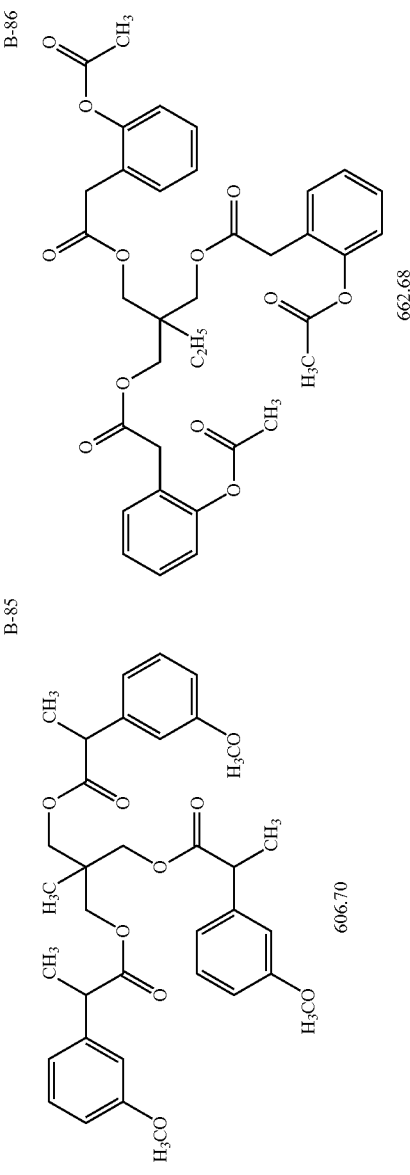
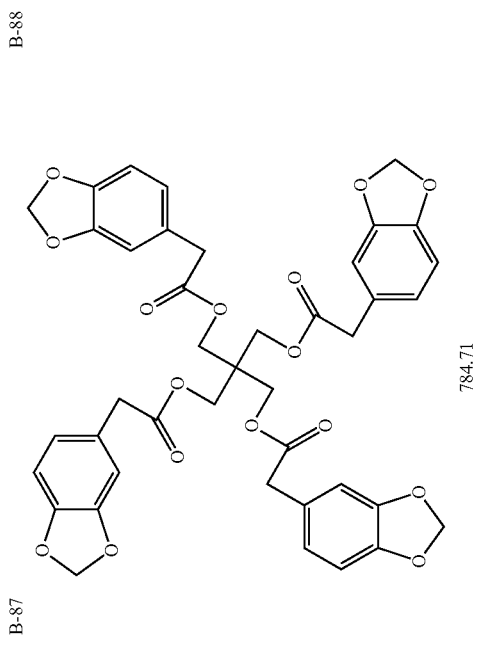
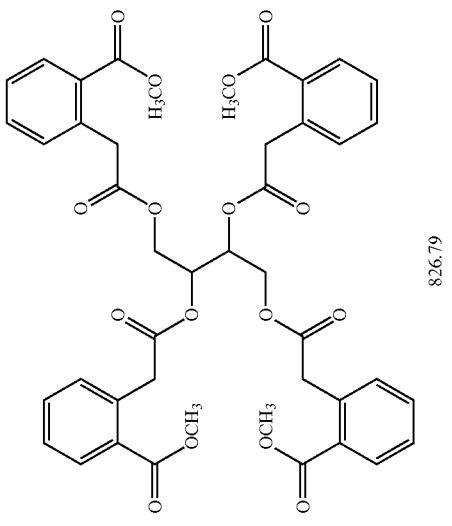

-continued
B-89
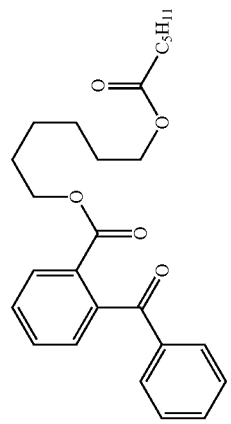
432.47
B-90
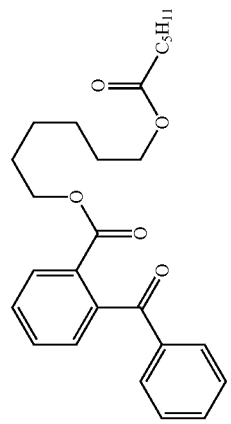
424.53
B-91
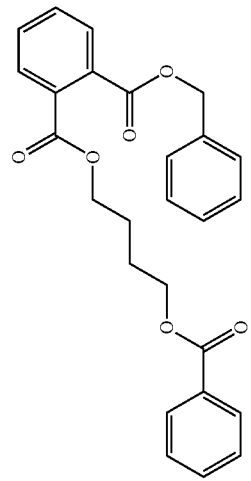
526.53
B-92
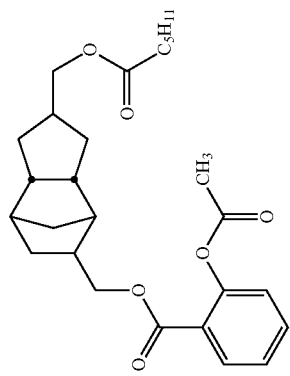
456.57
B-93
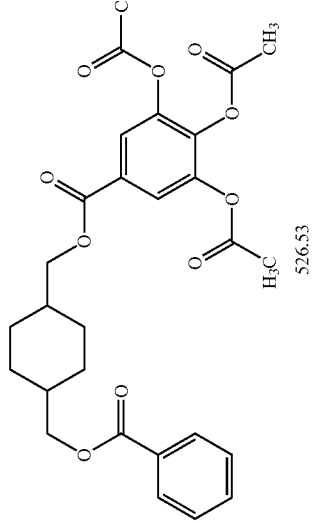
526.53
B-94
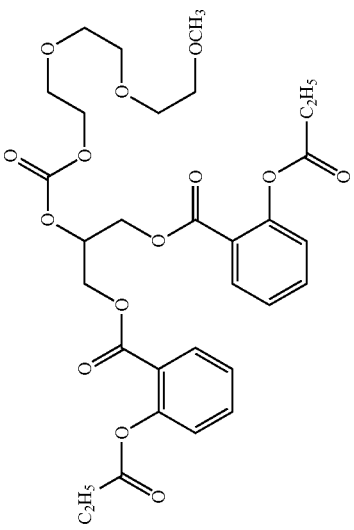
634.63

-continued
B-95
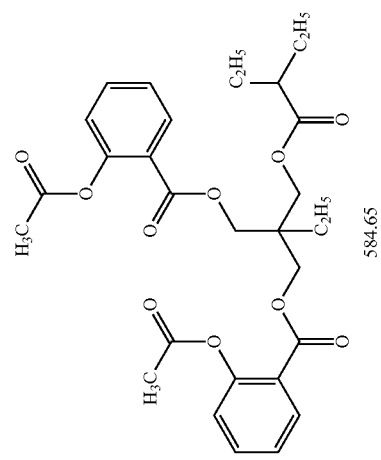
B-96
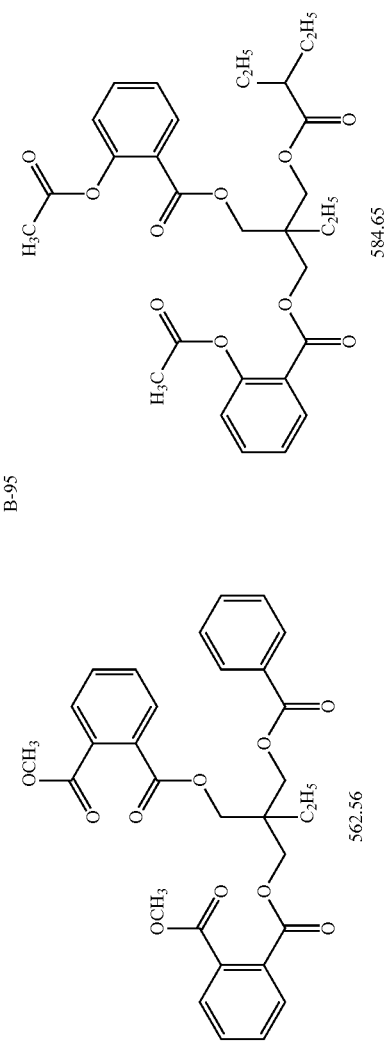
B-97
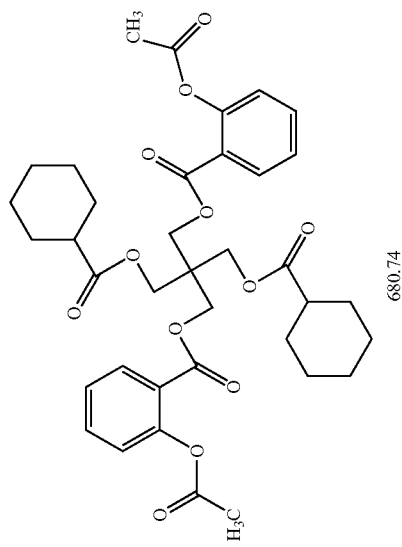
B-98
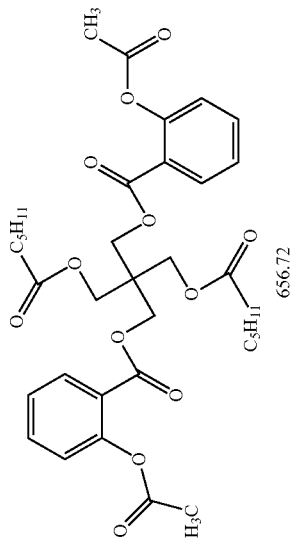

-continued
B-99
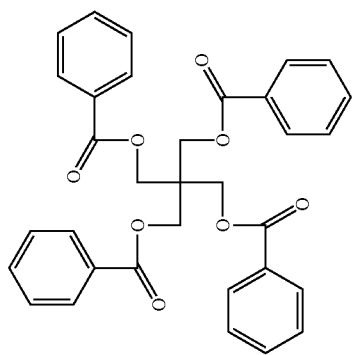
B-100
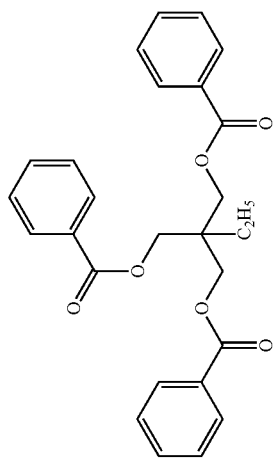
B-101
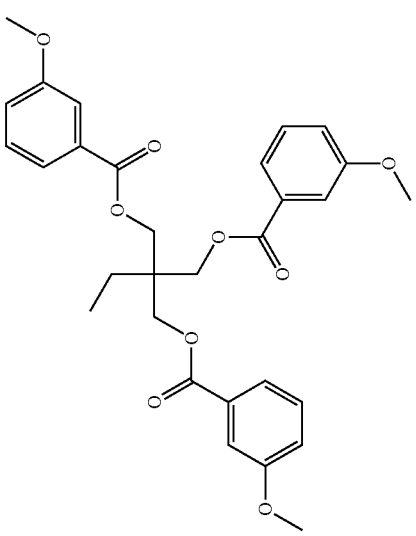
B-102
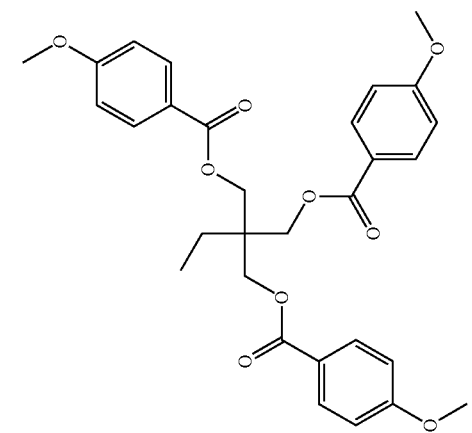

-continued
B-104
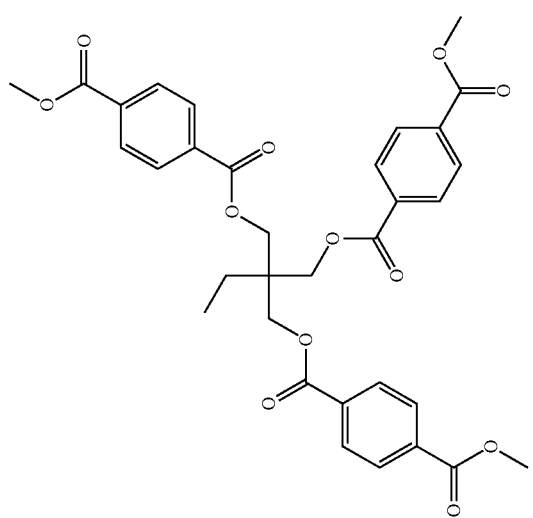
B-103
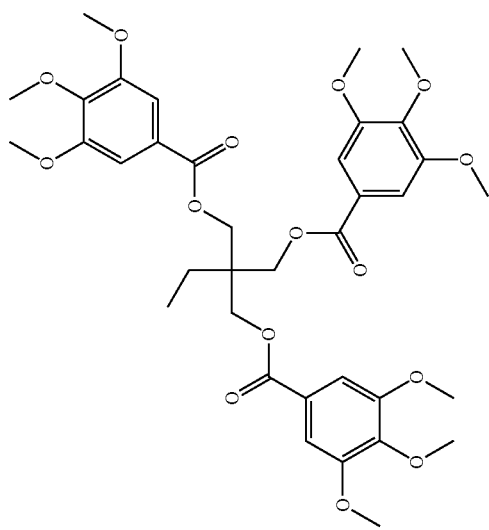

-continued
B-105
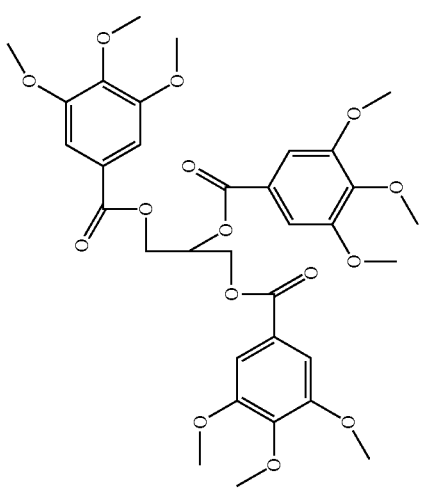
B-106
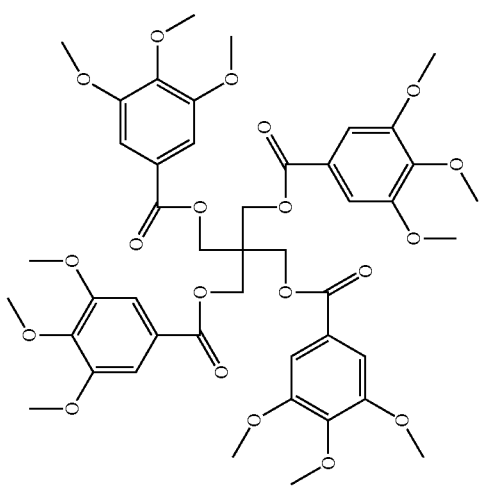

<Aliphaic Polyester>

One type of aliphatic polyester useful in the present invention is preferably contains at least one repeating unit selected from aforesaid repeating units (a) and (b):

In aforesaid repeating unit (a), m is an integer of 0-10, and $R_{10}$ is at least one type of a group selected from a hydrogen atom, an alkyl group of $C_1$-$C_{12}$, which is substituted by at least one substituent selected from an unsubstituted alkyl group of $C_1$-$C_{12}$, an aryl group of $C_6$-$C_{10}$ and an alkoxy group of $C_1$-$C_4$, and an cycloalkyl group of $C_5$-$C_{10}$, which is substituted by at least one substituent selected from an unsubstituted cycloalkyl group of $C_5$-$C_{10}$, an aryl group of $C_6$-$C_{10}$ and an alkoxy group of $C_1$-$C_4$.

Another type of a repeating unit is polyhydroxy alkanoate constituted of aforesaid repeating unit (b).

In repeating unit (b), $R_8$ is at least one type of a group selected from an alkylene group of $C_2$-$C_{12}$, which is substituted by at least one substituent selected from an unsubstituted alkylene group of $C_2$-$C_{12}$, an aryl group of $C_6$-$C_{10}$ and an alkoxy group of $C_1$-$C_4$, an oxyalkylene group, which is substituted by at least one substituent selected from an unsubstituted oxyalkylene group of $C_2$-$C_{12}$, an aryl group of $C_6$-$C_{10}$ and an alkoxy group of $C_1$-$C_4$; and an cycloalkylene group of $C_5$-$C_{10}$, which is substituted by at least one substituent selected from an unsubstituted cycloalkylene group of $C_5$-$C_{10}$, an aryl group of $C_6$-$C_{10}$ and an alkoxy group of $C_1$-$C_4$; and $R_9$ is at least one type of a group selected from an alkylene group of $C_2$-$C_{12}$, which is substituted by at least one substituent selected from an unsubstituted alkylene group of $C_2$-$C_{12}$, an aryl group of $C_6$-$C_{10}$ and an alkoxy group of $C_1$-$C_4$, an oxyalkylene group of $C_2$-$C_{12}$, which is substituted by at least one substituent selected from an unsubstituted oxyalkylene group of $C_2$-$C_{12}$, an aryl group of $C_6$-$C_{10}$ and an alkoxy group of $C_1$-$C_4$; and an cycloalkylene group of $C_5$-$C_{10}$, which is substituted by at least one substituent selected from an unsubstituted cycloalkylene group of $C_5$-$C_{10}$, an aryl group of $C_5$-$C_{10}$ and an alkoxy group of $C_1$-$C_4$.

$R_8$ is preferably a substituted or unsubstituted alkylene group of $C_2$-$C_6$, a substituted or unsubstituted oxyalkylene group of $C_4$-$C_8$, or a substituted unsubstituted cyclokylene group of $C_5$-$C_{10}$; and $R_9$ is preferably a substituted or unsubstituted alkylene group of $C_2$-$C_{10}$, a substituted or unsubstituted oxyalkylene group of $C_5$-$C_{10}$, or a substituted unsubstituted cycloalkylene group of $C_5$-$C_{10}$.

In the present invention, aliphatic polyester described above is also preferably prepared from at least one type of a polyester forming substance selected from (i) hydroxyl acid and polyester forming derivatives thereof, (ii) dicarboxylic acid and derivatives thereof and (iii) diol.

Hydroxy acid is selected from a group comprising such as 4-(hydroxymethyl)cyclohexane-carboxylic acid, hydroxytrimethyl acetic acid, 6-hydroxy-caproic acid, glycolic acid, lactic acid, ester forming derivatives thereof, and combinations thereof; dicarboxylic acid is selected from a group comprising such as malonic acid, succinic acid, glutaric acid, adipic acid, pimelic acid, azelaic acid, sebacic acid, fumaric acid, 2,2-dimethylglutalic acid, suberic acid, 1,3-cyclopenetane dicarboxylic acid, 1,4-cyclohexane dicarboxylic acid, 1,3-cyclohexane dicarboxylic acid, diglycolic acid, itaconic acid, maleic acid, 2,5-norbornane dicarboxylic acid, ester forming derivatives thereof and combinations thereof; and dial is selected from a group comprising such as ethylene glycol, propylene glycol, 1,3-propanediol, 2,2-dimethyl-1,3-propanediol, 1,3-butanediol, 1,4-butanediol, 1,5-pentanediol, 1,6-hexanediol, 2,2,4-trimethyl-1,6-hexanediol, thiodiethanol, 1,3-cyclohexane-dimethanol, 1,4-cyclohexane-dimethanol, 2,2,4,4-tetramethyl-1,3-cyclobutane-diol, diethyleneglycol, triethyleneglycol, tetraethyleneglycol and combinations thereof.

Specific examples of aliphatic polyester include polyhydroxy butyrate, copolymer of polyhydroxy butyrate and polyhydroxy valerate, poly(hexamethylene glutarate), poly(hexamethylene adipate), poly(ethylene sebacate), poly(tetramethylene glutarate), poly(tetramethylene adipate), poly(tetramethylene sebacate), poly(ethylene glutarate), poly(ethylene succinate), poly(tetramethylene succinate) and poly(ethylene adipate).

(Aliphatic-Aromatic Copolyester)

In the present invention, useful aliphatic-aromatic copolyester is random copolymer and is preferably comprised of a repeating unit represented by aforesaid repeating unit (c).

In repeating unit (c), $R_4$ and $R_7$ are at least one type of a group selected from an alkylene group of $C_2$-$C_{12}$, which is substituted by at least one substituent selected from an unsubstituted alkylene group of $C_2$-$C_{12}$, an aryl group of $C_6$-$C_{10}$ and an alkoxy group of $C_1$-$C_4$, an oxyalkylene group, which is substituted by at least one substituent selected from an unsubstituted oxyalkylene group of $C_2$-$C_{12}$, an aryl group of $C_6$-$C_{10}$ and an alkoxy group of $C_1$-$C_8$; and an cycloalkylene group of $C_5$-$C_{10}$, which is substituted by at least one substituent selected from an unsubstituted cycloalkylene group of $C_5$-$C_{10}$, an aryl group of $C_6$-$C_{10}$ and an alkoxy group of $C_1$-$C_4$; $R_5$ is at least one type of a group selected from an alkylene group of $C_2$-$C_{12}$, which is substituted by at least one substituent selected from an unsubstituted alkylene group of $C_2$-$C_{12}$, an aryl group of $C_6$-$C_{10}$ and an alkoxy group of $C_1$-$C_4$, an oxyalkylene group of $C_2$-$C_{12}$, which is substituted by at least one substituent selected from an unsubstituted oxyalkylene group of $C_2$-$C_{12}$, an aryl group of $C_6$-$C_{10}$ and an alkoxy group of $C_1$-$C_4$, and an cycloalkylene group of $C_5$-$C_{10}$, which is substituted by at least one substituent selected from an unsubstituted cycloalkylene group of $C_5$-$C_{10}$, an aryl group of $C_6$-$C_{10}$ and an alkoxy group of $C_1$-$C_4$; and $R_6$ is at least one type of a group selected from an arylene group of $C_6$-$C_{10}$, which is substituted by at least one substituent selected from an unsubstituted arylene group of $C_6$-$C_{10}$, an alkyl group of $C_1$-$C_4$ and an alkoxy group of $C_1$-$C_4$.

Aliphatic-aromatic copolyester represented by aforesaid repeating unit (c) is prepared from an arbitrary polyester forming combination of dicarboxylic acid or a derivative thereof and diol.

The above described carboxylic acid is selected from a group comprising pyre-acid such as malonic acid, succinic acid, glutaric acid, adipic acid, pimelic acid, azelaic acid, sebacic acid, fumaric acid, 2,2-dimethylglutalic acid, suberic acid, 1,3-cyclopenetane dicarboxylic acid, 1,4-cyclohexane dicarboxylic acid, 1,3-cyclohexane dicarboxylic acid, diglycolic acid, itaconic acid, maleic acid, 2,5-norbornane dicarboxylic acid, 1,4-terephthalic acid, 1,3-terephthalic acid, phthalic acid, 2,6-naphthoic acid, 1,5-naphthoic acid, ester forming derivatives thereof and combinations thereof; and the above-described diol is selected from a group comprising such as ethylene glycol, diethylene glycol, propylene glycol, 1,3-propanediol, 2,2-dimethyl-1,3-propanediol, 1,3-butanediol, 1,4-butanediol, 1,5-pentanediol, 1,6-hexanediol, 2,2,4-trimethyl-1,6-hexanediol, thiodiethanol, 1,3-cyclohexane-dimethanol, 1,4-cyclohexane-dimethanol, 2,2,4,4-tetramethyl-1,3-cyclobutane-diol, triethyleneglycol, tetraethyleneglycol and combinations thereof.

In repeating unit (c), $R_4$ and $R_7$ are preferably are at least one type of group selected from a substituted or unsubstituted alkylene group of $C_2$-$C_8$ or a substituted or unsubstituted oxyalkylene group of $C_2$-$C_8$, $R_5$ is preferably at least one type of a group selected from a substituted or unsubstituted alkylene group of $C_2$-$C_8$ or a substituted or unsubstituted oxyalkylene group of $C_2$-$C_4$, and $R_6$ is preferably at least one type of a group selected from a substituted or unsubstituted arylene group of $C_6$-$C_{10}$. Furthermore preferable aliphatic-aromatic copolyester is one, in which $R_4$ and $R_7$ are preferably are a substituted or unsubstituted alkylene group of $C_2$-$C_4$; $R_5$ is preferably at least one type of a group selected from a substituted or unsubstituted alkylene group of $C_2$-$C_6$ or a substituted or unsubstituted oxyalkylene group of $C_2$; and $R_6$ is preferably a 1,4-di-substituted $C_6$ arylene group.

A preferable compound is those prepared from the following diol and di-acid (or polyester forming derivatives thereof) of the following mol %:

(1) Glutaric acid (30-65 mol %); diglycolic acid (0-10 mol %); terephthalic acid (25-60 mol %); 1,4-butanediol (100 mol %).

(2) Succinic acid (30-85 mol %); diglycolic acid (0-10 mol %); terephthalic acid (5-60 mol %); 1,4-butanediol (100 mol %).

(3) Adipic acid (30-65 mol %); diglycolic acid (0-10 mol %); terephthalic acid (25-60 mol %); 1,4-butanediol (100 mol %).

(4) Succinic acid (30-95 mol %); terephthalic acid (5-60 mol %); ethylene glycol (70-100 mol %); diethylene glycol (0-30 mol %).

(5) Succinic acid (30-100 mol %); diglycolic acid (0-70 mol %); ethylene glycol (30-100 mol %); 1,4-butanediol (0-70 mol %).

Aliphatic copolyester and aliphatic-aromatic copolyester containing diol having a mean carbon number of 2-3.5 and dicarboxylic acid having a mean carbon number of 4-5.5 are preferable. In the present invention, a plasticizer well known in the art can be also utilized in combination at an amount not to disturb the effects of the present invention. For example, listed are dioctyl adipate, dicyclohexyl adipate, diphenyl succinate, di-2-naphthyl-1,4-cyclohexane dicarboxylate, tricyclohexyl tricarbarate, tetra-3-methylphenyl tetrahydrofuran-2,3,4,5-tetracarboxylate, tetrabutyl-1,2,3,4-cyclopentane tetracarboxylate, triphenyl-1,3,5-cyclohexyltricarboxylate, triphenylbenzene-1,3,5-tetracarboxylate, a phthalic acid type plasticizer (such as diethyl phthalate, dimethoxyethyl phthalate, dimethyl phthalate, dioctyl phthalate, dibutyl phthalate, di-2-ethylhexyl terephthalate, dicyclohexyl phthalate, dicyclohexyl terephthalate, methylphthalylmethyl glycolate, ethylphthalylethyl glycolate, propylphthalylpropyl glycolate and butylphthalylbutyl glycolate), a polybasic carboxylic ester type plasticizer such as a citric type plasticizer (such as acetyltrimethyl citrate, acetyltriethyl citrate and acetyltributyl citrate), and a hydrocarbon ester type plasticizer.

A carbonhydrate ester type plasticizer will now be explained. Carbonhydrate means monosaccharide, disaccharide or trisaccharide in which saccharide is present in a state of pyranose or furanose (6-member ring or 5-member ring). Unlimited examples of carbohydrate include glucose, saccharose, lactose, cellubiose, mannose, xylose, ribose, galactose, arabinose, fructose, sorbose, cellotriose and raffinose. Carbohydrate ester indicates those, in which a hydroxyl group of carbonhydrate and carboxylic acid are dehydration condensed to form an ester compound, and, more specifically, indicates aliphatic carboxylic ester or aromatic carboxylic ester. Aliphatic carboxylic acid includes such as acetic acid and propionic acid, and aromatic carboxylic acid includes such as benzoic acid, toluoylic acid and anisic acid. Carbohydrate is provided with hydroxyl groups of corresponding number to the type, however, either a part of hydroxyl group and carboxylic acid may react to form an ester compound or the whole hydroxyl group and carboxylic acid react to form an ester compound. In the present invention, it is preferable that the whole hydroxyl group and carboxylic acid react to form an ester compound.

Specific examples of carbonhydrate ester type plasticizer preferably include such as glucose peritaacetate, glucose pentapropionate, glucose pentabutyrate, saccharose octaacetate and saccharose octabenzoate, and among them saccharose octaacetate is more preferable.

Further, a polymer plasticizer includes, for example, aliphatic hydrocarbon type polymer; alicyclic hydrocarbon type polymer; acryl type polymer such as polyethylacrylate, polymethylmethacrylate, and copolymer of methylmethacrylate and 2-hydroxyethylmethacrylate (for example, an arbitrary copolymerization ratio in a range of 1/99-99/1); vinyl type polymer such as polyvinyl isobutyl ether and poly-N-vinyl pyrrolidone; styrene type polymer such as polystyrene and poly-4-hydroxystyrene; polyether such as polyethyleneoxide and polypropyleneoxide; polyamide; polyurethane and polyurea.

Cellulose ester film of the present invention is preferably contains 1-25 mass parts of the total addition amount of a compound represented by aforesaid B (an ester compound obtained by condensing organic acid represented by aforesaid formula (1) and polyalcohol) and a compound represented by aforesaid C (aliphatic polyester or aliphatic-aromatic copolyester) against cellulose ester. A flatness improvement effect is not recognized in the case of not more than 1 mass part, while bleed-out is liable to generate in the case of not less than 25 mass parts. A ratio of a compound represented by aforesaid B to a compound represented b aforesaid C is preferably 5/95-95/5 and more preferably 70/30-30/70. Tinting of film will deteriorate when a ratio of a compound represented by aforesaid B is over 95%, while prepared film is liable to be brittle when a ratio of a compound represented by aforesaid C is over 95%. In the case of utilizing a plasticizer conventionally well known in the art together, the ratio is preferably set to not more than 20% against the total amount of a compound represented by aforesaid B and a compound represented by aforesaid C, and further the total addition amount of a plasticizer is preferably 1-25 weigh parts against cellulose ester.

<Explanation for Antioxidant>

The cellulose ester of the present invention preferably contains an antioxidant. The coloring or reduction of strength of the formed material due to the heat or deterioration by oxidation in the forming process can be prevented without lowering the transparency or the heat-resistant property by incorporating an antioxidant in a cellulose ester film.

In the present invention, it is also preferable to use an antioxidant in a suspension-washing process of cellulose ester using a poor solvent. Any antioxidant are employable without limitation, as far as the used antioxidant inactivates radicals generated in cellulose ester, or the antioxidant restrains deterioration of cellulose ester due to oxygen added to the generated radicals.

An antioxidant utilized in the suspension-washing of cellulose ester may remain in cellulose ester after washing. The remaining amount is preferably 0.01-2,000 ppm, more preferably 0.05-1,000 ppm and furthermore preferably 0.1-100 ppm. As a useful antioxidant in the present invention, a compound which restrains deterioration of the material for forming a cellulose ester film due to oxygen can be utilized without limitation, however, examples of a useful compound include: a phenol compound, a hindered amine compound, a phosphorus-containing compound, a sulfur-containing compound, a heat resistant processing stabilizer and an oxygen scavenger.

Specifically preferable among them are a phenol compound, a hindered amine compound and a phosphorus-containing compound.

As the antioxidant, more preferable is that at least one hindered phenol antioxidant and at least one phosphorus-containing antioxidant are contained, and specifically preferable is that a compound represented by Formula (2) is contained in addition to the hindered phenol compound and the phosphorus-containing compound.

Antioxidants usable in the present invention will be exemplified below, however, the antioxidant is not limited thereto, and those commonly utilized may be appropriately employed, (Hindered Phenol Antioxidants)

The hindered phenol antioxidant has a structure having a large branched alkyl group at the ortho position of the hydroxyl group of a phenol compound.

Examples of the antioxidant include known hindered phenol antioxidant compounds such as 2-6-dialkyl phenol derivatives and the like which are described in columns 12 14 of the specification of U.S. Pat. No. 4,839,405. These compounds include those represented by the Formula (A) below.

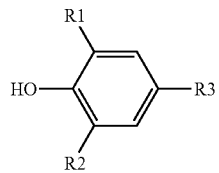

Formula (A)

In the formula, R1, R2 and R3 each represent an alkyl group substituent which may or may not be further substituted.

Specific examples of the hindered phenol compound include n-octadecyl 3-(3,5-di-t-butyl-4-hydroxyphenyl)-propionate, n-octadecyl 3-(3,5-di-t-butyl-4-hydroxyphenyl)-acetate, n-octadecyl 3,5-di-t-butyl-4-hydroxybenzoate, n-hexyl 3,5-di-t-butyl-4-hydroxybenzoate, n-hexyl 3,5-di-t-butyl-4-hydroxyphenylbenzoate, n-dodecyl 3,5-di-t-butyl-4-hydroxyphenylbenzoate, neo-dodecyl 3-(3,5-di-t-butyl-4-hydroxyphenyl)propionate, dodecyl β(3,5-di-t-butyl-4-hydroxyphenyl)propionate, ethyl α-(4-hydroxy 3,5-di-t-butylphenyl)isobutyrate, octadecyl α-(4-hydroxy 3,5-di-t-butylphenyl)isobutyrate, octadecyl α-(4-hydroxy 3,5-di-t-butyl-4-hydroxyphenyl)propionate, 2-(n-octylthio) ethyl 3,5-di-t-butyl-4-hydroxy-benzoate, 2-(n-octyl thio) ethyl 3,5-di-t-butyl-4-hydroxy-phenyl acetate, 2-(n-octadecyl thio) ethyl 3,5-di-t-butyl-4-hydroxy-phenyl-acetate, 2-(n-octadecyl thio)ethyl 3,5-di-t-butyl-4-hydroxy-benzoate, 2-(2-hydroxy ethyl thio)ethyl 3,5-di-t-butyl-4-hydroxy-benzoate, diethyl glycol bis(3,5-di-t-butyl-4-hydroxy-phenyl)propionate, 2-(n-octadecyl thio)ethyl 3-(3,5-di-t-butyl-4-hydroxy-phenyl)propionate, stearamide N,N-bis-[ethylene 3-(3,5-di-t-butyl-4-hydroxy-phenyl)propionate], n-butyl imino N,N-bis-[ethylene 3-(3,5-di-t-butyl-4-hydroxy-phenyl) propionate], 2-(2 stearoyloxyethylthio)ethyl 3,5-di-t-butyl-4-hydroxy benzoate, 2-(2-stearoyloxyethylthio)ethyl 7-(3-methyl-5-t-butyl-4-hydroxy-phenyl)heptanoate, 1,2-propylene glycol bis-[3-(3,5-di-t-butyl-4-hydroxy-phenyl) propionate], ethylene glycol bis-[3-(3,5-di-t-butyl-4-hydroxy-phenyl)propionate], neopentyl glycol bis-[3-(3,5-di-t-butyl-4-hydroxyphenyl)propionate], ethylene glycol bis-(3, 5-di-t-butyl-4-hydroxyphenyl acetate), glycerine-1-n-octadecanoate-2,3-bis-(3,5-di-t-butyl-4-hydroxyphenyl acetate), pentaerythritol-tetrakis[3-(3',5'-di-t-butyl-4'-hydroxyphenyl)propionate], 1,1,1-trimethyrol ethane tris[3-(3, 5-di-t-butyl-4-hydroxyphenyl)propionate], sorbitol hexa-[3-(3,5-di-t-butyl-4-hydroxyphenyl)propionate], 2-hydroxyyethyl 7-(3-methyl-5-t-butyl-4-hydroxyphenyl) propionate, 2-stearoyloxyethyl 7-(3-methyl-5-t-butyl-4-hydroxyphenyl)heptanoate, 1,6-n-hexanediol-bis[(3',5'-di-t-butyl-4-hydroxyphenyl)propionate], pentaerythritol-tetrakis (3,5-di-t-butyl-4-hydroxy hydroxinamate). The hindered phenol antioxidant compounds of the type listed above are commercially available as "Irganox 1076" and "Irganox 1010" manufactured by Ciba Specialty Chemicals.

(Hindered Amine Compound)

In the present invention, a hindered amine compound represented by following Formula (B) can be used as one of the antioxidants.

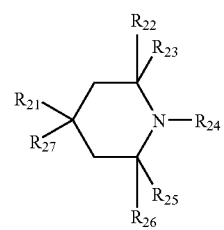

Formula (B)

In Formula (B), $R_{21}$-$R_{27}$ each represent a hydrogen atom or a substituent. The substituent is not specifically limited. Examples of the substituent include: a halogen atom (for example, a fluorine atom and a chlorine atom), an alkyl group (for example, a methyl group, an ethyl group, an isopropyl group, a hydroxyethyl group, a methoxy methyl group, a trifluoro methyl group and a t-butyl group), a cycloalkyl group (for example, a cyclopentyl group and a cyclohexyl group), an aralkyl group (for example, a benzyl group and a 2-phenethyl group), an aryl group (for example, a phenyl group, a naphthyl group, p-tolyl group and a p-chlorophenyl group), an alkoxy group (for example, a methoxy group, an ethoxy group, an isopropoxy group and a butoxy group), an aryloxy groups (for example, a phenoxy group), a cyano group, an acylamino group (for example, an acetylamino group and a propionylamino group), an alkylthio group (for example, a methylthio group, an ethylthio group and a butylthio group), an arylthio group (for example, a phenylthio group), a sulfonylamino group (for example, a methanesulfonylamino group and a benzene sulfonyl amino group), an ureido group (for example, a 3-methylureido group, a 3,3-dimethylureido group and a 1,3-dimethylureido group), a sulfamoylamino group (for example, a dimethylsulfamoyl amino group), a carbamoyl group (for example, a methylcarbamoyl group, an ethylcarbamoyl group and a dimethylcarbamoyl group), a sulfamoyl group (for example, an ethylsulfamoyl group and a dimethylsulfamoyl group), an alkoxycarbonyl group (for example, a methoxycarbonyl group and an ethoxycarbonyl group), an aryloxycarbonyl group, (for example, a phenoxycarbonyl group), a sulfonyl group (for example, a methanesulfonyl group, a butane sulfonyl group and a phenylsulfonyl group), an acyl group (for example, an acetyl group, a propanoyl group and a butyroyl group), an amino group (for example, a methylamino group, an ethylamino group and a dimethylamino group), a cyano group, a hydroxy group, a nitro group, a nitroso group, an amineoxide group (for example, a pyridine oxide group), an imide group (for example, a phthalimide group), disulfide group (for example, a benzene disulfide group and a benzothiazolyl-2-disulfide group), a carboxyl group, a sulfo group and a heterocycle group (for example, a pyrrole group, a pyrrolidyl group, a pyrazolyl group, an imidazolyl group, a pyridyl group, a benzimidazolyl group, a benzthiazolyl group and a benzoxazolyl group). These substituents may be further substituted. $R_{24}$ is preferably a hydrogen atom or a methyl group, $R_{27}$ is preferably a hydrogen atom and $R_{22}$, $R_{23}$, $R_{25}$ and $R_{26}$ each are preferably a methyl group.

Examples of a hindered amine compound include: bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(N-octoxy-2,2,6,6-tetramethyl-4-piperidyl)sebacate, bis(N-benzyloxy2,2,6,6-tetramethyl-4-piperidyl)sebacate, bis(N-cyclohexyloxy-2,2,6,6-tetramethyl-4-piperidyl)sebacate, bis(1,2,2,6,6-pentamethyl-4-piperidyl)-2-(3,5-di-t-butyl-4-hydroxybenzyl)-2-butylmalonate, bis(1-acroyl-2,2,6,6-tetramethyl-4-piperidyl)-2,2-bis(3,5-di-t-butyl-4-hydroxybenzyl)-2-butylmalonate, bis(1,2,2,6,6-pentamethyl-4-piperidyl)decanedioate, 2,2,6,6-tetramethyl-4-piperidylmethacrylate, 4-[3-(3,5-di-t-butyl-4-hydroxyphenyl) propionyloxy]-1-[2-(3-(3,5-di-t-butyl-4-hydroxyphenyl) propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl) propioneamide, tetrakis(2,2,6,6-tetramethyl-4-piperidyl)-1,2,3,4-butanetetracarboxylate and tetrakis(1,2,2,6,6-pentamethyl-4-piperidyl)-1,2,3,4-butanetetracarboxylate.

Also, a polymer compound is usable, examples of which include: N,N',N",N"'-tetrakis[4,6-bis-[butyl(N-methyl-2,2,6,6-tetramethylpiperidine-4-yl) amino]-triazine-2-yl]-4,7-diazadecane-1,10-diamine; a polycondensation compound of dibutylamine, 1,3,5-triazine N,N'-bis(2,2,6,6-tetramethyl-4-piperidyl)-1,6-hexamethylenediamine and N-(2,2,6,6-tetramethyl-4-piperidyl)butylamine; a polycondensation compound of dibutylamine, 1,3,5-triazine and N,N'-bis(2,2,6,6-tetramethyl-4-piperidyl) butylamine; poly[{(1,1,3,3-tetramethylbutyl)amino-1,3,5-triazine-2,4-diyl} {(2,2,6,6-tetramethyl-4-piperidyl)imino} hexamethylene{(2,2,6,6-tetramethyl-4-piperidyl)imino}]; a polycondensation compound of 1,6-hexanediamine-N,N'-bis(2,2,6,6-tetramethyl-4-piperidyl) and morpholine-2,4,6-trichloro-1,3,5-triazine; a high molecular weight HALS in which plurality of piperidine rings are combined via a triazine moiety, such as poly[(6-morpholino-s-triazine-2,4-diyl)][(2,2,6,6-tetramethyl-4-piperidyl)imino]-hexamethylene [(2,2,6,6-tetramethyl-4-piperidyl)imino]]; a polymer of dimethyl succinate and 4-hydroxy-2,2,6,6-tetramethyl-1-piperidineethanol; and a compound in which a piperizine ring is combined via a ester bond, such as a mixed ester compound of 1,2,3,4-butanetetracarboxylic acid and 1,2,2,6,6-pentamethyl-4-piperizinol and 3,9-bis(2-hydroxy-1,1-dimethylethyl)-2,4,8,10-tetraoxaspiro[5,5]undecane, however, the present invention is not limited thereto.

Among these compounds, preferable are, for example, a polycondensation compound of dibutylamine, 1,3,5-triazine and N,N'-bis(2,2,6,6-tetramethyl-4-piperidyl)butylamine; poly[{(1,1,3,3-tetramethylbutyl)amino-1,3,5-triazine-2,4-diyl} {(2,2,6,6-tetramethyl-4-piperidyl) imino}hexamethylene{(2,2,6,6-tetramethyl-4-piperidyl) imino}]; and a polymer of dimethyl succinate and 4-hydroxy-2,2,6,6-tetramethyl-1-, which have a number average molecular weight (Mn) of 2,000-5,000.

Above hindered-phenol compounds have been commercialized, for example, as "Tinuvin144" and "Tinuvin770" from Ciba Specialty Chemicals, Inc.; and as "ADK STAB LA-52" from Asahi Denka Co., Ltd.

(Phosphorus-Containing Antioxidant)

Examples of a preferable phosphor-containing compound include compounds represented by Formulas (C-1), (C-2), (C-3), (C-4), and (C-5).

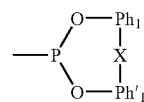

Formula (C-1)

In the Formula, $Ph_1$ and $Ph'_1$ each represent a substituent. More preferably, $Ph_1$ and $Ph'_1$ each represent a phenylene group, and the hydrogen atom of the phenylene group may be replaced with a phenyl group, an alkyl group having 1 to 8 carbon atoms, a cycloalkyl group having 5 to 8 carbon atoms, an alkylcycloalkyl group having 6 to 12 carbon atoms, or an aralkyl group having 7 to 12 carbon atoms. $Ph_1$ and $Ph'_1$ may be mutually the same, or may be different. X represents a single bond, a sulfur atom, or a —$CHR_6$-group. $R_6$ represents a hydrogen atom, an alkyl group having 1 to 8 carbon atoms, or a cycloalkyl group having 5 to 8 carbon atoms. Further, these groups may be substituted with any of the substituents common to those described for the substituents represented by $R_{21}$-$R_{27}$ of Formula (B).

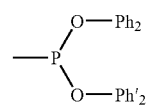

Formula (C-2)

In the Formula, $Ph_2$ and $Ph'_2$ each represent a hydrogen atom or a substituent. Examples of the substituents include; a halogen atom (for example, a fluorine atom and a chlorine atom), an alkyl group (for example, a methyl group, an ethyl group, an isopropyl group, a hydroxyethyl group, a methoxy methyl group, a trifluoro methyl group and a t-butyl group), a cycloalkyl group (for example, a cyclopentyl group and a cyclohexyl group), an aralkyl group (for example, a benzyl group and a 2-phenethyl group), an aryl group (for example, a phenyl group, a naphthyl group, p-tolyl group and a p-chlorophenyl group), an alkoxy group (for example, a methoxy group, an ethoxy group, an isopropoxy group and a butoxy group), an aryloxy groups (for example, a phenoxy group), a cyano group, an acylamino group (for example, an acetylamino group and a propionylamino group), an alkylthio group (for example, a methylthio group, an ethylthio group and a butylthio group), an arylthio group (for example, a phenylthio group), a sulfonylamino group (for example, a methanesulfonylamino group and a benzene sulfonyl amino group), an ureido group (for example, a 3-methylureido group, a 3,3-dimethylureido group and a 1,3-dimethylureido group), a sulfamoylamino group (for example, a dimethylsulfamoyl amino group), a carbamoyl group (for example, a methylcarbamoyl group, an ethylcarbamoyl group and a dimethylcarbamoyl group), a sulfamoyl group (for example, an ethylsulfamoyl group and a dimethylsulfamoyl group), an alkoxycarbonyl group (for example, a methoxycarbonyl group and an ethoxycarbonyl group), an aryloxycarbonyl group, (for example, a phenoxycarbonyl group), a sulfonyl group (for example, a methanesulfonyl group, a butane sulfonyl group and a phenylsulfonyl group), an acyl group (for example, an acetyl group, a propanoyl group and a butyroyl group), an amino group (for example, a methylamino group, an ethylamino group and a dimethylamino group), a cyano group, a hydroxy group, a nitro group, a nitroso group, an amineoxide group (for example, a pyridine oxide group), an imide group (for example, a phthalimide group), disulfide group (for example, a benzene disulfide group and a benzothiazolyl-2-disulfide group), a carboxyl group, a sulfo group and a heterocycle group (for example, a pyrrole group, a pyrrolidyl group, a pyrazolyl group, an imidazolyl group, a pyridyl group, a benzimidazolyl group, a benzthiazolyl group and a benzoxazolyl group). These substituents may further be substituted. More preferably, $Ph_2$ and $Ph'_2$ each represent a phenyl group or a biphenyl group, and a hydrogen atom of the phenyl group or the biphenyl group may be replaced with an alkyl group having 1 to 8 carbon atoms, an cycloalkyl group having 5 to 8 carbon atoms, an alkylcycloalkyl group having 6 to 12 carbon atoms or an aralkyl group having 7 to 12 carbon atoms. $Ph_2$ and $Ph'_2$ may be mutually the same or may be different, and $Ph_2$ and $Ph'_2$ may further be substituted with any of the substituents which are common to the abovementioned substituents represented by $Ph_2$ and $Ph'_2$.

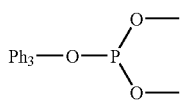

Formula (C-3)

In the Formula, $Ph_3$ represents a hydrogen atom or a substituent. The examples of the substituent are common to the abovementioned substituents represented by $Ph_2$ and $Ph'_2$. More preferably, $Ph_3$ represents a phenyl group or a biphenyl group, and a hydrogen atom of the phenyl group or the biphenyl group may be replaced with an alkyl group having 1 to 8 carbon atoms, an cycloalkyl group having 5 to 8 carbon atoms, an alkylcycloalkyl group having 6 to 12 carbon atoms or an aralkyl group having 7 to 12 carbon atoms. These substituents may further be substituted with any of the substituents which are common to the abovementioned substituents represented by $Ph_2$ and $Ph'_2$.

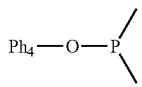

Formula (C-4)

In the Formula, $Ph_4$ represents a hydrogen atom or a substituent. The examples of the substituent are common to the abovementioned substituents represented by $Ph_2$ and $Ph'_2$. More preferably, $Ph_4$ represents an alkyl group having 1 to 20 carbon atoms or a phenyl group. The alkyl group or a phenyl group may further be substituted with any of the substituents which are common to the abovementioned substituents represented by $Ph_2$ and $Ph'_2$.

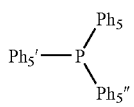

Formula (C-5)

In the formula, $Ph_5$, $Ph'_5$, and $Ph''_5$ each represent a hydrogen atom or a substituents. The examples of the substituent are common to the abovementioned substituents represented by $Ph_2$ and $Ph'_2$. More preferably, $Ph_5$, $Ph'_5$, and $Ph''_5$ each represent an alkyl group having 1 to 20 carbon atoms or a phenyl group. The alkyl group or the phenyl group may further be substituted with any of the substituents which are common to the abovementioned substituents represented by $Ph_2$ and $Ph'_2$.

Examples of a phosphorus-containing compound include: mono-phosphite compounds such as triphenyl phosphite, diphenylisodecyl phosphate, phenyldiisodecyl phosphate, tris(nonylphenyl) phosphate, tris(dinonylphenyl) phosphate, tris(2,4-di-t-butylphenyl) phosphite, 10-(3,5-di-t-butyl-4-hydroxybenzyl)-9,10-dihydro-9-oxa-10-phosphaphenanthrene-10-oxide, 6-[3-(3-t-butyl-4-hydroxy-5-methylphenyl)propoxy]-2,4,8,10-tetra-t-butyldibenz[d,f][1.3.2] dioxaphosphepin and tridecyl phosphite; diphosphite compounds such as 4,4'-. butylidene-bis(3-methyl-6-t-butylphenyl-di-tridecyl phosphite) and 4,4'-isopropylidene-bis (phenyl-di-alkyl (C12-C15) phosphite); phosphonite compounds such as triphenyl phosphonite, tetrakis(2,4-di-tert-butylphenyl)[1,1-biphenyl]-4,4'-diylbisphosphonite and tetrakis(2,4-di-tert-butyl-5-methylphenyl)[1,1-biphenyl]-4,4'-diylbisphosphonite; phosphinite compounds such as triphenyl phosphinite and 2,6-dimethylphenyldiphenyl phosphinite; and phosphine compounds such as triphenyl phosphine and tris(2,6-dimethoxyphenyl) phosphine.

Examples of above-mentioned type phosphorus-containing compound commercially available include: "Sumilizer GP" from Sumitomo Chemical Co., Ltd.; "ADK STAB PEP-24G", "ADK STAB PEP-36" and "ADK STAB 3010" from Asahi Denka Co., Ltd.; and "IRGAFOS P-EPQ" Ciba Specialty Chemicals, Inc and GSY-P101.

(Sulfur-Containing Compound)

In the present invention, a sulfur-containing compound represented by Formula (D) is preferably used as one of the useful antioxidants.

$$R_{31}-S-R_{32}$$ Formula (D)

In Formula (D), $R_{31}$ and $R_{32}$ each represent a hydrogen atom or a substituent. The examples of the substituent are common to the abovementioned substituents represented by $Ph_2$ and $Ph'_2$. These substituents may further be substituted with the same substituents.

Examples of a sulfur-containing compound include: dilauryl-3,3-thio-dipropionate, dimyristyl-3,3'-thiodipropionate, distearyl-3,3-thio-dipropionate, laurylstearyl-3,3-thiodipropionate, pentaerythritol-tetrakis (β-lauryl-thiopropionate), 3,9-bis(2-dodecylthioethyl)-2,4,8,10-tetraoxaspiro[5,5]undecane.

The above sulfur-containing compounds have been commercialized, for example, as "Sumilezer TPL-R" and "Sumilezer TP-D" from Sumitomo Chemical Co., Ltd.

As a heat resistant processing stabilizer, for example, 2-t-butyl-6-(3-t-butyl-2-hydroxy-5-methylbenzyl)-4-methylphenyl acrylate, 2-[1-(2-hydroxy3,5-di-t-pentylphenyl) ethyl]-4,6-di-t-pentylphenyl acrylate are cited. The above type of heat resistant processing stabilizers are commercialized as product names of "Sumilizer GM" and "Sumilizer GS" from Sumitomo Chemical Co., Ltd.

The adding amount of each of the compounds represented by Formulas (A), (B), (C-1)-(C-5), (D), and the heat resistant processing stabilizer is preferably 0.1-10% by mass, more preferably 0.2-5% by mass, and still more preferably 0, 2-2% by mass, based on the mass of cellulose ester. Two or more types of antioxidants may be used in combination.

Further, a compound represented by Formula (2) is preferably added.

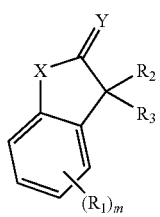

Formula (2)

In above Formula (2), $R_1$ represents a substituent. The substituent represented by $R_1$ is not specifically limited. The substituent has the same meaning as the substituent defined for the substituent represented by $Ph_2$ and $Ph'_2$. These substituents may further be substituted with the same substituents.

In above Formula (2), as a substituent represented by Formula (2), preferable are an alkyl group and an aryl group, wherein an alkyl group is more preferable, and specifically preferable are tertiary alkyl groups such as a t-butyl group, a t-amyl group and a 1,1,3,3-tetramethylbutyl group.

In Formula (2), m represents an integer of 0 to 4, and, when m is 2 or more, plural $R_1$ groups may be the same or different. Preferably, m is 1 or 2.

In Formula (2), $R_2$ and $R_3$ each represent a hydrogen atom or a substituent. The substituents represented by $R_2$ and $R_3$ are not specifically limited. These substituents have the same meaning as the substituent defined for the substituent represented by $Ph_2$ and $Ph'_2$. These substituents may further be substituted with the same substituents. Preferable as a substituent represented by $R_2$ and $R_3$ are an alkyl group and an aryl group, wherein an alkyl group is more preferable, and specifically preferable is an aryl group substituted with an alkyl group, a halogen atom, an alkoxy group or a hydroxyl group.

In Formula (2), preferable is that one of $R_2$ and $R_3$ is a hydrogen atom and the other is a substituent, more preferably one is a hydrogen atom and the other is an alkyl group or an aryl group, and specifically preferably one is a hydrogen atom and the other is an aryl group. $R_2$ and $R_3$ may be combined to form a substituent comprising a double bond. In Formula (2), X and Y each represent N—R (wherein R represents a hydrogen atom or a substituent), an oxygen atom or a sulfur atom wherein X and Y may be the same or different. X and Y each are preferably an oxygen atom and more preferably X and Y each are simultaneously an oxygen atom. The substituent represented by R has the same meaning as the substituent defined for the substituent represented by $Ph_2$ and $Ph'_2$. These substituents may further be substituted with the same substituents.

In Formula (2), at least one of $R_1$-$R_3$ may be a group having a polymerizable group as a substructure.

The polymerizable group as mentioned in the present invention is an ethylenically unsaturated polymerizable group, a bi-functional polycondensable group or a bi-functional polyadditionable group and preferably the ethylenically unsaturated polymerizable group, and preferable is an ethylenically unsaturated polymerizable group. Concrete examples of the ethylenically unsaturated polymerizable group include a vinyl group, an allyl group, an acryloyl group, a methacryloyl group, a styryl group, an acrylamido group, a methacrylamido group, a vinyl cyanide group, a 2-cyanoacryloxy group, a 1,2-epoxy group, a vinylbenzyl group and a vinyl ether group. The definition of "having the polymerizable group as a substructure" means that the polymerizable group is bonded directly or through a linking group of 2 or more valent. Examples of the linking group of 2 or more valent include an alkylene group (such as a methylene group, a 1,2-ethylene group, a 1,3-propylene group, a 1,4-butylene group and a cyclohexane-1,4-di-yl group), an alkenylene group (such as an ethene-1,2-di-yl group and a butadiene-1, 4-di-yl group), an alkynylene group (for example, an ethyne-1,2-diyl group, a butane 1,3-diyne-1,4-diyl group), a linking group derived from a compound including at least one aromatic group (such as a substituted or unsubstituted benzene, a condensed polycyclic hydrocarbon, an aromatic heterocyclic ring, an aromatic hydrocarbon ring aggregate and an aromatic heterocyclic ring aggregate), and a linking heteroatom (such as an oxygen atom, a sulfur atom, a nitrogen atom, a silicon atom and a phosphorus atom). Of these preferable are an alkylene group and/or a linking hetero-atom. These linking groups may be combined with each other to form a composite group.

As a polymerizable group, one having an ethylenically unsaturated group is preferable. Of these, more preferable is an acryloyl group, the methacryloyl group, or a styryl group, and specifically preferable is an acrylyl group or a methacryloyl group. Further, it is preferable that at least one of $R_1$-$R_3$ is a high molecular compound derived from a compound having a polymerizable group as a substructure. The high molecular compound (also referred to as a polymer) derived from the compound represented by Formula (2) of the present invention will be described.

When the polymer compound relating to the present invention is classified in terms of the reaction by which the polymer compound is derived from the compound represented by Formula (2) of the present invention, an addition polymer, a ring-opening-polymerization polymer, a polyaddition polymer, a polycondensation polymer, and an addition condensation polymer can be cited. In the present invention, preferable is an addition polymer or a ring-opening-polymerization polymer, and more preferable is an addition polymer. In the present invention, as an addition polymer, a vinyl polymer and a diene polymer are cited, however, preferable is a vinyl polymer.

When the polymer compound relating to the present invention is classified in terms of the shape, a one-dimensional polymer, a two-dimensional polymer, and a three-dimensional polymer can be cited. In the present invention, preferable is a one-dimensional polymer or a two-dimensional polymer, and more preferable is a one-dimensional polymer.

When the polymer compound derived from the compound represented by above Formula (2) relating to the present invention represents a polymerized compound, it may be a single polymer derived from only the compound represented by Formula (2), or may be a copolymer with other polymerizable compound. Further, the polymer compound relating to the present invention is a compound which has at least two compound units each is represented by Formula (2) even when the polymer compound is a single polymer or a copolymer. In the present invention, a copolymer is preferable.

Examples of the other polymerizable compound capable of forming a copolymer include: a styrene derivative (such as styrene, α-methylstyrene, o-methylstyrene, m-methylstyrene, p-methylstyrene and vinylnaphthalene), an acrylate derivative (such as methyl acrylate, ethyl acrylate, propyl acrylate, butyl acrylate, i-butyl acrylate, t-butyl acrylate, octyl acrylate, cyclohexyl acrylate and benzyl acrylate), a methacrylate derivative (such as methyl methacrylate, ethyl methacrylate, propyl methacrylate, butyl methacrylate, butyl methacrylate, t-butyl methacrylate, octyl methacrylate, cyclohexyl methacrylate and benzyl methacrylate), an alkyl vinyl ether (such as methyl vinyl ether, ethyl vinyl ether and butyl vinyl ether), an alkyl vinyl ester (such as vinyl formate, vinyl acetate, vinyl butylate, vinyl capronate and vinyl stearate), and an unsaturated compound such as crotonic acid, maleic acid, fumalic acid, itaconic acid, acrylonitrile, methacrylonitile, vinyl chloride, vinylidene chloride, acrylamide and methacrylamide. Methyl acrylate, methyl methacrylate, and vinyl acetate are preferable.

Further, as other compound capable of forming copolymer, a hydrophobic ethylenically unsaturated compound is cited. Such a hydrophilic ethylenically unsaturated compound is not specifically limited as far as it is a hydrophilic compound having an unsaturated double bond capable of polymerization in the molecule, and examples of such a compound include: an unsaturated carboxylic acid such as acrylic acid or methacrylic acid; an acrylate or a methacrylate having a hydroxyl group or an ether linkage (for example, 2-hydroxyethyl methacrylate, 2-hydroxypropyl methacrylate, tetrahydrofurfuryl methacrylate, 2-hydroxyethyl acrylate, 2-hydroxypropyl acrylate, 2,3-dihydroxy-2-methylpropyl methacrylate, tetrahydrofurfuryl acrylate, 2-ethoxyethyl acrylate, diethyleneglycol ethoxyl acrylate and 3-methoxy butyl acrylate); a (N-substituted) (meth)acrylamide such as acrylamide and N,N-dimethyl(meth)acrylamide; N-vinyl pyrrolidone; and N-vinyl oxazolidone.

As the hydrophobic ethylenically unsaturated compound, preferable is a methacrylate having a hydroxyl group or a carboxyl group in the molecule, and specifically preferable is 2-hydroxyethyl methacrylate, 2-hydroxypropyl methacrylate, 2-hydroxyethyl acrylate or 2-hydroxypropyl acrylate.

Further, the compound represented by Formula (2) may be copolymerized with a variety of functional group having a polymerizable group, for example, it may be copolymerized with a compound disclosed in JP-A No. 2003-113317, having a polymerizable group and a UV absorbing function.

A single compound or a combination of two or more compounds of such polymerizable compounds may be used to copolymerize with the compound represented by Formula (2).

In the present invention, when the polymer compound derived from the compound represented by above Formula (2) is a copolymer, the copolymer preferably is a three component copolymer and preferable is to contain at least one hydrophilic ethylenically unsaturated compound as a copolymer component other than the compound represented by Formula (2). The content of the hydrophilic ethylenically unsaturated compound is preferably 5-30% by mass, and more preferably 10-20% by mass.

The method of polymerization to obtain the polymer derived from the compound represented by Formula (2) is not specifically limited, and well-known methods may be widely used. Examples of such a method include: radical polymerization, anionic polymerization and cationic polymerization. As an initiator for the radical polymerization, an azo compound and a peroxide may be cited, and examples of such an initiator include: azobisisobutyl nitrile (AIBN), an azobisisobutylate diester derivative, benzoyl peroxide and hydrogen peroxide. The polymerization solvent is not specifically limited, and examples of such a solvent include: aromatic hydrocarbon solvents such as toluene and chlorobenzene; halogenated hydrocarbon solvents such as dichloroethane and chloroform; ether solvents such as tetrahydrofuran and dioxane; amide solvents such as dimethylformamide; alcohol solvents such as methanol; ester solvents such as methyl acetate and ethyl acetate; ketone solvents such as acetone, cyclohexanone and methyl ethyl ketone; and an aqueous solvent. According to the selection of a solvent, the following polymerizations can be conducted: solvent polymerization which is carried out in a homogeneous system, precipitation polymerization in which formed polymer precipitates, emulsion polymerization in which polymerization is carried out in micelles, suspension polymerization in which polymerization is carried out in a suspension, and block polymerization in some cases.

The using ratio of the compound represented by Formula (2) and the polymerizable compound capable of copolymerization with the compound is suitably selected considering the compatibility of obtained polymer with other resin or the effect of the obtained polymer on the transparency or the mechanical strength of the optical film.

In the present invention, the content of the compound represented by Formula (2) in the polymer compound derived from the compound represented by Formula (2) is preferably 1-70% by mass, and more preferably 5-60% by mass. When the content of the compound represented by Formula (2) in the polymer compound relating to the present invention is less than 1% by mass, a large amount of the polymer compound relating to the present invention is needed to obtain a desired property, whereby the transparency of the film may be lowered due to the increase in haze or the deposition of the polymer, or the mechanical strength of the film may be lost. Alternatively, when the content of the compound represented by Formula (2) in the polymer compound relating to the present invention is larger than 70% by mass, a transparent optical film may not be obtained due to the lowering of the compatibility with other polymer compound, or the workability or the productivity of the film in the production process may be lowered since the solubility of the film forming material to the solvent becomes lowered.

In the present invention, the weight average molecular weight of the polymer derived from the compound represented by Formula (2) is usually 500-100000, however, it is preferably 1000-50000, more preferably 3000-30000 and specifically preferably 5000-15000.

The weight average molecular weight of the polymer compound is determined under the following measuring conditions using gel permeation chromatography.

Solvent: Tetrahydrofuran
Equipment: HLC-8220 (manufactured by Toso Co., Ltd.)
Column: TSK gel Super HM-M (manufactured by Toso Co., Ltd.)
Column temperature: 40° C.
Sample temperature: 0.1 mass %
Injection amount: 10 µl
Flow rate: 0.6 ml/min
Correction curve: Standard polystyrene: PS-1 (manufactured by Polymer Laboratories Co., Ltd.), A correction curve based on 9 samples having Mw=2,560,000-580 was employed.

The adding amount of the compound represented by Formula (2) is preferably 0.01-10% by mass, more preferably 0.1-5% by mass and further more preferably 0.2-2% by mass based on the mass of cellulose ester. The adding amount of the polymer compound relating to the present invention is, when it is converted to the adding amount of the compound represented by Formula (2) contained in the polymer compound, preferably 0.01-10% by mass, more preferably 0.1-5% by mass and further more preferably 0.2-2% by mass based on the mass of cellulose ester. Two or more kinds of these polymer compound may be used in combination.

Next, specific examples of the compound represented by Formula (2) and the polymer compound derived from the compound represented by Formula (2) will be shown, however, the present invention is not limited thereto.

75 76
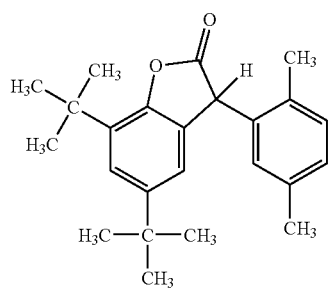  2-1  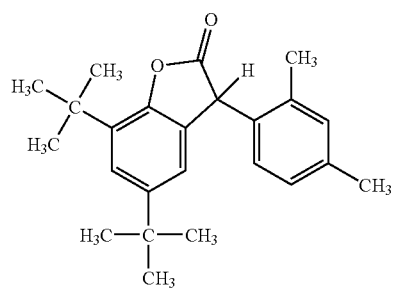  2-2
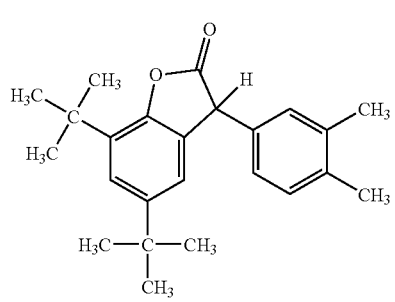  2-3  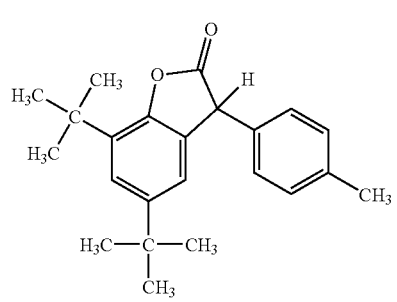  2-4
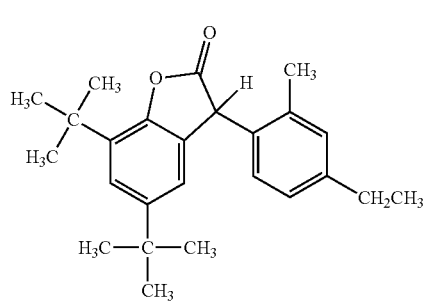  2-5  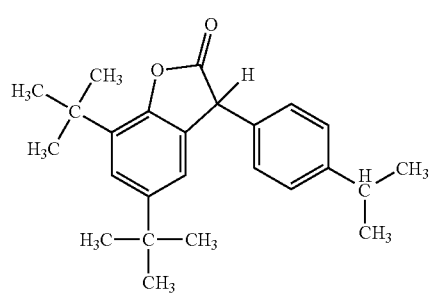  2-6
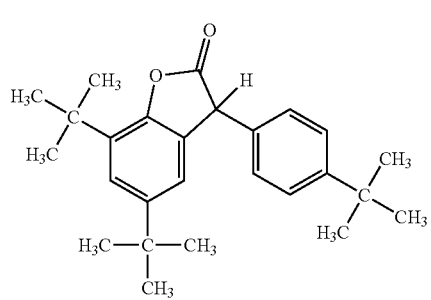  2-7  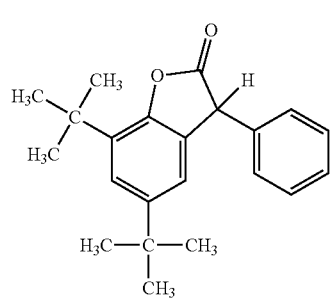  2-8
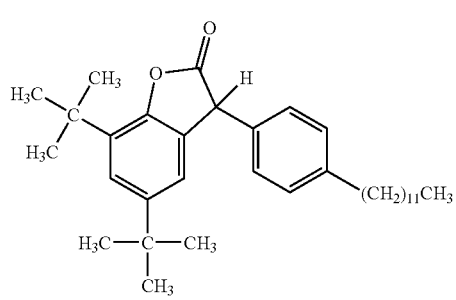  2-9  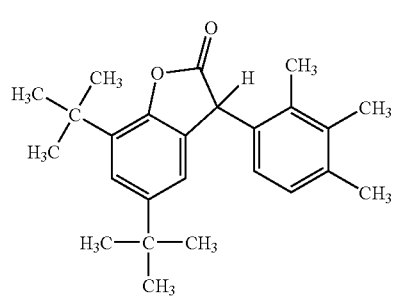  2-10

-continued
2-11
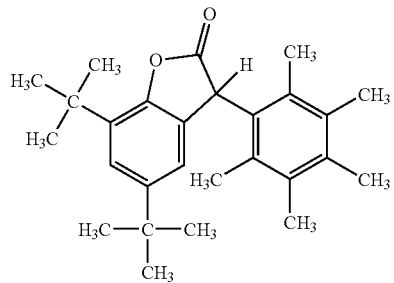
2-12
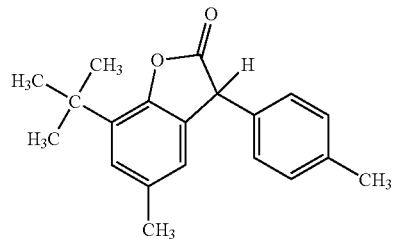
2-13
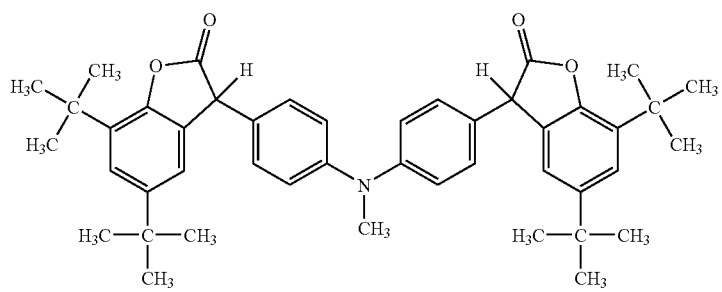
2-14
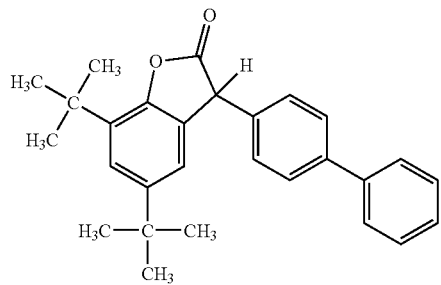
2-15
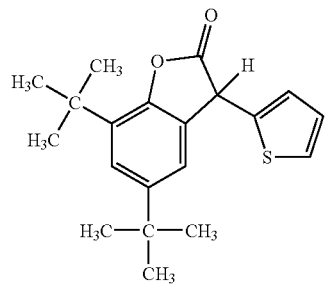
2-16
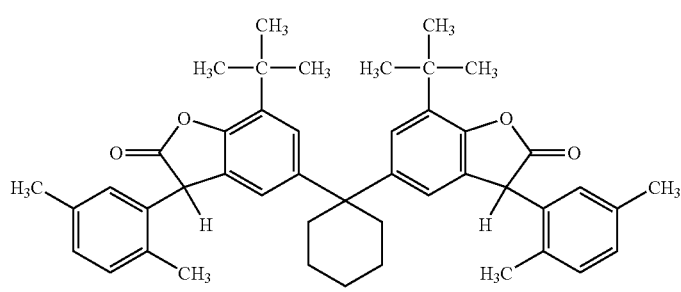
2-17
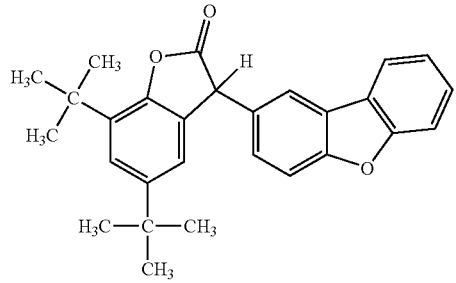
2-18
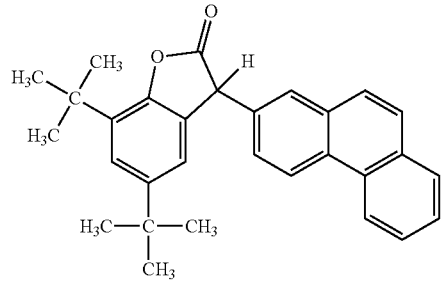

-continued
2-19
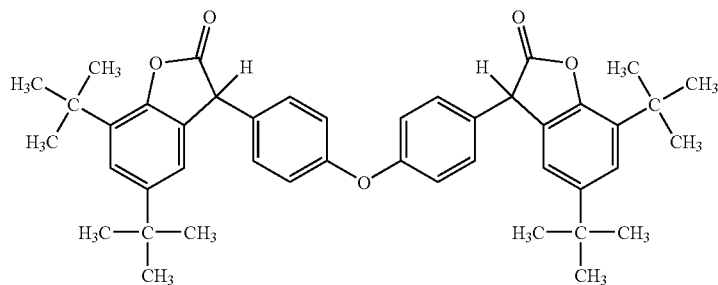
2-20
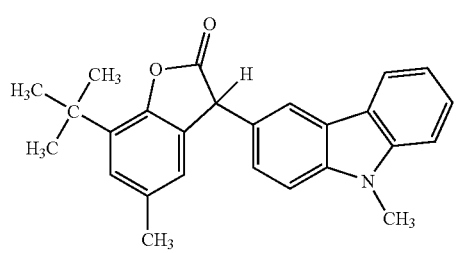
2-21
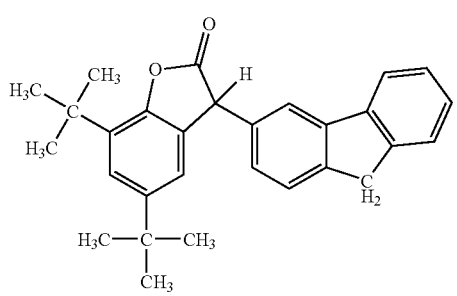
2-22
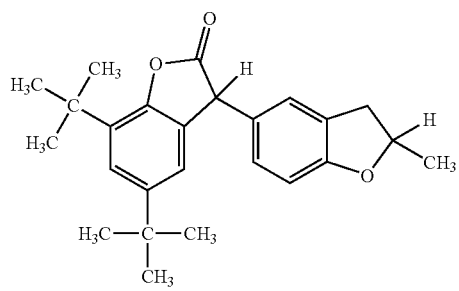
2-23
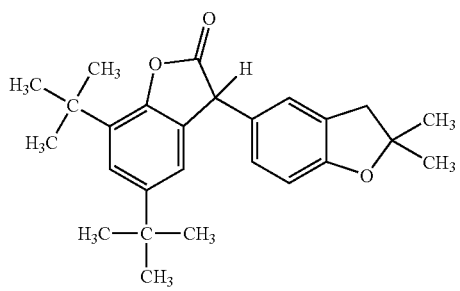
2-24
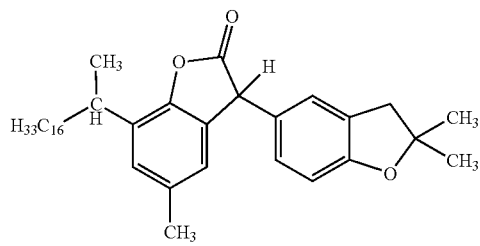
2-25
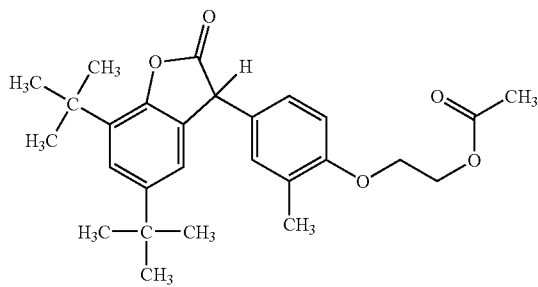
2-26
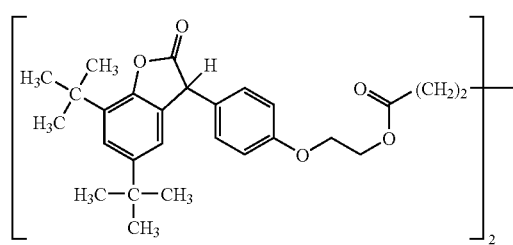
2-27
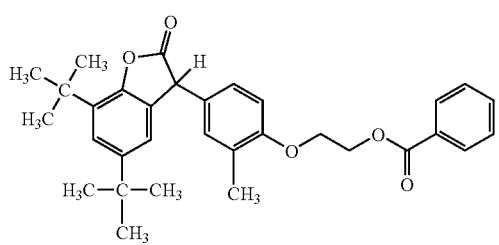

-continued
| | |
|---|---|
| 2-28 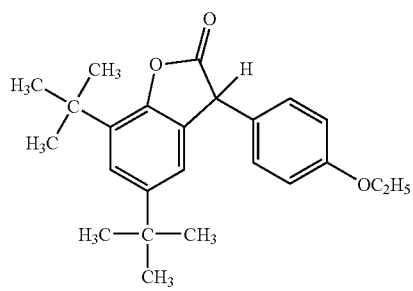 | 2-29 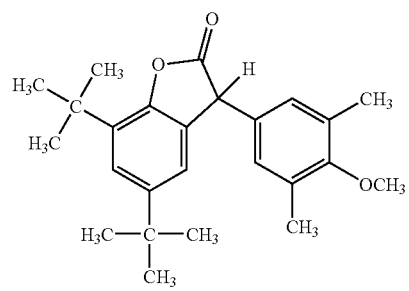 |
| 2-30 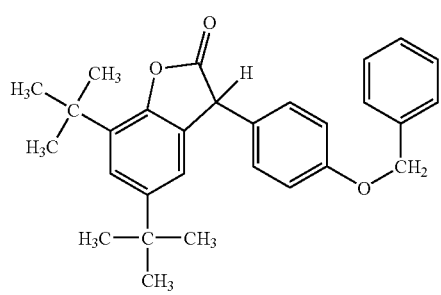 | 2-31 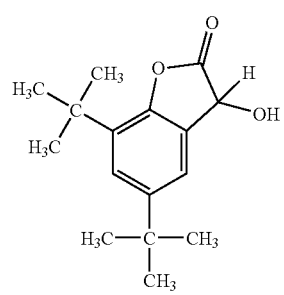 |
| 2-32 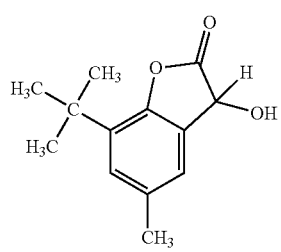 | 2-33 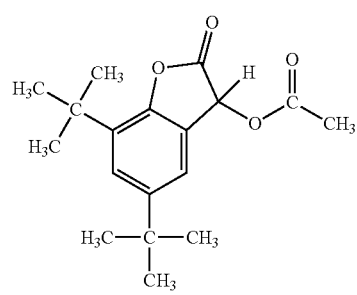 |
| 2-34 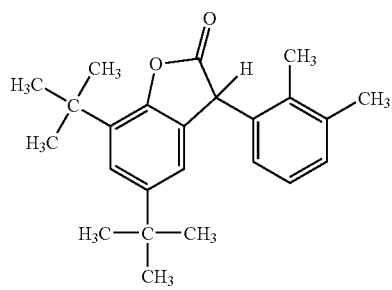 | 2-35 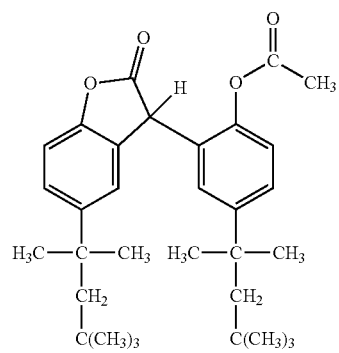 |
| 2-36 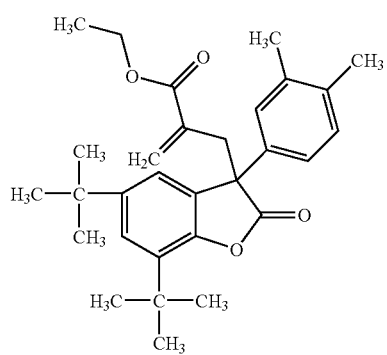 | 2-37 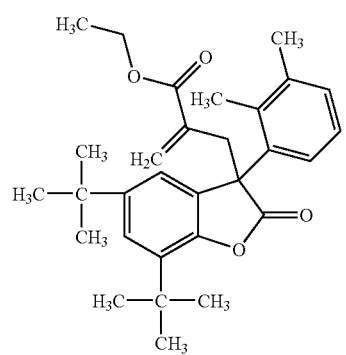 |

-continued
2-38
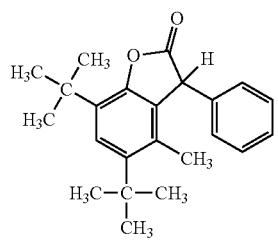
2-39
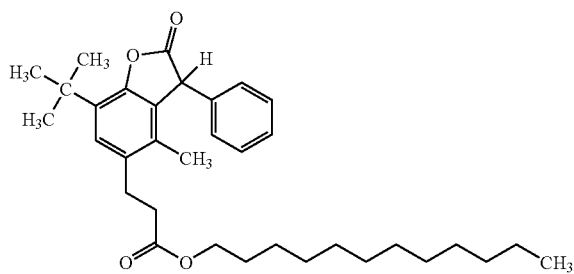
2-40
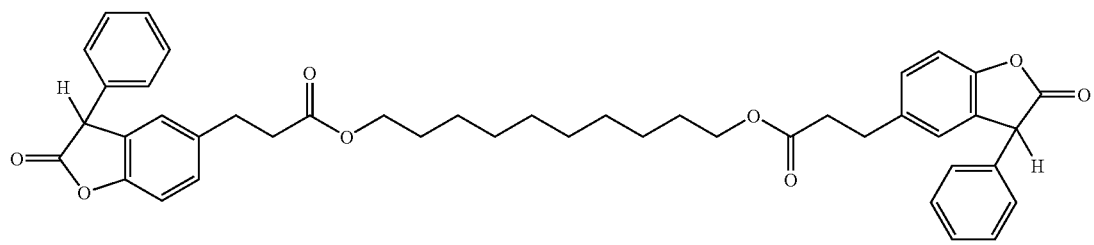
2-41
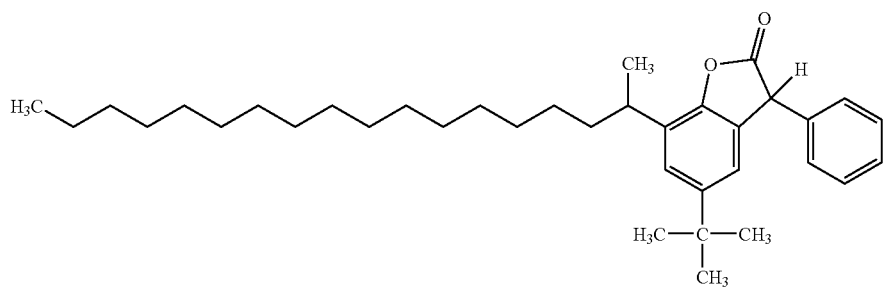
2-42
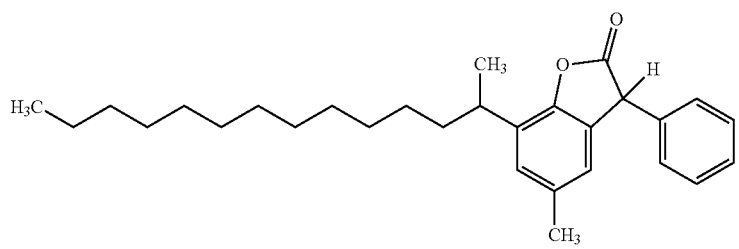
2-43
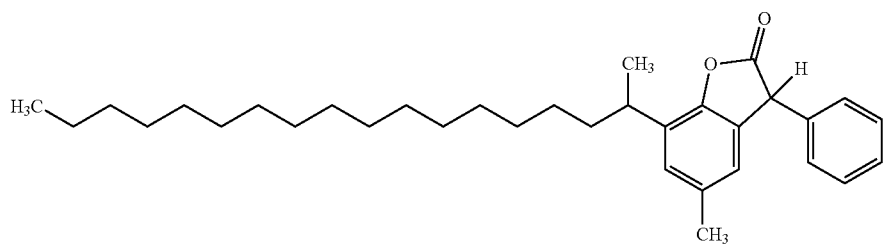
2-44
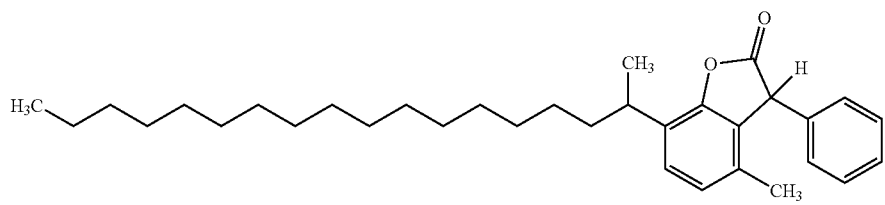

2-45 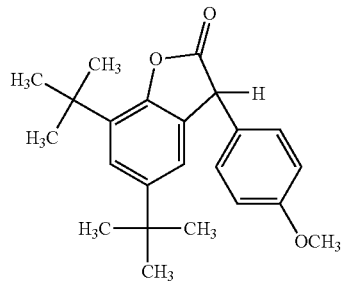
2-46 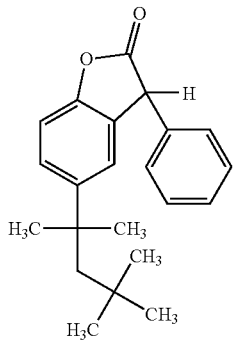
2-47 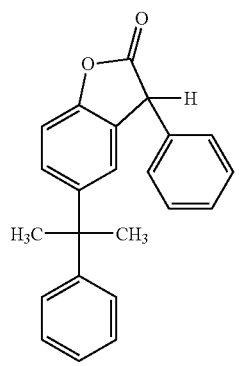
2-48 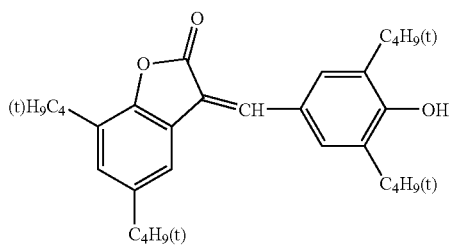
2-49 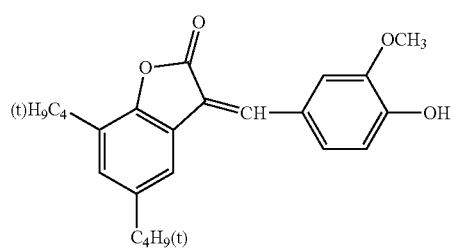
2-50 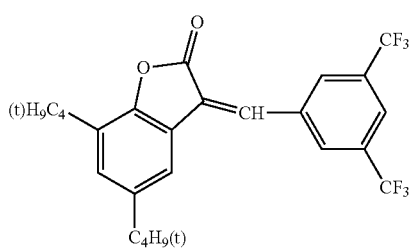
2-51 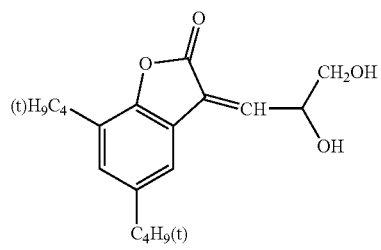
2-52 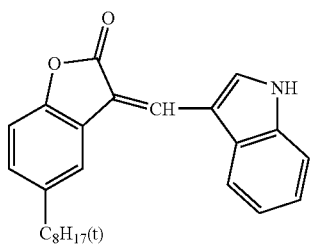
2-53 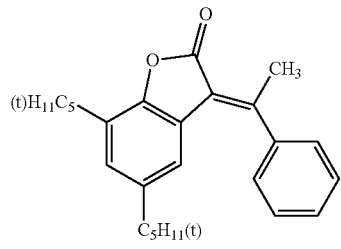
2-54 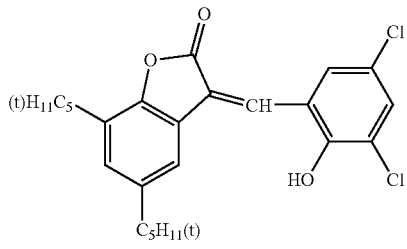

-continued
| 2-55 | 2-56 |
|---|---|
| 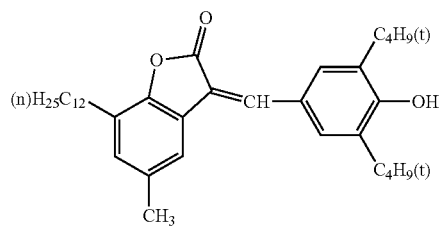 | 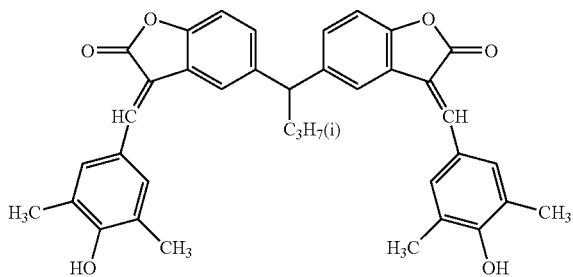 |
| 2-57 | 2-58 |
| 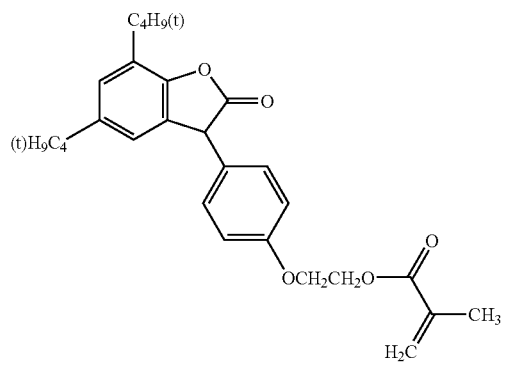 | 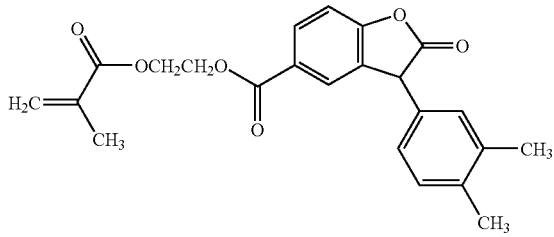 |
| 2-59 | 2-60 |
| 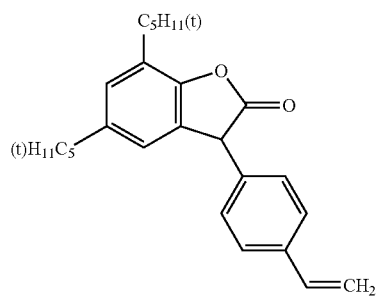 | 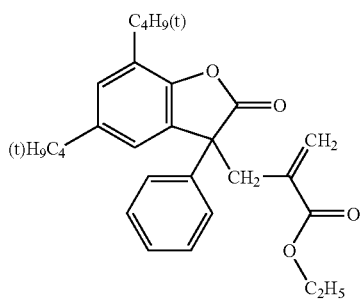 |
| 2-61 | 2-62 |
| 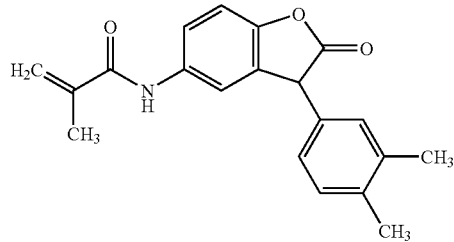 | 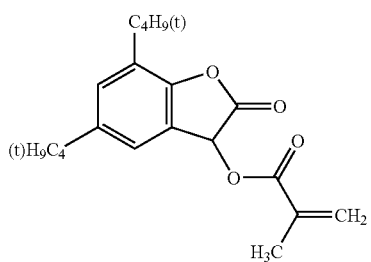 |
| 2-63 | 2-64 |
| 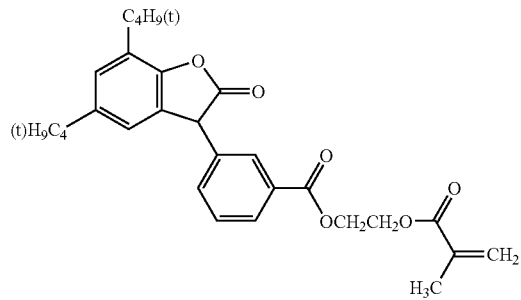 | |

-continued 2-65
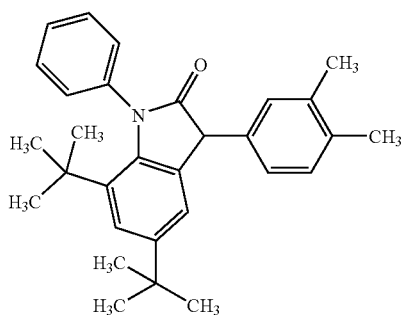

2-66
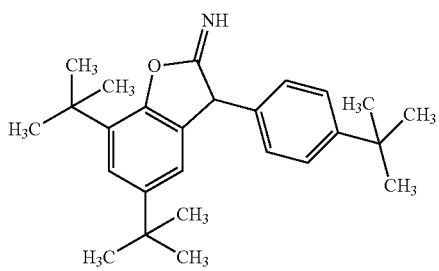

2-67
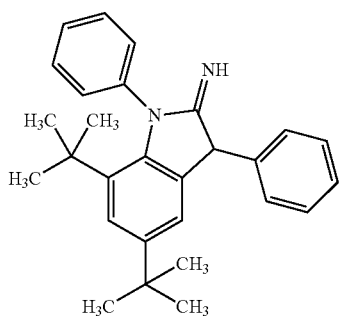

2-68
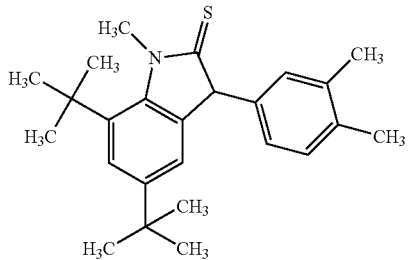

2-69
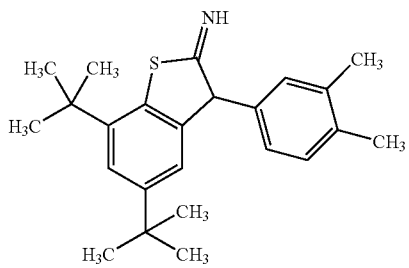

2-70
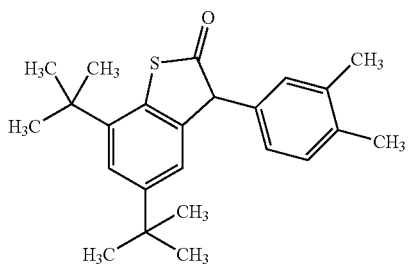

2-71
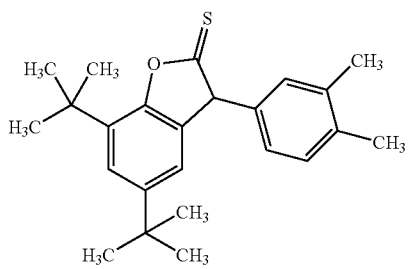

2-72
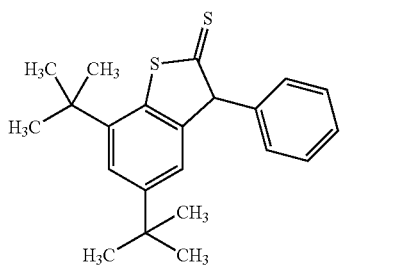

Specific examples of polymer compounds derived from the compound represented by Formula (2) will be shown below.

TABLE 1

| Exemplified Polymer Compound | Polymerizable Monomer/ Content Ratio(%) | Polymrizable Monomer/ Content Ratio(%) | Polymrizable Monomer/ Content Ratio(%) | Weight Average Molecular Weight |
|---|---|---|---|---|
| A | 2-57/35% | Methyl methacrylate/50% | 2-hydroxyethyl methacrylate/15% | 14,000 |
| B | 2-57/35% | Methyl methacrylate/50% | 2-hydroxyethyl methacrylate/15% | 10,000 |
| C | 2-57/35% | Methyl methacrylate/50% | 2-hydroxyethyl methacrylate/15% | 5,000 |
| D | 2-57/10% | Methyl methacrylate/70% | 2-hydroxyethyl methacrylate/20% | 10,500 |
| E | 2-57/10% | Methyl methacrylate/80% | 2-hydroxyethyl methacrylate/10% | 10,300 |

TABLE 1-continued

| Exemplified Polymer Compound | Polymerizable Monomer/ Content Ratio(%) | Polymrizable Monomer/ Content Ratio(%) | Polymrizable Monomer/ Content Ratio(%) | Weight Average Molecular Weight |
|---|---|---|---|---|
| F | 2-58/35% | Methyl methacrylate/50% | 2-hydroxyethyl methacrylate/15% | 9,800 |
| G | 2-59/35% | Methyl methacrylate/50% | 2-hydroxyethyl methacrylate/15% | 16,000 |
| H | 2-60/35% | Methyl methacrylate/50% | 2-hydroxyethyl methacrylate/15% | 11,000 |
| I | 2-61/35% | Methyl methacrylate/50% | 2-hydroxyethyl methacrylate/15% | 22,000 |
| J | 2-62/35% | Methyl methacrylate/50% | 2-hydroxyethyl methacrylate/15% | 3,000 |
| K | 2-63/35% | Methyl methacrylate/50% | 2-hydroxyethyl methacrylate/15% | 9,500 |
| L | 2-64/35% | Methyl methacrylate/50% | 2-hydroxyethyl methacrylate/15% | 15,000 |
| M | 2-57/40% | Methyl methacrylate/60% | — | 9,000 |

(Acid Scavenger)

An acid scavenger is an agent which has a role to trap a residual acid (a protonic acid) in cellulose ester, which has been carried over from the process of manufacturing. Alternatively, when cellulose ester is melted, acetic acid or propionic acid is formed when the cellulose ester is CAP, since the hydrolysis of the side chain of the cellulose ester is accelerated by the water contained in the polymer and the heat. The acid scavenger is usable when it is chemically bonded with an acid, and examples of an acid scavenger include compounds having an epoxy structure, a tertiary amine structure or an ether structure, however, the acid scavenger is not limited thereto.

Specifically, preferable is an acid scavenger containing an epoxy compound disclosed in U.S. Pat. No. 4,137,201. Such epoxy compounds as the acid scavenger have been known in the art, and examples thereof include diglycidyl ether of various polyglycols, particularly a polyglycol driven by condensation of approximately 8 to 40 moles of ethylene glycol per mole of the polyglycol, diglycidyl ether of glycerol, an metal epoxy compound (for example, ones usually used in a vinyl chloride polymer composition, or one usually used together with a vinyl chloride polymer composition), an epoxide ether condensate, diglycidyl ether of bisphenol A (namely, 4,4'-dihydroxydiphenyldimethylmethane), an epoxide unsaturated fatty acid ester (specifically, an ester of alkyl having 2-4 carbon atoms of a fatty acid having 2-22 carbon atoms such as butyl epoxystearate), and a triglyceride of one of various epoxide long chain fatty acids (for example, an epoxide soybean oil composition. The examples further include an epoxide of plant oil or another unsaturated natural oil. The epoxide oils are sometimes called as epoxide of natural glyceride or epoxide of unsaturated fatty acid and these fatty acids are each contains 12-22 carbon atoms. As an epoxy group-containing epoxide resin compound available on the market, EPON 815C, and an epoxide ether oligomer condensation product represented by Formula (7) are preferably employed.

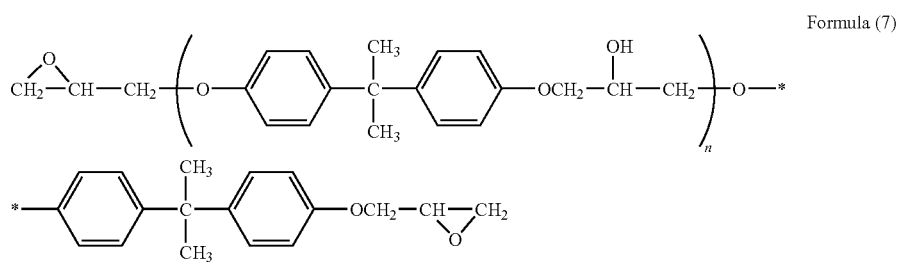

Formula (7)

In the above formula, n is 0-12. Also, usable acid scavenger includes one disclosed in paragraphs 87-105 of JA-A No. 5-194788.

<UV Absorber>

The cellulose ester of the present invention may contain a UV absorber in order to prevent deterioration of liquid crystals or a polarizing plate when used outdoor.

A UV absorber preferably has an excellent ability to absorb UV rays of which wavelength are not more than 370 nm, while the absorbance for visible rays with a wavelength of 400 nm or more is as small as possible. The transmittance at the wavelength of 370 nm is necessary to be 10% or less, but it is preferably 5% or less and more preferably 2% or less. Examples of a UV absorber usable in the present invention include: an oxybenzophenone compound, a benzotriazole compound, a salicylate ester compound, a benzophenone compound, a cyanoacrylate compound and a nickel complex compound. Of these, preferable is a benzotriazole compound because of less coloring.

In the present invention, a less volatile UV absorber is preferable.

Specific examples of a useful benzotriazole UV absorbent include 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3", 4", 5", 6"-tetrahydrophthalimide methyl)-5'-methylphenyl)benzotriazole, 2,2-methylenebis (4-(1,1,3,3,-tetramethylbutyl)-6-(2H-benzotriazole-2-yl) phenol), 2-(2'-hydroxy-3'-tert-butyl-5'-methylphenyl)-5-chlorobenzotriazole, 2-(2'-hydroxy-3'-tert-butyl-5'-(2-octyloxycarbonylethyl)-phenyl)-5-chlorobenzotriazole, 2-(2'-hydroxy-3'-(1-methyl-1-phenylethyl)-5'-(1,1,3,3,-tetramethylbutyl)-phenyl)benzotriazole, 2-(2H-benzotriazole-2-yl)-6-(straight chain or side chain dodecyl)-4-methylphenol, and a mixture of octyl-3-[3-tert-butyl-4-hydroxy-5-(chloro-2H-benzotriazole-2-yl) phenyl] propionate and 2-ethylhexyl-3-[3-tert-butyl-4-hydroxy-5-(5-chloro-2H-benzotriazole-2-yl) phenyl]propionate. However, the present invention is not limited thereto.

As commercially available UV absorbers, TINUVIN 109, TINUVIN 171, TINUVIN 900, TINUVIN 928 and TINUVIN 360 (all of which are manufactured by Chiba Specialty Chemical Co., Ltd.), LA31 (manufactured by ADEKA Corp.) and RUVA-100 (manufactured by OTSUKA Chemical Co., Ltd.) are usable.

Examples of the benzophenone compound include: 2,4-dihydroxy benzophenone, 2,2'-dihydroxy-4-methoxy benzophenone, 2-hydroxy-4-methoxy-5-sulfobenzophenone and bis (2-methoxy-4-hydroxy-5-benzoylphenylmethane), however, the present invention is not limited thereto.

In the present invention, a polymer UV absorber is preferably contained, which tends not to precipitate compared with a monomer UV absorber. As a polymer UV absorber useful in the present invention, a polymer UV absorber disclosed in JP-A No. 6-148430 or a UV absorbing copolymer derived from a monomer disclosed in JP-A No. 2003-113317 is preferably contained.

As a commercially available UV absorbing monomer usable in the present invention, 1-(2-benzotriazole)-2-hydroxy 5-(2-vinyloxycarbonyl ethyl)benzene, a reactive UV absorber RUVA-manufactured by OTSUKA Chemical Co., Ltd., which is 1-(2-benzotriazole)-2-hydroxy 5-(2-methacryloyloxy ethyl)benzene or similar products thereof may be cited. A polymer or a copolymer produced by polymerizing or copolymerizing these monomers is preferably used, however, the present invention is not limited thereto.

The UV absorber or the UV absorbing polymer used in the cellulose ester film of the present invention may be contained in the film or applied on the film. The adding amount of the UV absorber or the UV absorbing polymer used in the cellulose ester film of the present invention may be varied depending on the type of the compound or on the using condition, however, in the case of the UV absorber, the adding amount is preferably 0.2-3.0 g/m$^2$, more preferably 0.4-2.0 g/m$^2$ and specifically preferably 0.5-1.5 g/m$^2$, and in the case of the UV absorbing polymer, the adding amount is preferably 0.6-9.0 g/m$^2$, more preferably 1.2-6.0 g/m$^2$ and specifically preferably 1.5-3.0 g/m$^2$.

<Explanation of Blue Dye>

As a blue dye, preferable is a dye having an absorbance in the wavelength range of 450-700 nm, and more preferable is a dye having an absorbance in the wavelength range of 550-700 nm. Such wave range is effective to reduce the yellow hue and to maintain high transparency of the film. Blue dyes, for example, an anthraquinone dye, an anthracene dye, an azo dye, a triphenylmethane dye and a quinonimine dye are employable as a blue dye.

Of these, specifically preferable are an anthraquinone dye and an anthracene dye.

A dye disclosed in JP-A No. 2004-347679 can be preferably used.

Examples of a specifically preferable compounds include:
(S-15) 1-methylamino-4-p-tolylamino-anthraquinone,
(S-16) N,N'-bis-(2,6-diethyl-4-methyl-phenyl)-9,10-dihydroanthracene-1,4-diamine.

<Cellulose Ester Resin (Hereafter, Also Referred to Merely as Cellulose Resin)>

The cellulose ester resin relating to the present invention is a single acid or mixed acid ester containing at least one of the structures of an aliphatic acyl group and a substituted or unsubstituted aromatic acyl group.

The cellulose resin of the present invention is preferably a cellulose ester in which each of the hydroxyl groups at the 2-, 3- and 6-positions of cellulose is subjected to ester bonding with an aliphatic carboxylic acid or an aromatic carboxylic acid.

In the cellulose ester of the present invention, when the hydrogen atom of the hydroxyl group portion of the cellulose is a fatty acid ester with a aliphatic acyl group, the number of carbon atoms in the aliphatic acyl group is 2-20, and specific examples thereof include acetyl, propionyl, butyryl, isobutyryl, valeryl, pivaroyl, hexanoyl, octanoyl, lauroyl and stearoyl.

The aforementioned aliphatic acyl group of the present invention also refers to one which is further substituted, and examples of the benzene ring substituent group include those given as examples when the aromatic ring in the aromatic acyl group is a benzene ring.

When the esterified substituent group of the aforementioned cellulose ester is an aromatic ring, the number of the substituent groups which are substituted on the aromatic ring should be 0 or 1-5, preferably 1-3, and 1 or 2 is specifically preferable. In addition, when the number of substituent groups substituted on the aromatic ring is 2 or more, the substituent groups may be the same or different from each other, and they may also bond with each other to form a condensed polycylic compound (such as naphthalene, indene, indan, phenanthrene, quinoline, isoquinilene, chromene, chromane, phthalazine, acridine, indole and indoline).

When the aromatic ring is a benzene ring in an aromatic acyl group, examples of a substituent of the benzene ring include: a halogen atom, a cyano group, an alkyl group, an alkoxy group, and aryl group, an aryloxy group, an acyl group, a carbonamide group, a sulfonamide group, a ureido group, an aralkyl group, a nitro group, an alkoxy carbonyl group, an aryloxy carbonyl group, an aralkyoxy carbonyl group, a carbamoyl group, a sulfamoyl group, an acyloxy group, an alkenyl group, an alkinyl group, an alkyl sulfonyl group, an aryl sulfonyl group, an alkyloxy sulfonyl group, an aryloxy sulfonyl group, an alkyl sulfonyloxy group, and an aryloxy sulfonyl group, —S—R, —NH—CO—OR, —PH—R, —P(—R)$_2$, —PH—O—R, —P(—R) (—O—R), —P(—O—R)$_2$, —PH(=O)—R—P(=O)(—R)$_2$, —PH(=O)—R, —P(=O)(—R) (—O—R), —P(=O)(—O—R)$_2$, —O—PH (=O)—R, —O—P(=O) (—R)$_2$—O—PH(=O)—O—R, —O—P(=O)(—R)(—O—R), —O—P(=O)(—O—R)$_2$, —NH—PH(=O)—R, —NH—P(=O)(—R) (—O—R), —NH—P(=O) (—O—R)$_2$, —SiH$_2$—R, —SiH(—R)$_2$, —Si (—R)$_3$, —O—SiH$_2$—R, —O—SiH(—R)$_2$ and —O—Si(—R)$_3$. R above is a fatty acid group, an aromatic group, or a heterocyclic group. The number of substituent groups is preferably between 1 and 5, more preferably between 1 and 4 and still more preferably between 1 and 3, and most preferably either 1 or 2. Examples of the substituent group preferably include a halogen atom, cyano, an alkyl group, an alkoxy group, an aryl group, an aryloxy group, an acyl group, a carbonamide group, a sulfonamide group, and a ureido group, and more preferably, a halogen atom, cyano, an alkyl group, an alkoxy group, an aryloxy group, an acyl group, and a carbonamide group, and still more preferably, a halogen atom, cyano, an alkyl group, an alkoxy group, and an aryloxy group, and most preferably, a halogen atom, an alkyl group, and an alkoxy group.

Examples of the halogen atom include a fluorine atom, a chlorine atom, a bromine atom, and an iodine atom. The alkyl group may have ring structure or may be branched. The number of carbon atoms in the alkyl group is preferably 1-20, more preferably 1-12, still more preferably 1-6, and most preferably 1-4. Examples of the alkyl group include methyl, ethyl, propyl, isopropyl, butyl, t-butyl, hexyl, cyclohexyl, octyl and 2-ethyl hexyl. The alkoxy group may have ring structure or may be branched. The number of carbon atoms in the alkoxy group is preferably 1-20, more preferably 1-12, still more preferably 1-6, and most preferably 1-4. The alkoxy group may be further substituted by another alkoxy group. Examples of the alkoxy group include a methoxy, ethoxy, 2-methoxyethoxy, 2-methoxy-2-ethoxyethoxy, butyloxy, hexyloxy and octyloxy.

The number of carbon atoms in the aryl group is preferably 6-20, and more preferably 6-12. Examples of the aryl group include phenyl and naphtyl. The number of carbon atoms in the aryloxy group is preferably 6-20, and more preferably 6-12. Examples of the aryloxy group include phenoxy and naphtoxy. The number of carbon atoms in the acyl group is preferably 1-20, and more preferably 1-12. Examples of the acyl group include hormyl, acetyl, and benzoyl. The number of carbon atoms in the carbonamide group is preferably 1-20, and more preferably 1-12. Examples of the carbonamide include acetoamide and benzamide. The number of carbon atoms in the sulfonamide group is preferably 1-20, and more preferably 1-12. Examples of the sulfonamide include methane sulfonamide, benzene sulfonamide, and p-toluene sulfonamide. The number of carbon atoms in the ureido group is preferably 1-20, and more preferably 1-12. Examples of the ureido group include (unsubstituted) ureido.

The number of carbon atoms in the aralkyl group is preferably 7-20, and more preferably 7-12. Examples of the aralkyl group include benzyl, phenethyl, and naphtyl methyl. The number of carbon atoms in the alkoxycarbonyl group is preferably 1-20, and more preferably 2-12. Examples of the alkoxycarbonyl group include methoxy carbonyl. The number of carbon atoms in the aryloxy carbonyl group is preferably 7-20, and more preferably 7-12. Examples of the aryloxy carbonyl group include phenoxy carbonyl. The number of carbon atoms in the aralkyloxycarbonyl is preferably 8-20, and more preferably 8-12. Examples of the aralkyoxycarbonyl include benzyloxycarbonyl. The number of carbon atoms in the carbamoyl group is preferably 1-20, and more preferably 1-12. Examples of the carbamoyl group include (unsubstituted) carbamoyl and N-methyl carbamoyl. The number of carbon atoms in the sulfamoyl group is preferably no greater than 20, and more preferably no greater than 12. Examples of the sulfamoyl group include (unsubstituted) sulfamoyl and N-methyl sulfamoyl. The number of carbon atoms in the acyloxy group is preferably 1-20, and more preferably 2-12. Examples of the acyloxy group include acetoxy and benzoyloxy.

The number of carbon atoms in the alkenyl group is preferably 2-20, and more preferably 2-12. Examples of the alkenyl group include vinyl, aryl and isopropenyl. The number of carbon atoms in the alkinyl group is preferably 2-20, and more preferably 2-12. Examples of the alkinyl group include dienyl. The number of carbon atoms in the alkyl sulfonyl group is preferably 1-20, and more preferably 1-12. The number of carbon atoms in the aryl sulfonyl group is preferably 6-20, and more preferably 6-12. The number of carbon atoms in the alkyloxy sulfonyl group is preferably 1-20, and more preferably 1-12. The number of carbon atoms in the aryloxy sulfonyl group is preferably 6-20, and more preferably 6-12. The number of carbon atoms in the alkyl sulfonyloxy group is preferably 1-20, and more preferably 1-12. The number of carbon atoms in the aryloxy sulfonyl is preferably 6-20, and more preferably 6-12.

In the cellulose ester resin of the present invention, in the case where the hydrogen atom of the hydroxyl group portion of the cellulose is a fatty acid ester with a aliphatic acyl group, the number of carbon atoms in the aliphatic acyl group is 2-20, and specific examples thereof include acetyl, propionyl, butyryl, isobutyryl, valeryl, pivaroyl, hexanoyl, octanoyl, lauroyl and stearoyl.

The aforementioned aliphatic acyl group of the present invention also refers to one which is further substituted, and examples of the benzene ring substituent group include those given as examples when the aromatic ring in the aromatic acyl group is a benzene ring.

When the esterified substituent group of the aforementioned cellulose ester is an aromatic ring, the number of the substituent groups which are substituted on the aromatic ring should be 0 or 1-5, preferably 1-3, and 1 or 2 is specifically preferable. In addition, when the number of substituent groups substituted on the aromatic ring is 2 or more, the substituent groups may be the same or different from each other, and they may also bond with each other to form a condensed polycylic compound (such as naphthalene, indene, indan, phenanthrene, quinoline, isoquinilene, chromene, chromane, phthalazine, acridine, indole and indoline).

The cellulose resin used in the present invention is preferably at least one type selected from cellulose acetate, cellulose propionate, cellulose butyrate, cellulose acetate propionate, cellulose acetate butyrate, cellulose acetate phthalate and cellulose phthalate.

OF these, specifically preferable cellulose resin include cellulose acetate, cellulose propionate, cellulose butyrate, cellulose acetate propionate and cellulose acetate butyrate.

The total acyl substitution degree of the cellulose resin of the present invention is preferably 2.4-2.9. When it is smaller than 2.4, the retardation value tends to vary with time or dependent on environmental condition, and when it is larger than 2.9, the film tends to be ruptured when the film is subject to hot stretching. Preferably the acetyl substitution degree is 0-2.4 and the sum of the substitution degree by acyl group having 3 or more carbon atoms is 0.5-2.9, and more preferably the acetyl substitution degree is 1.2-2.1 and the sum of the substitution degree by acyl group having 3 or more carbon atoms is 0.6-1.4. Further more preferably the substitution degree of acyl group having 3-22 carbon atoms is in the above range, and specifically more preferably the acyl group having 3-22 carbon atoms is a propionyl group having 3 carbon atoms or a butyryl group having 4 carbon atoms, and the substitution degree of these groups meets the above range.

Such cellulose resins can be obtained, for example, by substituting the hydroxyl groups of cellulose with an acetyl group, propionyl group or a butyl group within the abovementioned range using acetic acid anhydride, propionic acid anhydride and/or butyric acid anhydride via a common method. The synthetic method of such a cellulose ester is not specifically limited, however, the cellulose ester can be synthesized by referring to the method disclosed in JP-A No. 10-45804 or Published Japanese Translation of a PCT Application No. 6-501040.

The substitution degree of an acetyl group, a propionyl group or a butyl group can be measured according to ASTM-D817-96.

The ratio of weight average molecular weight Mw/number average molecular weight Mn of the cellulose resin used in the present invention is 1.0-5.5, specifically preferably 1.4-5.0, and further preferably 2.0-3.0. The Mw value is 100,000-500,000, and preferably 120,000-250,000.

The average molecular weight and the molecular weight dispersion of the cellulose resin used in the present invention can be determined by the aforementioned gel permeation chromatography.

The raw material cellulose of the cellulose resin used in the present invention may be wood pulp or cotton linter, and the wood pulp may be of broad leaf tree or of needle leaf tree, however, more preferable is wood pulp of needle leaf tree. Cotton linter is preferably used in view of the peeling property in the film forming process. The cellulose resins produced from these raw materials may be used by suitably mixing or may be used alone. Specifically preferable is to use the cellulose resins by mixing those having different substitution degrees.

(Matting Agent)

Fine particles such as a matting agent or the like may be added to the cellulose ester film of the invention in order to impart a matting effect, and fine particles of inorganic compounds as well as fine particles of organic compounds may be used. The particles of the matting agent are preferably as fine as possible and examples of the fine particle matting agent include inorganic fine particles such as those of silicon dioxide, titanium dioxide, aluminum oxide, zirconium oxide, calcium carbonate, kaolin, talc, burned calcium silicate, hydrated calcium silicate, aluminum silicate, magnesium silicate, and calcium phosphate or cross-linked fine particles of high molecular weigh polymers of these, silicon dioxide is preferable in view of reduced haze in the film. The particles such as the silicon dioxide particles are often surface treated using an organic substance, and this is preferable because it reduces haze in the film.

Examples of the organic compound preferably used in the surface treatment include halosilanes, alkoxysilanes, silazanes, and siloxanes. Particles having a larger average particle diameter have a greater matting effect, while particles having a smaller average particle diameter have excellent transparency. The primary particles have an average particle diameter in the range of 0.01 to 1.0 μm. The primary particles preferably have an average particle diameter in the range of 5 to 50 nm, and more preferably 7 to 14 nm. These particles are preferable because they create unevenness of 0.01 to 1.0 μm in the plane of the cellulose ester film. The amount of the particles included in the cellulose ester is preferably 0.001 to 5% by mass, more preferably 0.005 to 1% by mass, and further more preferably 0.01 to 0.5% by mass based on the mass of cellulose ester.

Examples of the silicon dioxide particles include AEROSIL 200, 200V, 300, 8972, R972V, R974, R202, 8812, OX50, TT600, or NAX50 each manufactured by Nippon AEROSIL Co., Ltd.; or KE-P10, KE-P30, KE-P100 or KE-P150 each manufactured by NIPPON SHOKUBAI Co., Ltd. Of these, AEROSIL 200V, R972, R972V, R974, R202, R812, NAX50, KE-P30 and KE-P100 are preferred. Two or more of these matting agents may be combined and used. In the case where 2 or more matting agents are used, they may be mixed in a suitably selected proportion. In this case, matting agents which have different particle diameter and quality such as Aerosil 200V and R972V may be used in mass proportions in the range from 0.1:99.9 to 99.9:0.1

The presence of the particles used as the matting agent in the film can also serve another purpose of improving the strength of the film. The presence of the particles in the film may also improve the orientation of the cellulose ester itself, which constitutes the cellulose ester film of the present invention.

(Retardation Regulator)

In the optical film relating to the present invention, the orientation film is formed and the liquid crystal layer is provided thereon. The retardation originating from the optical film and the liquid crystal layer are combined and optical compensation capability is imparted, and polarizing plate processing is thereby performed such that the quality of the liquid crystal display is improved. The compounds added for regulating retardation include aromatic compounds having 2 or more aromatic rings which are described in the specification European Patent No. 911,656A2 which can be used as retardation regulators. Two or more of these compounds may be used together. The aromatic ring of these aromatic compounds may include aromatic heterocyclic rings in addition to aromatic hydrocarbon rings. The aromatic heterocyclic ring is specifically preferable and the aromatic heterocyclic ring is generally an unsaturated heterocyclic ring. Of these, 1,3,5-triazine ring is specifically preferable.

(Polymers)

Polymers or oligomers other than cellulose ester may be incorporated in the optical film relating to the present invention. The polymers or oligomers are preferably those having excellent compatibility with the cellulose ester. Transmittance of the cellulose ester film of the invention is preferably not less than 80%, more preferably not less than 90%, and still more preferably not less than 92%. Cellulose ester in which at least one of the polymers and the oligomers is incorporated has advantages that its melt viscosity can be adjusted and physical properties of the film formed from the cellulose ester are improved.

Melt Casting Method>

The display apparatus film of the present invention is preferably formed by melt casting of the cellulose ester. The molding by melt casting wherein heating and melting are conducted without using the solvent used in the solution casting method (e.g., methylene chloride) can be divided into a melt-extrusion molding method, press molding method, inflation method, injection molding method, blow molding method, stretch molding method, and others. Of these methods, melt-extrusion molding method is preferred to produce a polarizing plate protective film characterized by excellent mechanical strength and surface accuracy.

Figure 2:
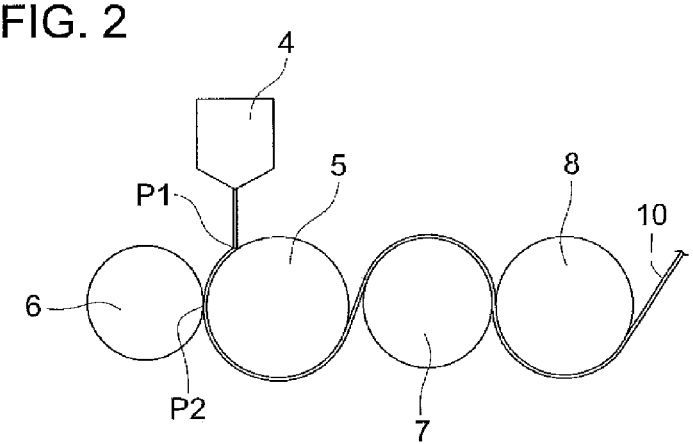
FIG. 2 is an enlarged flow sheet of a main part of the producing apparatus illustrated in FIG. 1.

The following describes the method of manufacturing the cellulose ester film of the present invention with reference to a melt extrusion method:

FIG. 1 is a schematic flow sheet showing the overall structure of the apparatus for practicing the cellulose ester film manufacturing method of the present invention. FIG. 2 is an enlarged view of the cooling roll portion from the flow casting die.

In the cellulose ester film manufacturing method on the present invention shown in FIG. 1 and FIG. 2, the film material such as cellulose resin is mixed, then melt extrusion is conducted on a first cooling roll 5 from the flow casting die 4 using the extruder 1. The material is circumscribed on first cooling roll 5, second cooling roll 7 and third cooling roll 8, namely, a total of three cooling rolls, sequentially. Thus, the material is cooled, solidified and formed into a film 10. With both ends gripped by a stretching apparatus 12, the film 10 separated by a separation roll 9 is stretched across the width and is wound by a winding apparatus 16. To correct flatness, a touch roll 6 is provided. This is used to press the film against the surface of the first cooling roll 5. This touch roll 6 has an elastic surface and forms a nip with the first cooling roll 5. The details of the touch roll 6 will be described later.

The conditions for the cellulose ester film manufacturing method of the present invention are the same as those for thermoplastic resins such as other polyesters. The material is preferably dried in advance. A vacuum or depressurized dryer, or dehumidified hot air dryer is used to dry the material until the moisture is reduced to 1000 ppm or less, preferably 200 ppm or less.

For example, the cellulose ester based resin having been dried under hot air, vacuum or depressurized atmosphere is extruded by the extruder 1 and is molten at a temperature of about 200 through 300° C. The leaf disk filter 2 is used to filter the material to remove foreign substances.

When the material is fed from the feed hopper (not illustrated) to the extruder 1, the material is preferably placed in the vacuum, depressurized or insert gas atmosphere to prevent oxidation and decomposition.

When additives such as plasticizer are not mixed in advance, they can be kneaded into the material during the process of extrusion. To ensure uniform mixing, a mixer such as a static mixer 3 is preferably utilized.

In the present invention, the cellulose ester resin and the additives such as a stabilizer to be added as required are preferably mixed before being molten. It is more preferred that the cellulose resin and stabilizer should be mixed first. A mixer may be used for mixing. Alternatively, mixing may be completed in the process of preparing the cellulose resin, as described above. It is possible to use a commonly used mixer such as a V-type mixer, conical screw type mixer, horizontal cylindrical type mixer, Henschel mixer and ribbon mixer.

As described above, subsequent to mixing of the film constituting materials, the mixture can be directly molten by the extruder 1 to form a film. Alternatively, it is also possible to palletize the film constituting material, and the resultant pellets may be molten by the extruder 1, whereby a film is formed. The following arrangement can also be used: When the film constituting material contains a plurality of materials having different melting points, so-called patchy half-melts are produced at the temperature wherein only the material having a lower melting point is molten. The half-melts are put into the extruder 1, whereby a film is formed. Further, the following arrangement can also be used: If the film constituting material contains the material vulnerable thermal decomposition, a film is directly formed without producing pellets, thereby reducing the frequency of melting. Alternatively, a film is produced after patchy half-melts have been formed, as described above.

Various types of commercially available extruders can be used as the extruder 1. A melt-knead extruder is preferably utilized. Either a single-screw extruder or a twin-screw extruder can be used. When producing a film directly without pellets being formed from the film constituting material, an adequate degree of mixing is essential. In this sense, a twin-screw extruder is preferably used. A single-screw extruder can be used if the screw is changed into a kneading type screw such as a Madoc screw, Unimelt screw or Dulmage screw, because a proper degree of mixing can be obtained by this modification. When pellets or patchy half-melts are used as film constituting materials, both the single screw extruder and twin screw extruder can be used.

In the cooling process inside the extruder 1 and after extrusion, oxygen density is preferably reduced by an inert gas such as nitrogen gas or by depressurization.

The preferred conditions for the melting temperature of the film constituting material inside the extruder 1 vary according to the viscosity and discharge rate of the film constituting material as well as the thickness of the sheet to be produced. Generally, it is Tg or more through Tg+100° C. or less with respect to the glass-transition temperature Tg of the film, preferably Tg+10° C. or more through Tg+90° C. or less. The melt viscosity at the time of extrusion is 10 through 100000 poises, preferably 100 through 10000 poises. The retention time of the film constituting material inside the extruder 1 should be as short as possible. It is within five minutes, preferably within three minutes, more preferably within two minutes. The retention time varies according to the type of the extruder and the conditions for extrusion. It can be reduced by adjusting the amount of the material to be supplied, the L/D, the speed of screw and the depth of screw groove.

The shape and speed of the screw of the extruder 1 are adequately selected in response to the viscosity and discharge rate of the film constituting material. In the present invention, the shear rate of the extruder 1 is 1/sec. through 10000/sec., preferably S/sec. through 1000/sec., more preferably 10/sec. through 100/sec.

The extruder 1 that can be used in the present invention can be obtained as a plastic molding machine generally available on the market.

The film constituting material extruded from the extruder 1 is fed to the flow casting die 4, and the slit of the flow casting die 4 is extruded as a film. There is no restriction to the flow casting die 4 if it can be used to manufacture a sheet or film. The material of the flow casting die 4 are exemplified by hard chromium, chromium carbonate, chromium nitride, titanium carbide, titanium carbonitride, titanium nitride, cemented carbide, ceramic (tungsten carbide, aluminum oxide, chromium oxide), which are sprayed or plated. Then they are subjected to surface processing, as exemplified by buffing and lapping by a grinder having a count of #1000 or later planar cutting (in the direction perpendicular to the resin flow) by a diamond wheel having a count of #1000 or more, electrolytic grinding, and electrolytic complex grinding. The preferred material of the lip of the flow casting die 4 is the same as that of the flow casting die 4. The surface accuracy of the lip is preferably 0.5 S or less, more preferably 0.2 S or less.

Figure 3:
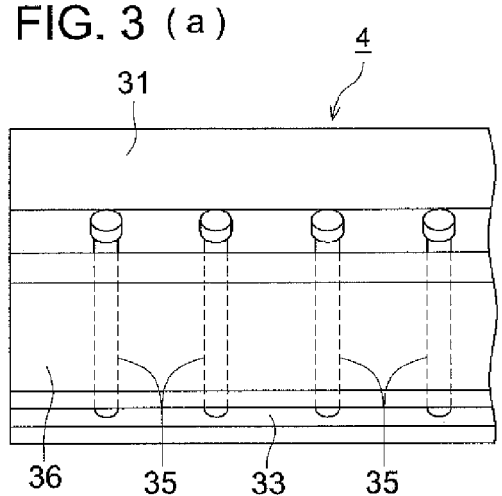
FIG. 3(a) is an appearance diagram of a main part of the casting die.
FIG. 3(b) is a cross sectional view of an main part of the casting die.
Figure 3:
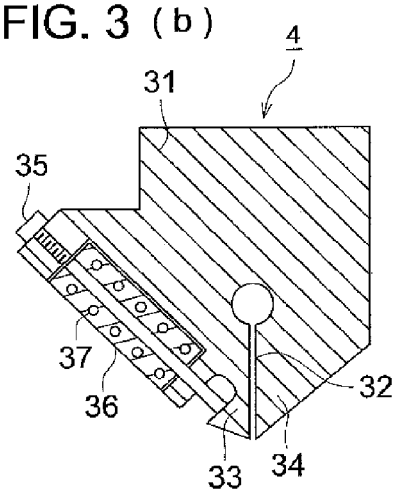

The slit of this flow casting die 4 is designed in such a way that the gap can be adjusted. This is shown in FIGS. 3(*a*) and 3(*b*). Of a pair of lips forming the slit 32 of the flow casting die 4, one is the flexible lip 33 of lower rigidity easily to be deformed, and the other is a stationary lip 34. Many heat bolts 35 are arranged at a predetermined pitch across the flow casting die 4, namely, along the length of the slit 32. Each heat bolt 35 includes a block 36 containing a recessed type electric heater 37 and a cooling medium passage. Each heat bolt 35 penetrates the block 36 in the vertical direction. The base of the heat bolt 35 is fixed on the die (main body) 31, and the front end is held in engagement with the outer surface of the flexible lip 33. While the block 36 is constantly cooled, the input of the recessed type electric heater 37 is adjusted to increase or decrease the temperature of the block 36, this adjustment causes thermal extension and contraction of the heat bolt 35, and hence, displacement of the flexible lip 33, whereby the film thickness is adjusted. The following arrangement can also be used: A thickness gauge is provided at predetermined positions in the wake of the die. The web thickness information detected by this gauge is fed back to the control apparatus. This thickness information is compared with the preset thickness information of the control apparatus, whereby the power of the heat generating member of the heat bolt or the ON-rate thereof is controlled by the signal for correction control amount sent from this apparatus. The heat bolt preferably has a length of 20 through 40 cm, and a diameter of 7 through 14 mm. A plurality of heat bolts, for example, several tens of heat bolts are arranged preferably at a pitch of 20 through 40 mm. A gap adjusting member mainly made up of a bolt for adjusting the slit gap by manually movement in the axial direction can be provided, instead of a heat bolt. The slit gap adjusted by the gap adjusting member normally has a diameter of 200 through 1000 μm, preferably 300 through 800 more preferably 400 through 600 μm.

The first through third cooling roll is made of a seamless steel pipe having a wall thickness of about 20 through 30 mm. The surface is mirror finished. It incorporates a tune for feeding a coolant. Heat is absorbed from the film on the roll by the coolant flowing through the tube. Of these first through third cooling rolls, the first cooling roll 5 corresponds to the rotary supporting member of the present invention.

In the meantime, the touch roll 6 held in engagement with the first cooling roll 5 has an elastic surface. It is deformed along the surface of the first cooling roll 5 by the pressure against the first cooling roll 5, and forms a nip between this roll and the first roll 5. To be more specific, the touch roll 6 corresponds to the pressure rotary member of the present invention.

Figure 4:
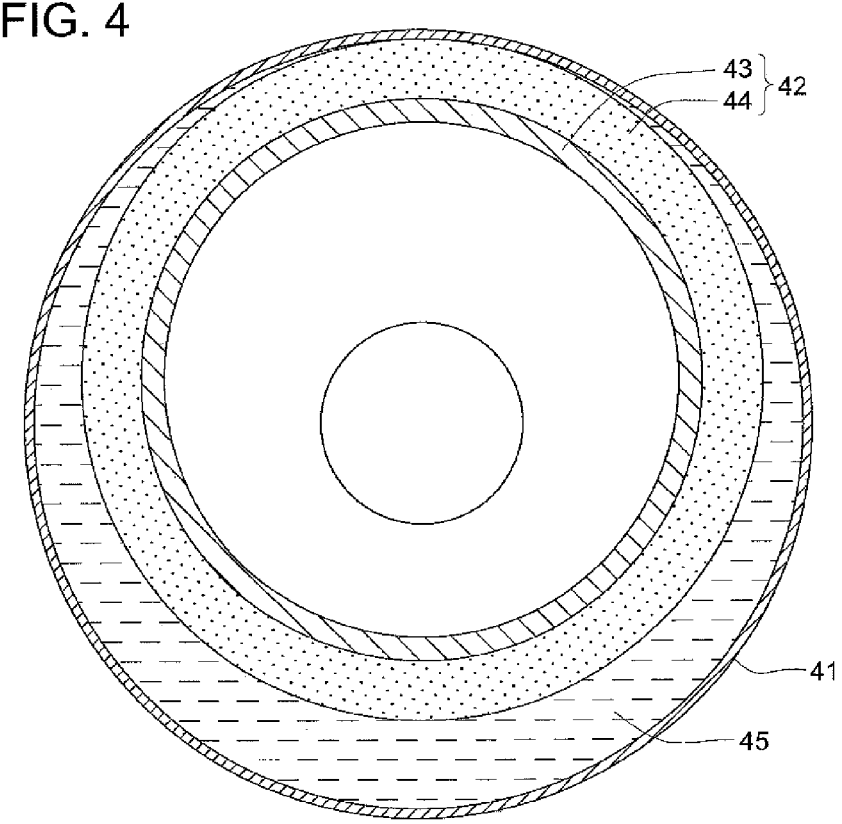
FIG. 4 is a cross sectional view of a first embodiment of a pressure rotary member.

FIG. 4 is a schematic cross section of the touch roll 6 as an embodiment of the present invention (hereinafter referred to as "touch roll A"). As illustrated, the touch roll A is made up of an elastic roller 42 arranged inside the flexible metallic sleeve 41.

The metallic sleeve 41 is made of a stainless steel having a thickness of 0.3 mm, and is characterized by a high degree of flexibility. If the metallic sleeve 41 is too thin, strength will be insufficient. If it is too thick, elasticity will be insufficient. Thus, the thickness of the metallic sleeve 41 is preferably 0.1 through 1.5 mm. The elastic roller 42 is a roll formed by installing a rubber 44 on the surface of the metallic inner sleeve 43 freely rotatable through a bearing. When the touch roll A is pressed against the first cooling roll 5, the elastic roller 42 presses the metallic sleeve 41 against the first cooling roll 5, and the metallic sleeve 41 and elastic roller 42 is deformed, conforming to the shape of the first cooling roll 5, whereby a nip is formed between this roll and the first cooling roll. The cooling water 45 is fed into the space formed inside the metallic sleeve 41 with the elastic roller 42.

Figure 5:
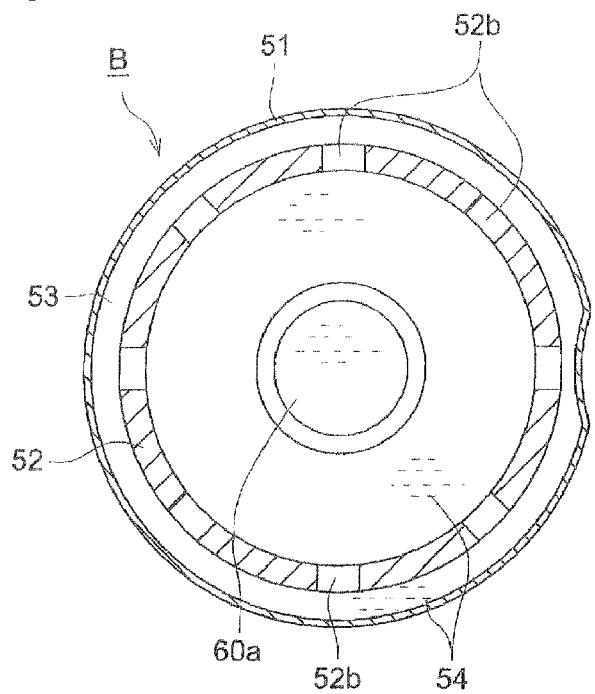
FIG. 5 is a cross sectional view on a plane perpendicular to the rotary shaft of a second embodiment of a pressure rotary member.
Figure 6:
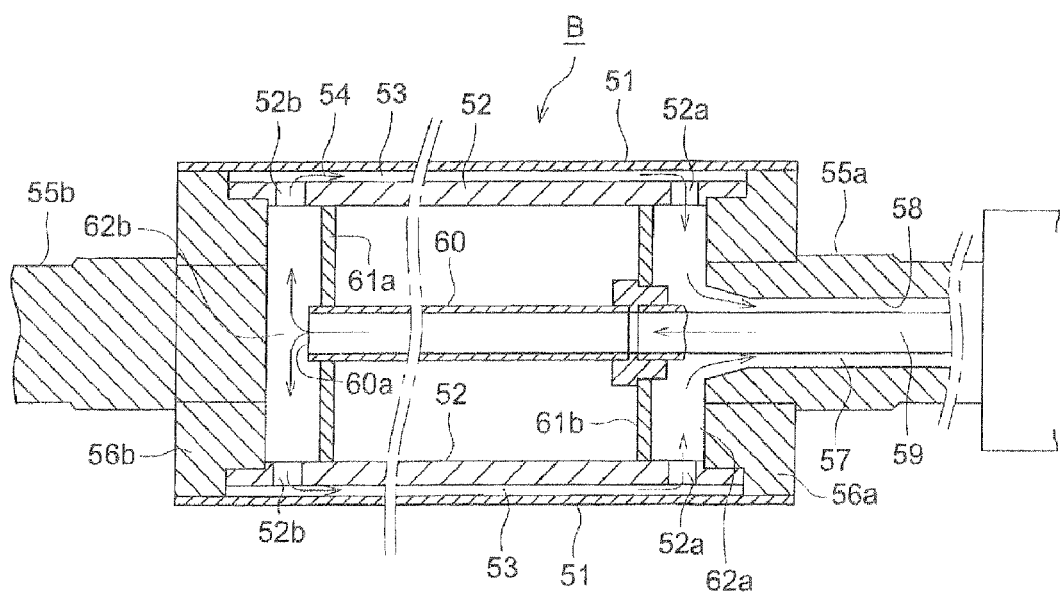
FIG. 6 is a cross sectional view on a plane including the rotary shaft of a second embodiment of a pressure rotary member.

FIG. 5 and FIG. 6 show a touch roll B as another embodiment of the pressure rotary member. The touch roll B is formed of an outer sleeve 51 of flexible seamless stainless steel tube (having a thickness of 4 mm), and metallic inner sleeve 52 of high rigidity arranged coaxially inside this outer sleeve 51. Coolant 54 is led into the space 53 formed between the outer sleeve 51 and inner sleeve 52. To put it in greater details, the touch roll B is formed in such a way that the outer sleeve supporting flanges 56a and 56b are mounted on the rotary shafts 55a and 55b on both ends, and a thin-walled metallic outer sleeve 51 is mounted between the outer peripheral portions of these outer sleeve supporting flanges 56a and 56b. The fluid supply tube 59 is arranged coaxially inside the fluid outlet port 58 which is formed on the shaft center of the rotary shaft 55a and constitutes a fluid return passage 57. This fluid supply tube 59 is connected and fixed to the fluid shaft sleeve 60 arranged on the shaft center which is arranged inside the thin-walled metallic outer sleeve 51. Inner sleeve supporting flanges 61a and 61b are mounted on both ends of this fluid shaft sleeve 60, respectively. Outlet 60a is the outlet of pipe 60. A metallic inner sleeve 52 having a wall thickness of about 15 through 20 mm is mounted in the range from the position between the outer peripheral portions of these inner sleeve supporting flanges 61a and 61b to the outer sleeve supporting flange 56b on the other end. For example, a coolant flow space 53 of about 10 mm is formed between this metallic inner sleeve 52 and thin-walled metallic outer sleeve 51. An outlet 52a and an inlet 52b communicating between the flow space 53 and intermediate passages 62a and 62b outside the inner sleeve supporting flanges 61a and 61b are formed on the metallic inner sleeves 52 close to both ends, respectively.

To provide pliability, flexibility and restoring force close to those of the rubber, the outer sleeve 51 is designed thin within the range permitted by the thin cylinder theory of elastic mechanics. The flexibility evaluated by the thin cylinder theory is expressed by wall thickness t/roll radium r. The smaller the t/r is, the higher the flexibility is. The flexibility of this touch roll B meets the optimum condition when $t/r \leq 0.03$. Normally, the commonly used touch roll has a roll diameter R=200 through 500 mm (roll radius r=R/2), a roll effective width L=500 through 1600 mm, and an oblong shape of r/L<1. As shown in FIG. 6, for example, when roll diameter R=300 mm and the roll effective width L 1200 mm, the suitable range of wall thickness t is 150×0.03=4.5 mm or less. When pressure is applied to the molten sheet width of 1300 mm at the average linear pressure of 98 N/cm, the wall thickness of the outer sleeve 51 is 0.3 mm. Then the corresponding spring constant becomes the same as that of the rubber roll of the same shape. The width k of the nip between the outer sleeve 51 and cooling roll in the direction of roll rotation is about 9 mm. This gives a value approximately close to the nip width of this rubber roll is about 12 mm, showing that pressure can be applied under the similar conditions. The amount of deflection in the nip width k is about 0.05 through 0.1 mm.

Here, $t/r \leq 0.03$ is assumed. In the case of the general roll diameter R=200 through 500 mm, sufficient flexibility is obtained if $2 \text{ mm} \leq t \leq 5 \text{ mm}$ in particular. Thickness can be easily reduced by machining. Thus, this is very practical range. If the wall thickness is 2 mm or less, high-precision machining cannot be achieved due to elastic deformation during the step of processing.

The equivalent value of this $2 \text{ mm} \leq t \leq 5 \text{ mm}$ can be expressed by $0.008 \leq t/r \leq 0.05$ for the general roll diameter. In practice, under the conditions of t/r 0.03, wall thickness is preferably increased in proportion to the roll diameter. For example, selection is made within the range of t=2 through 3 mm for the roll diameter: R=200; and t=4 through 5 mm for the roll diameter: R=500.

These touch rolls A and B are energized toward the first cooling roll by the energizing section (not illustrated). The F/W (linear pressure) obtained by dividing the energizing force F of the energizing section by the width W of the film in the nip along the rotary shaft of the first cooling roll 5 is set at 9.8 through 147 N/cm. According to the present embodiment, a nip is formed between the touch rolls A and B, and the first cooling roll 5. Flatness should be corrected while the film passes through this nip. Thus, as compared to the cases where the touch roll is made of a rigid body, and no nip is formed between the touch roll and the first cooling roll, the film is sandwiched and pressed at a smaller linear pressure for a longer time. This arrangement ensures more reliable correction of flatness. To be more specific, if the linear pressure is smaller than 9.8 N/cm, the die line cannot be removed sufficiently. Conversely, if the linear pressure is greater than 147 N/cm, the film cannot easily pass through the nip. This will cause uneven thickness of the film.

The surfaces of the touch rolls A and B are made of metal. This provides smooth surfaces of the touch rolls A and B, as compared to the case where touch rolls have rubber surfaces.

The elastic body 44 of the elastic roller 42 can be made of ethylene propylene rubber, neoprene rubber, silicone rubber or the like.

To ensure that the die line is removed sufficiently by the touch roll 6, it is important that the film viscosity should lie within the appropriate range when the film is sandwiched and pressed by the touch roll 6. Further, cellulose ester is known to be affected by temperature to a comparatively high degree. Thus, to set the viscosity within an appropriate range when the cellulose ester film is sandwiched and pressed by the touch roll 6, it is important to set the film temperature within an appropriate range when the cellulose ester film is sandwiched and pressed by the touch roll 6. When the glass-transition temperature of the cellulose ester film is assumed as Tg, the temperature T of the film immediately before the film is sandwiched and pressed by the touch roll 6 is preferably set in such a way that Tg<T<Tg+110° C. can be met. If the film temperature T is lower than T, the viscosity of the film will be too high to correct the die line. Conversely, if the film temperature T is higher than Tg+110° C., uniform adhesion between the film surface and roll cannot be achieved, and the die line cannot be corrected. This temperature is preferably Tg+10° C.<T2<Tg+90° C., more preferably Tg+20° C.<T2<Tg+70° C. To set the film temperature within the appropriate range when the cellulose ester film is sandwiched and pressed by the touch roll 6, one has only to adjust the length L of the nip between the first cooling roll 5 and touch roll 6 along the rotating direction of the first cooling roll 5, from the position P1 wherein the melt pressed out of the flow casting die 4 comes in contact with the first cooling roll 5.

In the present invention, the material preferably used for the first roll 5 and second roll 6 is exemplified by carbon steel, stainless steel and resin. The surface accuracy is preferably set at a higher level. In terms of surface roughness, it is preferably set to 0.3 S or less, more preferably 0.01 S or less.

In the present invention, the portion from the opening (lip) of the flow casting die 4 to the first roil 5 is reduced to 70 kPa or less. This procedure has been found out to correct the die line effectively. Pressure reduction is preferably 50 through 70 kPa. There is no restriction to the method of ensuring that the pressure in the portion from the opening (lip) of the flow casting die 4 to the first roll 5 is kept at 70 kPa or less. One of the methods is to reduce the pressure by using a pressure-resistant member to cover the portion from the flow casting die 4 to the periphery of the roll. In this case, the vacuum suction machine is preferably heated by a heater or the like to ensure that a sublimate will be deposited on the vacuum suction machine. In the present invention, if the suction pressure is too small, the sublimate cannot be sucked effectively. To prevent this, adequate suction pressure must be utilized.

In the present invention, the film-like cellulose ester based resin in the molten state from the T-die 4 is conveyed in contact with the first roll (the first cooling roll) 5, second cooling roll 7, and third cooling roll 8 sequentially, and is cooled and solidified, whereby an unoriented cellulose ester based resin film 10 is produced.

In the embodiment of the present invention shown in FIG. 1, the unoriented film 10 cooled, solidified and separated from the third cooling roll 8 by the separation roll 9 is passed through a dancer roll (film tension adjusting roll) 11, and is led to the stretching machine 12, wherein the film 10 is stretched in the lateral direction (across the width). This stretching operation orients the molecules in the film.

A known tender or the like can be preferably used to stretch the film across the width. Especially when the film is stretched across the width, the lamination with the polarized film can be preferably realized in the form of a roll. Stretching across the width ensures that the low axis of the cellulose ester film made up of a cellulose ester based resin film is found across the width.

In the meantime, the transmission axis of the polarized film also lies across the width normally. If the polarizing plate wherein the transmission axis of the polarized film and the low axis of the optical film will be parallel to each other is incorporated in the liquid crystal display apparatus, the display contrast of the liquid crystal display apparatus can be increased and an excellent angle of field is obtained.

The glass transition temperature Tg of the film constituting material can be controlled when the types of the materials constituting the film and the proportion of the constituent materials are made different. When the retardation film is manufactured as a cellulose film, Tg is 120° C. or more, preferably 135° C. or more. In the liquid crystal display apparatus, the film temperature environment is changed in the image display mode by the temperature rise of the apparatus per se, for example, by the temperature rise caused by a light source. In this case, if the Tg of the film is lower than the film working environment temperature, a big change will occur to the retardation value and film geometry resulting from the orientation status of the molecules fixed in the film by stretching. If the Tg of the film is too high, temperature is raised when the film constituting material is formed into a film. This will increase the amount of energy consumed for heating. Further, the material may be decomposed at the time of forming a film, and this may cause coloring. Thus, Tg is preferably kept at 250° C. or less.

The process of cooling and relaxation under a known thermal setting conditions can be applied in the stretching process. Appropriate adjustment should be made to obtain the characteristics required for the intended optical film.

The aforementioned stretching process and thermal setting process are applied as appropriate on an selective basis to provide the phase film function for the purpose of improving the physical properties of the phase film and to increase the angle of field in the liquid crystal display apparatus. When such a stretching process and thermal setting process are included, the heating and pressing process should be performed prior to the stretching process and thermal setting process.

When a retardation film is produced as a cellulose ester film, and the functions of the polarizing plate protective film are combined, control of the refractive index is essential. The refractive index control can be provided by the process of stretching. The process of stretching is preferred. The following describes the method for stretching:

In the retardation film stretching process, required retardations Ro and Rt can be controlled by a stretching at a ratio of 1.0 through 2.0 times in one direction of the cellulose resin, and at a ratio of 1.01 through 2.5 times in the direction perpendicular to that direction in the plane of the film. Here Ro denotes an in-plane retardation and Rt denotes the retardation in the thickness direction of the film.

Retardations Ro and Rt can be obtained by the following equations.

$$Ro = (nx - ny) \times d \quad \text{Equation (i)}$$

$$Rt = ((nx + ny)/2 - nz) \times d \quad \text{Equation (ii)}$$

(in the equations, nx represents an in-plane refractive index in the slow axis direction, ny represents an in-plane refractive index in the fast axis direction, nz represents a refractive index in the thickness direction of the film (the refractive indexes are measured at a wavelength of 590 nm under a condition of 23° C. and 55% RH), and d represents a thickness (nm) of the film)

The refractive index of the optical film can be measured, for example, by using an Abbe refractometer (4T), the thickness of the film can be measured, for example, by using a commercially available micrometer, and the retardation value can be measured, for example, by using an automatic birefringent meter KOBRA-21ADH (manufactured by Oji Scientific Instruments).

Stretching can be performed sequentially or simultaneously, for example, in the longitudinal direction of the film and in the direction perpendicular thereto in the same plane of the film, namely, across the width. In this case, if the stretching ratio at least in one direction is insufficient, sufficient retardation cannot be obtained. If it is excessive, stretching difficulties may occur and the film may break.

When the material is stretched in the melt-casting direction, the nz value will be excessive if there is excessive shrinkage across the width. This can be improved by controlling the shrinkage of the film across the width or by stretching across the width. In the case of stretching across the width, distribution may occur in the refractive index across the width. This distribution may appear when a tenter method is utilized. Stretching of the film across the width causes shrinkage force to appear at the center of the film because the ends are fixed in position. This is considered to be what is called "bowing". In this case, bowing can be controlled by stretching in the casting direction, and the distribution of the retardation across the width can be reduced.

Stretching in the biaxial directions perpendicular to each other reduces the fluctuation in the thickness of the obtained film. Excessive fluctuation in the thickness of the retardation film will cause irregularity in retardation. When used for liquid crystal display, irregularity in coloring or the like will occur.

The fluctuation in the thickness of the cellulose ester film is preferably kept within the range of ±3%, preferably ±1%. To achieve the aforementioned object, it is effective to use the method of stretching in the biaxial directions perpendicular to each other. The ratio of stretching in the biaxial directions perpendicular to each other is preferably 1.0 through 2.0 times in the casting direction, and 1.01 through 2.5 times across the width. Stretching in the range of 1.01 through 1.5 times in the casting direction and in the range of 1.05 through 2.0 times across the width will be more preferred to get a retardation value.

When the absorption axis of the polarizer is present in the longitudinal direction, matching of the transmission axis of the polarizer is found across the width. To get a longer polarizing plate, the retardation film is preferably stretched so as to get a low axis across the width.

When using the cellulose ester to get positive double refraction with respect to stress, stretching across the width will provide the low axis of the retardation film across the width because of the aforementioned arrangement. In this case, to improve display quality, the low axis of the retardation film is preferably located across the width. To get the target retardation value, it is necessary to meet the following condition.

(Stretching ratio across the width)>(stretching ratio in casting direction)

After stretching, the end of the film is trimmed off by a slitter 13 to a width predetermined for the product. Then both ends of the film are knurled (embossed) by a knurling apparatus made up of an emboss ring 14 and back roll 15, and the film is wound by a winder 16. This arrangement prevents sticking in the cellulose ester film F (master winding) or scratch. Knurling can be provided by heating and pressing a metallic ring having a pattern of projections and depressions on the lateral surface. The gripping portions of the clips on both ends of the film are normally deformed and cannot be used as a film product. They are therefore cut out and are recycled as a material.

In the film winding process, the film is wound on the winding roll while the shortest distance between the outer peripheral surface of the cylindrically wound film and the outer peripheral surface of the traveling type conveyance roll immediately before is kept at a minimum. Further, the front side of the winding roll is provided with a blower or the like that removes or reduces the potential on the film surface.

The winding machine to be used in the manufacture of a polarizing plate protective film of the present invention can be the one commonly employed. The film can be wound according to such a winding method as a constant tension method, constant torque method, taper tension method, and program tension control method of constant internal stress. In this case, the initial winding tension at the time of winding the polarizing plate protective film is preferably 90.2 through 300.8 N/m.

In the film winding process of the present invention, the film is wound preferably at a temperature of 20° C. through 30° C., with a relative humidity of 20% through 60% RH. When the temperature and humidity in the film winding process are controlled in this manner, the resistance of the retardation (Rt) along the length against the fluctuation in humidity can be improved.

If the temperature in the winding process is less than 20° C., wrinkles will occur and film winding quality is deteriorated so that the film cannot be put into practical use. This must be avoided. If the temperature in the film winding process has exceeded 30° C., wrinkles will also occur and film winding quality is deteriorated so that the film cannot be put into practical use. This must be avoided.

If the humidity in the film winding process is less than 20% RH, electrostatic charge will occur easily and the film winding quality is deteriorated so that the film cannot be put into practical use. If the humidity in the film winding process has exceeded 60% RH, the winding quality, sticking trouble and conveyance property will be deteriorated.

When the cellulose ester film is wound in a roll, any core located on the cylinder can be used as a winding core. It is preferably a hollow plastic core. Any material can be used as a plastic material, if it is a heat resistant plastic material capable of resisting the temperature at the time of heating. It can be exemplified by phenol resin, xylene resin, melamine resin, polyester resin, and epoxy resin. The thermosetting resin reinforced by such a filler as a glass fiber is preferably used, and is exemplified by a hollow plastic winding ore of FRP having an outer diameter of 6 inches (hereinafter an inch is equivalent to 2.54 cm) and an inner diameter of 5 inches.

The number of turns on such a winding core is preferably 100 or more, more preferably 500 or more. The winding width is preferably 5 cm or more. The width of the film substrate is preferably 80 cm or more, more preferably 1 m or more.

The thickness of the cellulose ester film of the present invention depends on the purpose of use, however, preferable is 10 through 500 μm. In particular, the lower limit is 20 μm, preferably 35 μm. The upper limit is 150 μm, preferably 120 μm. The particularly preferred range is 25 through 90 μm. In the case when the retardation film also works as a polarizing plate protective film, if the retardation film is too thick, the polarizing plate subsequent to machining will be too thick.

This fails to meet the requirements of thin and light weight when employed in the liquid crystal display for a notebook PC or mobile type electronic equipment. Conversely, if the retardation film is too thin, the retardation effect as a retardation film becomes difficult to obtain. Further, the moisture permeability of the film may be increased, resulting in that the polarizer cannot be effectively protected from moisture.

The low axis or high axis of the retardation film is present in the same plane of the film. Assume that the angle formed with the direction of film formation is θ1. Then the θ1 should be −1° through +1°, preferably −0.5° through +0.5°.

This θ1 can be defined as an orientation angle. It can be measured by an automatic birefringent meter KOBRA-21ADH (by Oji Scientific Instruments).

If θ1 meets the aforementioned formula, a high degree of brightness is ensured in the display image and a leakage of light is reduced or prevented, with the result that accurate color reproduction is available in the color liquid crystal display apparatus.

When the retardation film is used in the multiple-domain VA mode, the arrangement of the retardation film in which the fast axis is arranged to have θ1 in the aforementioned range may improve the display quality of the image. When the polarizing plate and the liquid crystal display are used for MVA mode, for example, a construction as shown in FIG. 7 may be applicable.

Figure 7:
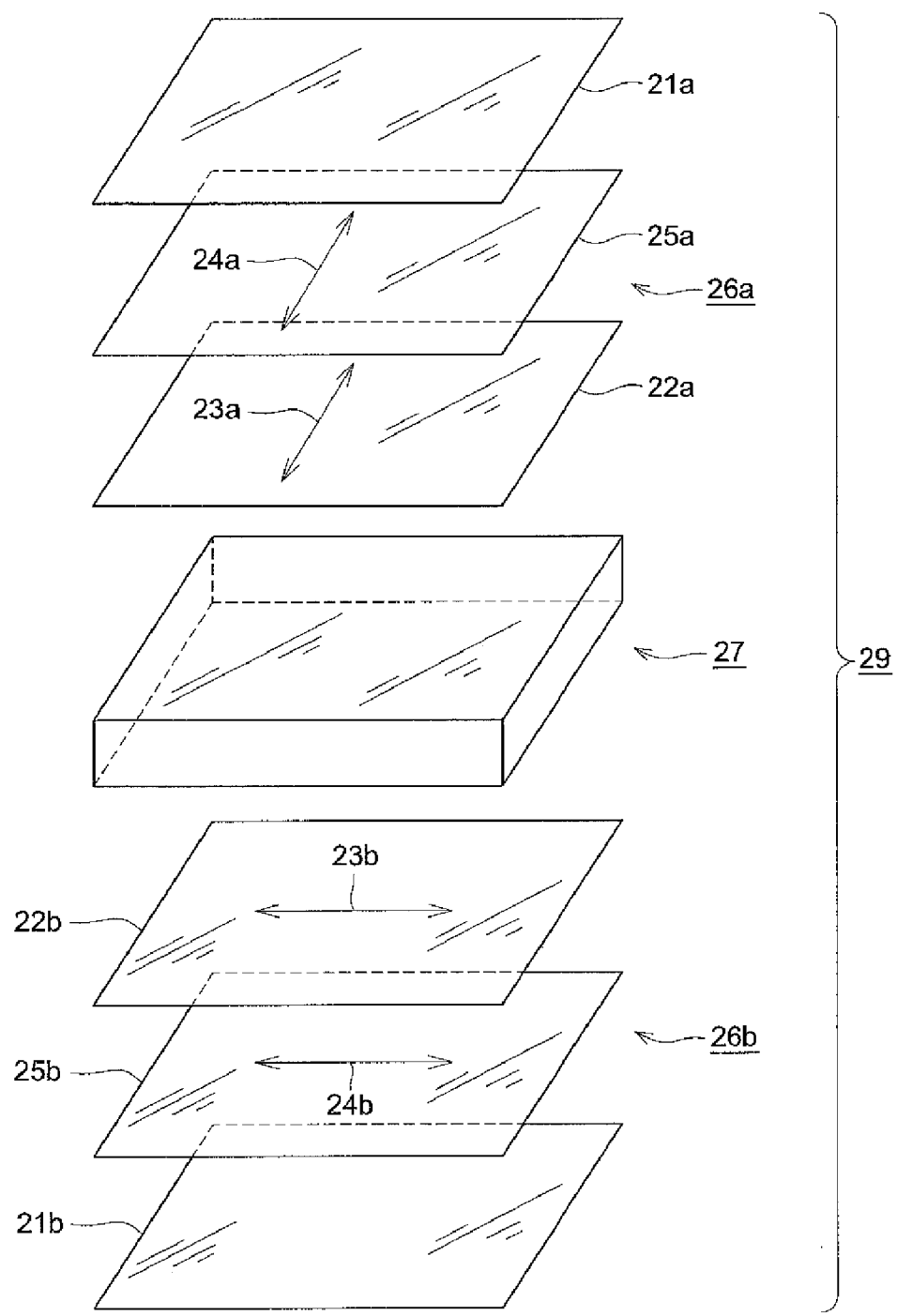
FIG. 7 is an oblique view of separated liquid crystal display showing a schematic construction of the display.
Figure 8:
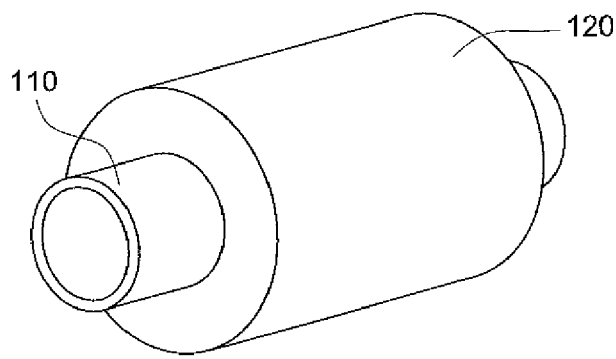
FIG. 8(a) illustrates storing condition of a cellulose ester original film.
FIG. 8(b) illustrates storing condition of a cellulose ester original film.
FIG. 8(c) illustrates storing condition of a cellulose ester original film.
Figure 8:
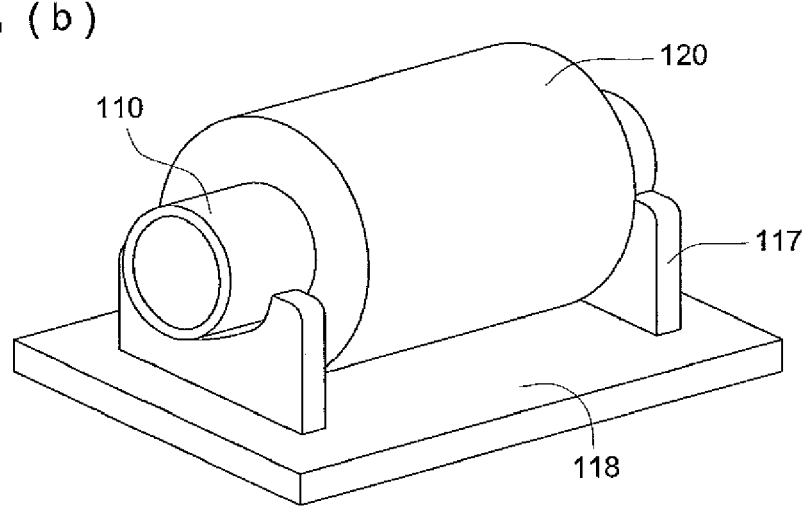
Figure 8:
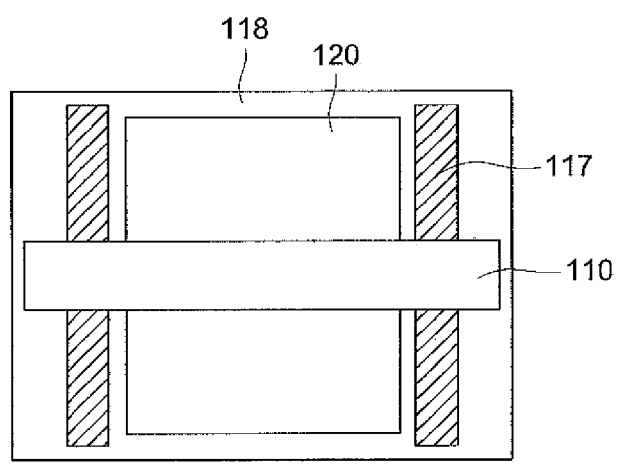

In FIG. 7, the reference numerals 21a and 21b indicate protective films, 22a and 22b represent retardation films, 25a and 25b show polarizers, 23a and 23b indicate the low-axis directions of the film, 24a and 24b show the directions of the polarizer transmission axis, 26a and 26b denote polarizing plates, 27 shows a liquid crystal cell, and 29 denotes a liquid crystal display apparatus.

The distribution of the retardation Ro in the in-plane direction of the cellulose ester film is adjusted to preferably 5% or less, more preferably 2% or less, still more preferably 1.5% or less. Further, the distribution of retardation Rt along the thickness of the film is adjusted to preferably 10% or less, more preferably 2% or less, still more preferably 1.5% or less.

In the retardation film, the fluctuation in the distribution of the retardation value is preferred to be as small as possible. When a polarizing plate containing the retardation film is used in the liquid crystal display apparatus, a smaller fluctuation in the distribution of the aforementioned retardation distribution is preferred for the purpose of preventing color irregularity.

In order to adjust the retardation film so as to provide the retardation value suited for improvement of the display quality of the liquid crystal cell in the VA mode or TN mode and to divide into the aforementioned multi-domain especially in the VA mode for preferable use in the MVA mode, adjustment must be made to ensure that the in-plane retardation Ro is greater than 30 nm without exceeding 95 nm, and retardation Rt along the thickness is greater than 70 nm without exceeding 400 nm.

The aforementioned in-plane retardation Ro has the following function: In the configuration shown in FIG. 7 wherein two polarizing plates are arranged in a crossed-Nicols configuration and a liquid crystal cell is arranged between the polarizing plates, assume a crossed-Nicols configuration with respect to the standard wherein observation is made from the direction normal to the display surface. When viewed obliquely from the line normal to the display surface, a deviation occurs from the crossed-Nicols arrangement of the polarizing plate, and causes the leakage of light. This leakage is mainly compensated for by the aforementioned in-plane retardation Ro. In the aforementioned TN mode and VA mode, particularly in the MVA mode, when the liquid crystal cell is set to the black-and-white display mode, the retardation along the thickness direction mainly compensates the double refraction of the liquid crystal cell recognized when viewed obliquely in the same manner as above.

As shown in FIG. 7, when two polarizing plates are arranged on the upper and lower portions of the liquid crystal cell in the liquid crystal display apparatus, the reference numerals 22a and 22b in FIG. 7 are cable of selecting the distribution of retardation Rt along the thickness. It is preferred to ensure that the requirements of the aforementioned range are met, and the total of both retardations Rt along the thickness is preferably greater than 140 nm without exceeding 500 nm. In this case, the in-plane retardation Ro and retardation Rt along the thickness retardation of 22a and 22b are preferably the same in view of improving the productivity of industrial polarizing plates. It is particularly preferred that the in-plane retardation Ro is greater than 35 nm without exceeding 65 nm, the retardation Rt along the thickness retardation is greater than 90 nm without exceeding 180 nm, and the structure shown in FIG. 7 is applied to the liquid crystal cell in the MVA mode.

In the liquid crystal display apparatus, assume that the TAC film having an in-plane retardation Ro of 0 through 4 nm, a retardation Rt along the thickness of 20 through 50 nm and a thickness of 35 through 85 μm is used at the position 22b in FIG. 7 as one of the polarizing plates, for example, as a commercially available polarizing plate protective film. In this case, the polarizing film arranged on the other polarizing plate, for example, the polarizing film arranged in 22a of FIG. 7 is preferred to have an in-plane retardation Ro of greater than 30 nm without exceeding 95 nm, and the retardation Rt along the thickness of greater than 140 nm without exceeding 400 nm. This arrangement improves the display quality and the film productivity.

<<Polarizing Plate>>

When the cellulose ester film relating to the present invention is used as a polarizing plate protective film, there is no restriction to the method of producing the polarizing plate. The polarizing plate can be manufactured by a commonly used method. It is preferable that the back surface of the cellulose ester film of the present invention is subjected to an alkaline saponification treatment and such treated film is adhered by using an aqueous solution of completely saponified polyvinyl alcohol to at least one surface of a polarizer manufactured by immersion in an iodonium solution followed by stretching. The cellulose ester film of the present invention may also be used on the other surface of the polarizer, or other polarizing plate protective film may be used. On the surface opposite to the cellulose ester film of the present invention, a commercially available cellulose ester film may be used as a polarizing plate protective film. Examples of a commercially available cellulose ester film which can be preferably used include KC8UX2M, KC4UX, KC5UX, KC4UY, KC8UY, KC12UR, KC8UCR-3, KC8UCR-4, KC4FR-1, KC8UY-HA and KC8UX-RHA (manufactured by Konica Minolta Opto Inc.). It is also preferable to use a polarizing plate protective film which also serves as an optical compensation film having an optical anisotropic layer which is formed by orienting a liquid crystal compound, such as a discotic liquid crystal, a rod-shaped liquid crystal or cholesteric liquid crystal. For example, an optical anisotropy layer can be formed by a method disclosed in JP-A No. 2003-98348. By using such a film in combination with the cellulose ester film of the present invention, a polarizing plate exhibiting excellent flatness and having a stable viewing angle enlarging effect may be obtained. As a polarizing plate protective film used on the other surface of the polarizer, a film other than a cellulose ester film, for example, a film of cyclic olefin resin, acryl resin, polyester or polycarbonate may be used.

Instead of the abovementioned alkali treatment, an easy-adhesion treatment such as disclosed in JP-A No. 6-94915 or No. 6-118232 may be employed to form a polarizing plate.

The polarizer as the major component of the polarizing plate is an element that allows the passage of only the light on the plane of polarization in a predetermined direction. The typical polarizer currently known is a polyvinyl alcohol polarizer film. There are two types of polyvinyl alcohol polarizer film, namely, a polyvinyl alcohol film stained by iodine or the one stained by a dichromatic dye. The polarizer is produced as follows: a film is formed from an aqueous solution containing polyvinyl alcohol; the film is uniaxially stretched and then stained or the film is stained first and then uniaxially stretched; and the produced film is preferably treated with a boron-containing compound to improve durability. The thickness of the polarizer is 5-40 µm, preferably 5-30 µm, and more preferably 5-20 µm. One surface of the cellulose ester film of the present invention is adhered on the surface of the polarizer to obtain a polarizing plate. An aqueous adhesive mainly containing completely saponified polyvinyl alcohol is preferably used for the adhesion.

A polarizer is subjected to uniaxial stretching (commonly in the longitudinal direction). When a polarizing plate is allowed to stand at high temperature and high humidity, the length in the stretching direction (commonly in the longitudinal direction) decreases, while the length in the perpendicular direction (commonly the width direction) increases. When the thickness of a polarizing plate protective film becomes smaller, the ratios of the above elongation and shrinkage increase. Specifically, the degree of contraction in the stretching direction of the polarizer increases. Generally, a polarizer is adhered to a polarizing plate protective film in the manner that the stretching direction of the polarizer is in accordance with the casting direction (being the MD direction) of the polarizing plate protective film, Consequently, it is important that when the thickness of the polarizing plate protective film is made smaller, the elongation or shrinkage ratio in the casting direction of the polarizing plate protective film should be suppressed. The cellulose ester film of the present invention is suitably applied to such a polarizing plate protective film due to excellent dimensional stability.

Namely, in a durability test at 60° C. and 90% RH, wavy unevenness does not increase. After the durability test, the polarizing plate having an optical compensating film on the reverse side results in no variation of viewing angle characteristics whereby it is possible to provide excellent visibility.

A polarizing plate is made up of a polarizer and polarizing plate protective films which protect the both surfaces of the polarizer. Further, a protective film may be adhered on one surface of the polarizing plate and a separate film may be adhered on the other surface of the polarizing plate. The protective film and separate film are employed to protect the polarizing plate at its shipping and product inspection. In this case, the protective film is adhered to protect the surface of the polarizing plate and is employed on the side opposite the side to adhere the polarizing plate to a liquid crystal plate. Further, the separate film is employed to cover the adhesion layer to adhere to the liquid crystal plate and is employed on the side to adhere the polarizing plate to a liquid cell.

<Liquid Crystal Display Apparatus>

The polarizing plate including the polarizing plate protective film employing the cellulose ester film of the present invention (including the case when it also works as a retardation film) provides higher display quality than the normal polarizing plate. This is particularly suited for use in a multi-domain type liquid crystal display apparatus, more preferably to the multi-domain type liquid crystal display apparatus in the double refraction mode.

The polarizing plate of the present invention of the present invention can be used in the MVA (Multi-domain Vertical Alignment) mode, PVA (Patterned Vertical Alignment) mode, CPA (Continuous Pinwheel Alignment) mode and DCB (Optical Compensated Bend) mode, without being restricted to a specific liquid crystal mode or polarizing plate arrangement.

The liquid crystal display apparatus is coming into practical use as a colored and animation display apparatus. The display quality is improved by the present invention. The improved contrast and enhanced polarizing plate durability ensure faithful animation image display without easy fatigue on the part of the viewer.

In the liquid crystal display apparatus containing at least the polarizing plate incorporating a retardation film, one polarizing plate containing the polarizing plate protective film of the present invention is arranged on the liquid crystal cell, or two polarizing plates are arranged on both sides of the liquid crystal cell. In this case, the display quality is improved when means are provided to ensure that the side of the polarizing plate protective film of the present invention contained in the polarizing plate faces the liquid crystal cell of the liquid crystal display apparatus.

Then the films 22a and 22b of FIG. 7 face the liquid crystal cell of the liquid crystal display apparatus. In the aforementioned structure, the polarizing plate protective film employing the cellulose ester film of the present invention provides optical compensation of the liquid crystal cell. When the polarizing plate of the present invention is used in the liquid crystal display apparatus, at least one of the polarizing plates of the liquid crystal display apparatus should be used as a polarizing plate of the present invention. Use of the polarizing plate of the present invention improves the display quality and provides a liquid crystal display apparatus having excellent angle of field.

In the polarizing plate of the present invention, a polarizing plate protective film employing a cellulose derivative may be used on the surface of the polarizer opposite to the polarizing plate protective film employing the cellulose ester film of the present invention. A common TAC film may be employed. The polarizing plate protective film located far from the liquid crystal cell may be provided with another functional layer for the purpose of improving the quality of the display apparatus.

For example, in order to avoid reflection, glare, scratch and dust, and to improve brightness, a film containing a known functional layer as a display may be laminated on the surface of the polarizing plate of the present invention, however, the present invention is not limited thereto.

Generally, to ensure stable optical characteristics, the retardation film is required to exhibit a small fluctuation in the aforementioned retardation value Ro or Rt. Specifically, these fluctuations may affect irregularities of an image in the liquid crystal display apparatus in the double refraction mode.

Since the long length cellulose ester film produced by the melt casting method of the present invention mainly contains cellulose eater, an alkaline treatment employing saponification which is characteristic to cellulose ester may be applied. When the resin constituting the polarizer is polyvinyl alcohol, such an alkaline treatment enables laminating the polarizing plate protective film made of the long length cellulose ester film with a polarizer using an aqueous solution containing a completely saponified polyvinyl alcohol, like the conventional polarizing plate protective film. Thus, the embodiment of the present invention is superior in that the conventional method for manufacturing the polarizing plate can be applied. It is specifically advantageous in that a longer roll polarizing plate can be obtained.

The production advantage obtained from the present invention is remarkable specifically in the case of a longer roll of 100 m or more. Greater advantages are obtained in the production of a polarizing plate when it is longer than, for example, 1500 m, 2500 m or 5000 m.

For example, in the production of a cellulose ester film, roll length is 10-5000 m, preferably 50-4500 m when the productivity and transportability are taken into account. The width of a film in this case can be selected to suit the width of the polarizer or the width suitable for the production line. It is possible to produce a film having a width of 0.5-4.0 m, preferably 0.6-3.0 m, and to wind the film in the form of a roll, which can be used to process a polarizing plate. It is also possible to manufacture a film having a width twice or more as great as the intended width, and to wind it in a roll, which is cut to get the roll of an intended width. This roll can be used to process the polarizing plate.

When manufacturing the polarizing plate protective film, a functional layer such as antistatic layer, hard coated layer, easy glidability, adhesive layer, antiglare layer and barrier layer can be coated before and/or after stretching. In this case, various forms of surface treatment such as corona discharging, plasma processing, medical fluid treatment can be provided wherever required.

In the film making process, the gripping portions of the clips on both edges of the film having been cut can be recycled as the material of the same type or different type of films, after having been pulverized, or after having been palletized as required.

A cellulose ester film of lamination structure can be produced by co-extrusion of the compositions containing cellulose esters having different concentrations of additives such as the aforementioned plasticizer, ultraviolet absorber or matting agent. For example, a cellulose ester film made up of a skin layer/core layer/skin layer can be produced. For example, a large quantity of matting agent can be incorporated in the skin layer or the matting agent can be contained only in the skin layer. Larger amounts of plasticizer and ultraviolet absorber can be contained in the core layer than in the skin layer. They may be contained only in the core layer. Further, the types of the plasticizer and ultraviolet absorber can be changed in response to the core layer or skin layer. For example, it is also possible to make such arrangements that the skin layer contains a plasticizer and/or ultraviolet absorber of lower volatility, and the core layer contains a plasticizer of excellent plasticity or an ultraviolet absorber of excellent ultraviolet absorbing performance. The glass transition temperatures of the skin layer and core layer may be different from each other. The glass transition temperature of the core layer is preferably lower than that of the skin layer. In this case, the glass transition temperatures of both the skin and core are measured, and the average value obtained by calculation from the volume fraction thereof is defined as the aforementioned glass transition temperature Tg so that it is handled in the same manner. Further, the viscosity of the melt including the cellulose ester at the time of melt-casting may be different according to the skin layer or core layer. The viscosity of the skin layer may be greater than that of the core layer. Alternatively, the viscosity of the core layer may be equal to or greater than that of the skin layer.

In the cellulose ester film of the present invention, assuming that the dimensional stability is based on the standard dimensions of the film which has been left to stand for 24 hours at a temperature of 23° C. with a relative humidity of 55% RH, the dimensional stability of the film for display apparatus of the present invention is such that the fluctuation of the dimension at 80° C. and 90% RH is less than ±2.0%, preferably less than ±1.0%, more preferably less than ±0.5%.

When the cellulose ester film of the present invention is used as a polarizing plate protective film also having a function of a retardation film, it is preferable that the retardation film itself has a fluctuation of the dimension within the aforementioned range, because the absolute value of the retardation as a polarizing plate and the orientation angle may not be deviated from the initial setting, or because the display quality or ability to improve the display quality may not be deteriorated.

The best mode to carry out the present invention will be explained in detail below, however, the present invention is not limited thereto. "Parts" as shown below represents "parts by mass".

First, used materials will be described.

SYNTHESIS EXAMPLE 1

Synthesis of Cellulose Ester Resin 1

Synthesis was performed referring to example B of Japanese Translation of PCT International Application Publication No. 6-501040.

Following mixed solutions A-E were prepared.

A: Propionic acid:concentrated sulfuric acid=5:3 (mass ratio)
B: Acetic acid:pure water=3:1 (mass ratio)
C: Acetic acid:pure water=1:1 (mass ratio)
D: Acetic acid:pure water:magnesium carbonate=12:11:1 (mass ratio)
E: An aqueous solution in which 0.5 mol of potassium carbonate and 1.0 mol of citric acid were dissolved in 14.6 kg of pure water In a reaction vessel equipped with a mechanical stirrer, charged were 100 mass parts of cellulose purified from cotton, 317 mass parts of acetic acid and 67 mass parts of propionic acid, the resulting solution was stirred for 30 minutes at 55° C. After the temperature of the reaction vessel was cooled to 30° C., the solution was added with 2.3 mass parts of solution A and stirred for 30 minutes. After the reaction vessel was cooled to −20° C., the reaction mixture was added with 100 mass parts of acetic acid anhydride and 250 mass parts of propionic acid anhydride and stirred for 1 hour. After the temperature of the reaction vessel was raised to 10° C., the resulting mixture was added with 4.5 mass parts of solution A and heated to 60° C. to be stirred for 3 hours. Further, the resulting system was added with 533 mass parts of solution B and stirred for 17 hours. Further, the resulting system was added with 333 mass parts of solution C and 730 mass parts of solution D and stirred for 15 minutes. After the impurities were filtered, the solution was added with water while stirring until generation of precipitate was completed, and then the generated white precipitate was filtered. The prepared white solid was washed with pure water until the washed solution became neutral. This wet product was added with 1.8 mass parts of solution E followed by being dried under vacuum at 70° C. for 3 hours, whereby cellulose acetate propionate was prepared.

The substitution degree of the prepared cellulose acetate propionate was calculated according to ASTM-D817-96; the acetyl substitution degree was 1.9 and a propionyl substitution degree was 0.7. Further, GCP measurement under the following conditions was performed to determine the weight average molecular weight to be 200,000.
(Conditions of GPC Measurement)
  Solvent: Tetrahydrofuran
  Equipment: HLC-8220 (manufactured by Toso Co., Ltd.)
  Column: TSK gel Super HM-M (manufactured by Toso Co., Ltd.)
  Column temperature: 40° C.
  Sample temperature: 0.1 weight %
  Injection amount: 10 µl
  Flow rate: 0.6 ml/min
  Correction curve: Standard polystyrene: PS-1 (manufactured by Polymer Laboratories Co., Ltd.), A correction curve based on 9 samples having Mw=2,560,000–580 was employed.

SYNTHESIS EXAMPLE 2

Synthesis of Pentaerythritol Teterapivaiate (PETP)

Pentaerythritol teterapivaiate, which is utilized in an example of patent literature 5 as PL2, was synthesized.

In a solution containing 34 mass parts of pentaerythritol, 101 mass parts of triethylamine and 2,000 mass parts of ethyl acetate, 121 mass parts of pivaloyl chloride was added in drops over 30 minutes at an ambient temperature, and stirring was further continued for 1 hour. Then produced white precipitate was removed by filtration and the product was washed by addition of pure water. The organic phase was separated and the organic solvent was removed by evaporation under reduced pressure, whereby 89 mass parts (yield of 75%) of white crystals were obtained. Herein, the molecular weight of this compound was 473.

SYNTHESIS EXAMPLE 3

Synthesis of Compound (B-7) Used in the Examples

Mixed were 76 mass parts trimethylene glycol, 535 mass parts of phenyl salicylate and 1 mass part of potassium carbonate. The mixture was heated at 155° C. for 3 hours under a pressure of $1.33 \times 10^4$ Pa. While the heating, 188 mass parts of phenol was distilled away. After the pressure was brought to ambient pressure, the vessel was cooled to 100° C. and 0.5 mass part of concentrated sulfuric acid and 225 mass parts of acetic anhydride were added followed by agitating at 100° C. for 1 hour. After the reaction was over, 1000 mass parts of toluene was added and the vessel was cooled with ice, whereby white crystals were obtained. The white crystals were separated by filtration and washed twice with pure water followed by drying under reduced pressure at 30° C. to obtain 224 mass parts of white crystals (yield of 56%). The molecular weight of this compound was 400.

SYNTHESIS EXAMPLE 4

Synthesis of (B-10) Used in the Examples

The synthesis was carried out by referring Chem. Abstr. Vol. 72, page 123088f.

While stirring the mixed solution of 148 mass parts of phthalic anhydride and 101 mass parts of triethylamine held at 100° C., 45 mass parts of 1,4-butanediol was added in drops over 30 minutes and further stirred for 30 minutes. Subsequently, 190 mass parts of benzyl chloride was added in drops over 30 minutes and the mixture was stirred for 3 hours after the temperature was increased to 150° C. The resulting mixture was cooled to room temperature after the reaction was over and the precipitate was removed by filtration. Then the product was washed by adding ethyl acetate and pure water, the organic phase was separated and ethyl acetate was distilled away, whereby 510 mass parts (yield of 90%) of light yellow liquid was obtained. The molecular weight of this compound was 567.

SYNTHESIS EXAMPLE 5

Synthesis of Compound (B-42) Used in the Examples

Monomethylphthalate of 180 mass parts, 180 mass parts of toluene, 1 mass part of dimethylformamide and 130 mass parts of thionyl chloride were mixed and stirred for 30 minutes at 60° C. The resulting solution was cooled after finishing the reaction to obtain light yellow liquid.

In a solution containing 31 mass parts of glycerin, 101 mass parts of triethylamine and 200 mass parts of ethyl acetate, the light yellow liquid obtained in the above reaction was added in drops at ambient temperature over 30 minutes, and then stirring was continued for 1 hour. Then produced white precipitate was removed by filtration and the product was washed by addition of pure water. The organic phase was separated and the organic solvent was removed by evaporation under reduced pressure, whereby 116 mass parts (yield of 60%) of white crystals were prepared. Herein the molecular weight of this compound was 579.

SYNTHESIS EXAMPLE 6

Synthesis of Compound (B-47) Used in the Examples

While stirring the mixed solution of 45 mass parts of 2-ethyl-2-hydroxymethyl-1,3-propanediol, 190 mass parts of pyridine and 450 mass parts of ethyl acetate held at 80° C., 330 mass parts of acetylsalicyloyl chloride was added in drops over 30 minutes and further stirred for 3 hours. The resulting mixture was cooled to room temperature after the reaction was over and the precipitate was removed by filtration. Then the product was washed by adding ethyl acetate and pure water, the organic phase was separated and ethyl acetate was distilled away under a reduced pressure, whereby the objective compound was obtained. The molecular weight of this compound was 606.

SYNTHESIS EXAMPLE 7

Synthesis of Compound (B-49) Used in the Examples

While stirring the mixed solution of 45 mass parts of 2-ethyl-2-hydroxymethyl-1,3-propanediol, 190 mass parts of pyridine and 450 mass parts of ethyl acetate held at 80° C., 290 mass parts of o-toluoyl chloride was added in drops over 30 minutes and further stirred for 3 hours. The resulting mixture was cooled to room temperature after the reaction was over and the precipitate was removed by filtration. Then the product was washed by adding ethyl acetate and pure water, the organic phase was separated and ethyl acetate was distilled away under a reduced pressure, whereby the objective compound was obtained. The molecular weight of this compound was 537.

SYNTHESIS EXAMPLE 8

Synthesis of Compound (B-62) used in the Examples

Mixed were 136 mass parts of pentaerythritol, 1070 mass parts of phenyl salicylate and 2 mass parts of potassium carbonate. The mixture was heated at 155° C. for 3 hours under a pressure of $1.333 \times 10^{-2}$ MPa. While heating, 375 mass parts of phenol was distilled away. After the pressure was brought to ambient pressure, the vessel was cooled to 100° C. and 1 mass part of concentrated sulfuric acid and 450 mass parts of acetic anhydride were added followed by stirring at 100° C. for 1 hour. After the reaction was over, 2000 mass parts of toluene was added and the vessel was cooled with ice, whereby white crystals were obtained. The white crystals were separated by filtration and washed twice with pure water followed by drying under vacuum at 30° C. to obtain 667 mass parts of white crystals (yield of 85%). The molecular weight of this compound was 785.

SYNTHESIS EXAMPLE 9

Synthesis of Compound (B-99) Used in the Examples

While stirring a mixed solution of 45 mass parts of trimethylolpropane and 101 mass parts of triethylamine kept at 100° C., 71 mass parts of benzoyl chloride was added in drops over 30 minutes, and the resulting solution was further stirred for 30 minutes. The resulting mixture was cooled to room temperature after finishing the reaction and the precipitate was removed by filtration. Then the product was washed by addition of ethyl acetate and pure water, the organic phase was separated and ethyl acetate was removed by evaporation under reduced pressure, whereby 126 mass parts (yield of 85%) of white crystals were obtained. Herein, the molecular weight of this compound was 446.

SYNTHESIS EXAMPLE 10

Synthesis of Compound (B-101) Used in the Examples

In Synthesis Example 7, o-toluoyl chloride was changed to m-toluoyl chloride, whereby the objective compound was obtained. The molecular weight of this compound was 537.

SYNTHESIS EXAMPLE 11

Synthesis of Compound (B-102) Used in the Examples

In Synthesis Example 7, o-toluoyl chloride was changed to p-toluoyl chloride, whereby the objective compound was obtained. The molecular weight of this compound was 537.

SYNTHESIS EXAMPLE 12

Synthesis of Compound (B-103) Used in the Examples

In Synthesis Example 7, o-toluoyl chloride was changed to 390 mass parts of 3,4,5-trimethoxy benzoyl chloride, whereby the objective compound was obtained. The molecular weight of this compound was 717.

SYNTHESIS EXAMPLE 13

Synthesis of Compound (B-104) Used in the Examples

In Synthesis Example 6, acetylsalicyloyl chloride was changed to monomethyl terephthalate, whereby the objective compound was obtained. The molecular weight of this compound was 621.

SYNTHESIS EXAMPLE 14

Synthesis of Compound (B-105) Used in the Examples

While stirring a mixed solution containing 37 mass parts of glycerin, 111 mass parts of pyridine and 500 mass parts of ethyl acetate kept at 10° C., a solution of 277 mass parts of 3,4,5-trimethoxybenzoyl chloride dissolved in 500 mass parts of toluene was added in drops over 30 minutes, followed by being heated to 110° C. and stirred for 5 hours. After finishing the reaction, the resulting mixture was cooled to room temperature and the precipitate was removed by filtration. Then the product was washed by addition of 1 mol/L HCl aqueous solution and further washed by addition of 1% $Na_2CO_3$ aqueous solution. The organic phase was separated and toluene was removed by evaporation under reduced pressure. After the purification, 224 mass parts (yield of 83%) of white crystals were obtained. Herein the molecular weight of this compound was 675.

SYNTHESIS EXAMPLE 15

Synthesis of Compound (B-106) Used in the Examples

While stirring the mixed solution of 45 mass parts of pentaerythritol, 190 mass parts of pyridine and 450 mass parts of ethyl acetate held at 80° C., 310 mass parts of 3,4,5-trimethoxy benzoyl chloride was added in drops over 30 minutes and further stirred for 3 hours. The resulting mixture was cooled to room temperature after the reaction was over and the precipitate was removed by filtration. Then the product was washed by adding ethyl acetate and pure water, the organic phase was separated and ethyl acetate was distilled away under a reduced pressure, whereby the objective compound was obtained. The molecular weight of this compound was 913.

SYNTHESIS EXAMPLE 16

Synthesis of Compound (C-1) Used in the Examples

In a reaction vessel equipped with a condenser, 699 mass parts of ethylene glycol, 1180 mass parts of succinic acid and 0.03 mass parts of tetrabutyl titanate were charged. A dehydrating condensation reaction was carried out at 140° C. for 2 hours, subsequently at 220° C. for 2 hours, and, with removing the condenser, at 220° C. for further 20 hours to obtain aliphatic polyester compound C-1 having a number average molecular weight of 2,000. The average carbon numbers of diol and dicarboxylic acid, which were utilized in this reaction, were 3.33 and 4, respectively.

SYNTHESIS EXAMPLE 15

Synthesis of Compound (C-2) Used in the Examples

In a reaction vessel equipped with a condenser, 236 mass pars of ethylene glycol, 683 mass parts of 1,4 butylene glycol, 1180 mass parts of succinic acid and 0.03 mass parts of tetrabutyl titanate were charged. By conducting a similar operation as that of Synthesis Example 1, aliphatic polyester compound C-2 having a number average molecular weight of 2,000 was prepared. The average carbon numbers of diol and dicarboxylic acid, which were utilized in this reaction, were 2 and 4, respectively.

SYNTHESIS EXAMPLE 17

Synthesis of Compound (C-3) used in the Examples

In a reaction vessel equipped with a condenser, 702 mass parts of ethylene glycol, 885 mass parts of succinic acid, 365 mass parts of adipic acid, and 0.03 mass part of tetrabutyl titanate were charged. By conducting a similar operation as that of Synthesis Example 1, aliphatic polyester compound C-3 having a number average molecular weight of 2,000 was prepared. The average carbon numbers of diol and dicarboxylic acid, which were utilized in this reaction, were 2 and 4.5, respectively.

SYNTHESIS EXAMPLE 18

Synthesis of Compound (C-4) used in the Examples

In a reaction vessel equipped with a condenser, 631 mass parts of ethylene glycol, 101 mass parts of 1,4-butanediol, 1062 mass parts of succinic acid, 146 mass parts of adipic acid, and 0.03 mass part of tetrabutyl titanate were charged. By conducting a similar operation as that of Synthesis Example 1, aliphatic polyester compound C-4 having a number average molecular weight of 2,000 was prepared. The average carbon numbers of diol and dicarboxylic acid, which were utilized in this reaction, were 2.2 and 4.2, respectively.

SYNTHESIS EXAMPLE 19

Synthesis of Compound (C-5) used in the Examples

In a reaction vessel equipped with a condenser, 226 mass parts of ethylene glycol, 656 mass parts of 1,4-butanediol, 1180 mass parts of succinic acid, and 0.03 mass part of tetra-butyl titanate were charged. By conducting a similar operation as that of Synthesis Example 1, aliphatic polyester compound C-5 having a number average molecular weight of 4,000 was prepared. The average carbon numbers of dial and dicarboxylic acid, which were utilized in this reaction, were 3.33 and 4, respectively.

SYNTHESIS EXAMPLE 20

Synthesis of Compound (C-6) Used in the Examples

In a reaction vessel equipped with a condenser, 249 mass parts of ethylene glycol, 721 mass parts of 1,4-butanediol, 1180 mass parts of succinic acid, and 0.03 mass part of tetra-butyl titanate were charged. By conducting a similar operation as that of Synthesis Example 1, aliphatic polyester compound C-6 having a number average molecular weight of 1,200 was prepared. The average carbon numbers of dial and dicarboxylic acid, which were utilized in this reaction, were 3.33 and 4, respectively.

SYNTHESIS EXAMPLE 21

Synthesis of Compound (C-7) Used in the Examples

In a reaction vessel equipped with a condenser, 648 mass parts of ethylene glycol, 58 mass parts of diethylene glycol, 1121 mass parts of succinic acid, 83 mass parts of terephthalic acid, and 0.03 mass part of tetra-butyl titanate were charged. By conducting a similar operation as that of Synthesis Example 1, aliphatic polyester compound C-7 having a number average molecular weight of 1,500 was prepared. The average carbon numbers of diol and dicarboxylic acid, which were utilized in this reaction, were 2.1 and 4, respectively.

The above compounds C-1 to C-7 have R4, R5, R6, and R7 in the above repeating unit (c) as shown in Table 2.

TABLE 2

| | Substituent in Repeating unit (c) | | | | | |
|---|---|---|---|---|---|---|
| Compound | $R_4$ and/Or $R_7$ | Average carbon number of diol | $R_5$ | Average carbon number of dicarboxylic acid | $R_6$ | Number average molecular weight |
| C-1 | —$C_2H_4$—<br>—$C_4H_8$— | 3.33 | —$C_2H_4$— | 4 | — | 2000 |
| C-2 | —$C_2H_4$— | 2 | —$C_2H_4$— | 4 | — | 2000 |
| C-3 | —$C_2H_4$— | 2 | —$C_2H_4$—<br>—$C_4H_8$— | 4.5 | — | 2000 |
| C-4 | —$C_2H_4$—<br>—$C_4H_8$— | 2.2 | —$C_2H_4$—<br>—$C_4H_8$— | 4.2 | — | 2000 |
| C-5 | —$C_2H_4$—<br>—$C_4H_8$— | 3.33 | —$C_2H_4$— | 4 | — | 4000 |
| C-6 | —$C_2H_4$—<br>—$C_4H_8$— | 3.33 | —$C_2H_4$— | 4 | — | 1200 |
| C-7 | —$C_2H_4$—<br>—$C_2H_4$—O<br>—$C_2H_4$— | 2.1 | —$C_2H_4$— | 4 | Phenylene group | 1500 |

SYNTHESIS EXAMPLE 23

Synthesis of Compounds P-1, P-2 used in the Examples

According to the synthesis method disclosed in JP-A No. 2006-64803, polymer UV absorbers P-1 and P-2 were synthesized. P-1 represents 2(2'-hydroxy-5'-t-butyl-phenyl)-5-carboxylic acid-(2-methacryloyloxy)ethyl ester-2H-benzotriazole. P-2 represents a compound having the mixing ratio of 2(2'-hydroxy-5'-t-butyl-phenyl)-5-carboxylic acid-(2-methacryloyloxy)ethyl ester-2H-benzotriazole:methyl methacrylate:hydroxyethyl methacrylate=40:50:10. The structure of P-1 will be shown below.

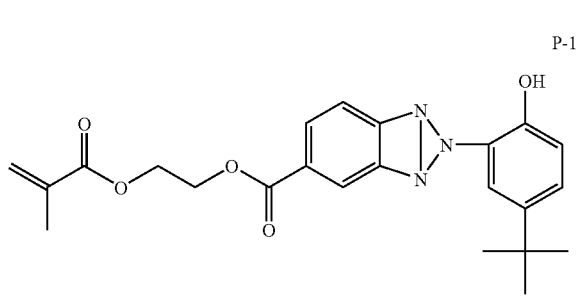

P-1

EXAMPLES

The present invention will now be specifically explained with referring to examples, however, the present invention is not limited to the examples.

Example 1

Cellulose ester resin 1 of 100 mass parts was dried at 130° C. under ordinary pressure for 2 hours in the air, and cooled to room temperature. This cellulose ester was added with 5 mass parts of B-99 and 5 mass parts of C-1, as compounds of the present invention, and further with 0.5 mass part of Irganox 1010 and 0.25 mass parts of GSY-P101, followed by being melt mixed and pellettd at 230° C. by use of a biaxial extruder. This pellet was melt at a melting temperature of 250° C. to be extruded from a T die under a nitrogen atmosphere, being extruded from casting die 4 onto first cooling roll 5, and then the extruded essed between first cooling roll and touch roll 6 to be molded. The length L from position P1, where resin extruded from casting die 4 contacted on first cooling roll 5, to position P2, that is the upstream edge of first cooling roll 5 from the nip of first cooling roll 5 and touch roll 6, was set to 20 mm. Thereafter, touch roll 6 is separated from first cooling roll and temperature T of a melting part immediately before pressing by the nip between first cooling roll 5 and touch roll 6 was measured. In this example, temperature T of a melting part immediately before pressing by the nip between first cooling roll 5 and touch roll 6 was measured, at a position further upstream by 1 mm from the upper stream edge of the nip P2 by use of a thermometer (HA-200E, produced by Anritsu Meter Co., Ltd.). In this example, temperature T was measured to be 141° C. A linear load of touch roll 6 against first cooling roll was set to 14.7 N/cm.

Herein, extrusion quantity and a pulling speed were adjusted so as to make a film thickness of 80 μm; a finished film width was set to 1,800 mm and a roll length to 3,200 m. Further, the both edges of film were subjected to a knurling treatment of 10 mm wide and 5 μm high. Film was wound on a core at a winding tension of 220 N/m and a taper of 40%.

The core had a size of an inner diameter of 152 mm, an outer diameter of 180 mm and a length of 1.92 m. As a core mother material, prepreg resin containing glass fiber and carbon resin impregnated with epoxy resin was utilized. The core surface was coated with epoxy conductive resin and polished to make finish having a surface roughness of 0.3μ. This film mother roll sample was designated as cellulose ester film 1-1 of the present invention.

Next, Samples 1-2-1-17 of the present invention and comparative samples 1-18-1-24 were prepared in the same manner, except that a compound added and an antioxidant were changed to compounds and addition amounts described in tables 3 and 4.

TPP is an abbreviation of triphenylphosphate and was purchased from Sigma-Aldrich Corp. Further, FP500 was purchased from Adeka Corp. Irganox 1010 was purchased from Ciba Specialty Chemicals Co., Ltd, and GSY-P101 from API Corp. Film prepared was subjected to the following evaluations.

Comparative plasticizers

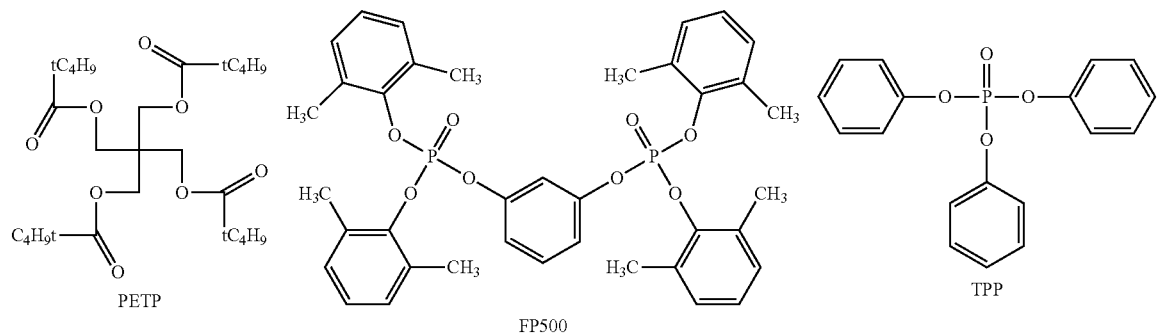

-continued

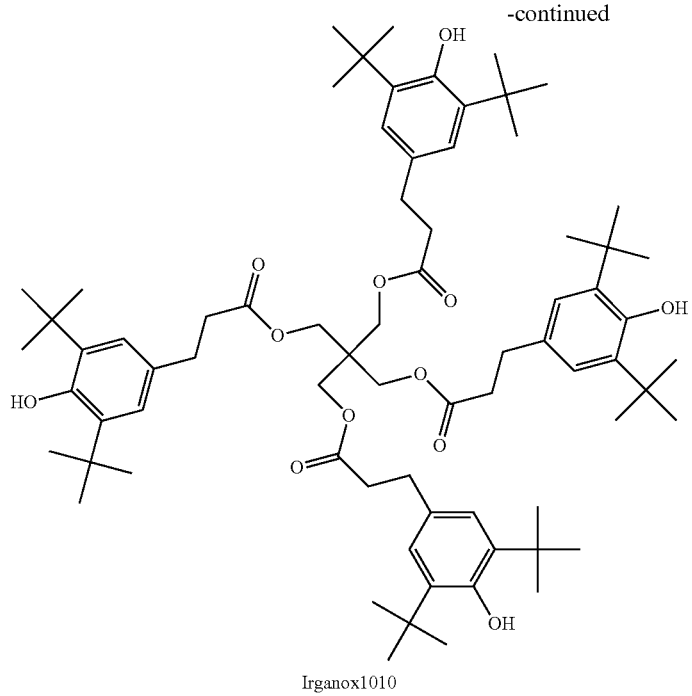
Irganox1010

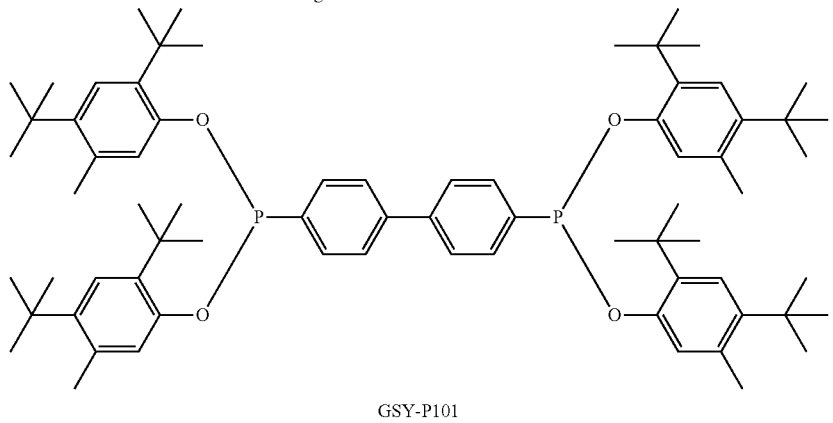
GSY-P101

TABLE 3

| Sample No. | Compound | Addition amount (mass parts) | Compound | Addition amount (mass parts) | Antioxidant | Addition amount (mass parts) | Antioxidant | Addition amount (mass parts) | Remarks |
|---|---|---|---|---|---|---|---|---|---|
| 1-1 | B-99 | 5 | C-1 | 5 | Irganox1010 | 0.5 | GSY-P101 | 0.25 | Inv. |
| 1-2 | B-99 | 5 | C-2 | 5 | Irganox1010 | 0.5 | GSY-P101 | 0.25 | Inv. |
| 1-3 | B-47 | 5 | C-2 | 5 | Irganox1010 | 0.5 | GSY-P101 | 0.25 | Inv. |
| 1-4 | B-47 | 8 | C-2 | 5 | Irganox1010 | 0.5 | GSY-P101 | 0.25 | Inv. |
| 1-5 | B-49 | 5 | C-2 | 5 | Irganox1010 | 0.5 | GSY-P101 | 0.25 | Inv. |
| 1-6 | B-49 | 8 | C-2 | 5 | Irganox1010 | 0.5 | GSY-P101 | 0.25 | Inv. |
| 1-7 | B-62 | 5 | C-3 | 5 | Irganox1010 | 0.5 | GSY-P101 | 0.25 | Inv. |
| 1-8 | B-10 | 5 | C-4 | 5 | Irganox1010 | 0.5 | GSY-P101 | 0.25 | Inv. |
| 1-9 | B-7 | 5 | C-5 | 5 | Irganox1010 | 0.5 | GSY-P101 | 0.25 | Inv. |
| 1-10 | B-42 | 8 | C-6 | 5 | Irganox1010 | 0.5 | GSY-P101 | 0.25 | Inv. |
| 1-11 | B-43 | 8 | C-2 | 5 | Irganox1010 | 0.5 | GSY-P101 | 0.25 | Inv. |
| 1-12 | B-62 | 5 | C-7 | 5 | Irganox1010 | 0.5 | GSY-P101 | 0.25 | Inv. |
| 1-13 | B-101 | 8 | C-7 | 5 | Irganox1010 | 0.5 | GSY-P101 | 0.25 | Inv. |
| 1-14 | B-102 | 8 | C-7 | 5 | Irganox1010 | 0.5 | GSY-P101 | 0.25 | Inv. |
| 1-15 | B-103 | 8 | C-7 | 5 | Irganox1010 | 0.5 | GSY-P101 | 0.25 | Inv. |
| 1-16 | B-41 | 8 | C-7 | 5 | Irganox1010 | 0.5 | GSY-P101 | 0.25 | Inv. |

Inv.: Invention

TABLE 4

| Sample No. | Compound | Addition amount (mass parts) | Compound | Addition amount (mass parts) | Antioxidant | Addition amount (mass parts) | Antioxidant | Addition amount (mass parts) | Remarks |
|---|---|---|---|---|---|---|---|---|---|
| 1-17 | B-64 | 8 | C-7 | 5 | Irganox1010 | 0.5 | GSY-P101 | 0.25 | Inv. |
| 1-18 | B-99 | 10 | — | — | Irganox1010 | 0.5 | GSY-P101 | 0.25 | Comp. |
| 1-19 | — | — | C-1 | 10 | Irganox1010 | 0.5 | GSY-P101 | 0.25 | Comp. |
| 1-20 | TPP | 10 | — | — | Irganox1010 | 0.5 | GSY-P101 | 0.25 | Comp. |
| 1-21 | TPP | 5 | C-2 | 5 | Irganox1010 | 0.5 | GSY-P101 | 0.25 | Comp. |
| 1-22 | FP500 | 5 | C-2 | 5 | Irganox1010 | 0.5 | GSY-P101 | 0.25 | Comp. |
| 1-23 | TPP | 5 | C-2 | 5 | Irganox1010 | 0.5 | GSY-P101 | 0.25 | Comp. |
| 1-24 | PETP | 5 | C-1 | 5 | Irganox1010 | 0.5 | GSY-P101 | 0.25 | Comp. |

Inv.: Invention, Comp.: Comparison

<Measurement of Moisture Permeability>

Moisture permeability was measured according to a method described in JIS-Z-0208. Herein, a condition at measurement was 40° C. and 90% RH. A relative value was shown when a value of sample 1-20 was set to 100. The smaller is a value, the lower is permeability, which is preferable.

<Evaluation of Bleed-Out>

The sample, after having been kept under an environment of 80° C. and 90% RH for 2 weeks, was rehumidified under 23° C. and 55% RH and then subjected to a wipe-off test with a waste cloth and a bleeding test with a marker pen against the film. Those generated a wiped mark when the film surface was wiped with a waste cloth were ranked as C; those generated bleeding at writing with a marker pen were ranked as C; and those in which neither of them are recognized were ranked as A. Those in which either one of them was slightly observed were ranked as B.

<Yellowness (YI) Measurement>

Absorption spectrum of prepared cellulose ester film was measured by use of Spectrophotometer U-3310 manufactured by Hitachi High Technologies Co., Ltd. to calculate three tristimulus values X, Y and Z. Yellowness YI was calculated from these tristimulus values based on JIS-K7103 and ranking was made according to the following criteria.

A: Less than 0.8
B: 0.8 or more but less than 1.0
C, 1.0 or more but less than 1.3
D: 1.3 or more <Flatness Evaluation>

A sample was collected at a point of time when 1 hour had passed from the start of melt casting, and a sample having a size of 100 cm long×40 cm wide was cut out.

A sheet of black paper was pasted up on a flat desk on which the above-described sample film being placed, and three fluorescent lamps arranged in the oblique upward direction were reflected to evaluate the flatness based on the bending degree of the fluorescent lamps. Ranking was made based on the following criteria.

A: Three fluorescent lamps were observed to be straight.
B: Some parts of fluorescent lamps were observed to be slightly bent.
C: Fluorescent lamps were observed to be bent.
D: Fluorescent lamps were observed to be significantly undulated.

<Evaluation of Stretchability>

Ten sheets of film samples cut in a size of 10 cm×10 cm were prepared and subjected to biaxial stretching. First, 20% MD (the casting direction at the time of casting) stretching and then 20% TD (the direction perpendicular to the casting direction at the time of casting) stretching were conducted (final stretching ratio was 44%, that is 1.44 times). A stretching temperature was 120° C. and a stretching rate was 100%/min.

Such a stretching operation was conducted with respect to 10 sheets of film, and the number of sheets which could be stretched without break was evaluated.

A: All the 10 sheets could be stretched.
B: Not less than 8 sheets could be stretched.
C: Not less than S sheets could be stretched.
D: Only less than 5 sheets could be stretched.

The above results will be shown in table 5.

TABLE 5

| Sample No. | Moisture permeability | Bleed-out | YI | Flatness | Stretchability | Remarks |
|---|---|---|---|---|---|---|
| 1-1 | 85 | A | B | A | B | Invention |
| 1-2 | 85 | A | B | A | B | Invention |
| 1-3 | 85 | A | B | A | A | Invention |
| 1-4 | 75 | A | B | A | A | Invention |
| 1-5 | 85 | A | A | A | A | Invention |
| 1-6 | 75 | A | A | A | A | Invention |
| 1-7 | 95 | A | B | A | B | Invention |
| 1-8 | 90 | A | B | A | B | Invention |
| 1-9 | 90 | A | B | A | B | Invention |
| 1-10 | 75 | A | B | A | A | Invention |
| 1-11 | 77 | A | B | A | A | Invention |
| 1-12 | 90 | A | B | A | A | Invention |
| 1-13 | 77 | A | A | A | A | Invention |
| 1-14 | 77 | A | A | A | A | Invention |
| 1-15 | 73 | A | A | A | A | Invention |
| 1-16 | 77 | A | A | A | A | Invention |
| 1-17 | 80 | A | B | A | A | Invention |
| 1-18 | 90 | C | D | C | C | Comparison |
| 1-19 | 120 | C | D | C | C | Comparison |
| 1-20 | 100 | C | C | D | D | Comparison |
| 1-21 | 110 | B | C | C | C | Comparison |
| 1-22 | 110 | C | C | D | D | Comparison |
| 1-23 | 110 | B | D | C | C | Comparison |
| 1-24 | 120 | A | D | C | C | Comparison |

It has been proved from the above results that samples 1-1-1-17 of the present invention are excellent in moisture permeability, bleed-out, YI, flatness and stretchability, to be superior in optical characteristics, compared to comparative samples 1-18-1-24.

Cellulose ester resin 1 utilized in example 1 described above was changed to the following cellulose ester resin CA-2-CA-4, and similar evaluations were made to obtain the results similar to those described in table 5.

CA-2: Cellulose acetate propionate (acetyl substitution degree of 1.4, propionyl substitution degree of 1.3, molecular weight Mw=220,000, Mw/Mn=2.5)

CA-3: Cellulose acetate propionate (acetyl substitution degree of 1.3, propionyl substitution degree of 1.2, molecular weight Mw=180,000, Mw/Mn=3.0)

CA-4: Cellulose acetate propionate (acetyl substitution degree of 1.7, propionyl substitution degree of 1.0, molecular weight Mw=210,000, Mw/Mn=2.9)

Next, samples of the present invention 1-25-1-49 were prepared in a similar manner to sample 1-1 of the present invention, except that a type and an addition amount of an antioxidant and a type and an addition amount of a compound represented by Formula (2) were changed as shown in table 6 and table 7.

Prepared samples 1-25-1-49 of the present invention were evaluated as follows.

(Wrinkles at Start of Winding)

An operation to wind a mother material film on a core was conducted, and the mother material film was taken out from the core and to restart a winding operation when wrinkle was generated at the start of winding. The number of times to restart of winding was counted. This operation was repeated 10 times to obtain a mean value and ranking was made based on the following criteria.

A: Less than once
B: Once or more but less than 3 times
C: 3 times or more but less than 5 times
D: 5 times or more The wound mother material film sample was doubly wrapped with a polyethylene sheet and kept under a condition of 28° C. and 55% RH for 30 days, according to storage methods shown in FIGS. 8(a), 8(b) and 8(c). 8. Thereafter, the sample was taken out from a box and the polyethylene sheet was unwrapped; a lighted fluorescent lamp was reflected on the surface of the mother material film sample to observe distortion or fine disorder, and a horseback defect was ranked based on the following criteria. Herein, in FIGS. 8(a), 8(b) and 8(c), 110 is a core main body; 117 is a support board; 118 is a support, and 120 is a cellulose film mother roll.

A: The fluorescent lamp is observed to be straight.
B: The fluorescent lamp is observed to be partly bent.
C: The fluorescent lamp is observed to be spotty reflecting.

Further, the film mother roll after storage was unrolled to measure how long from the core showed a spot distortion of not smaller than 50 μm or core set in which band form distortion along the width direction was clearly observed, and ranking was made based on the following criteria.

A: Less than 15 m from the core.
B: 15 m or more but less than 30 m from the core.
C: 30 m or more but less than 50 m from the core.
D: Not less than 50 m from the core.

TABLE 6

| Sample No. | Antioxidant | *1 | Antioxidant | *1 | *2 | *1 | Wrinkles at start of winding | Horseback defect | Core set | Remarks |
|---|---|---|---|---|---|---|---|---|---|---|
| 1-1 | Irganox1010 | 0.5 | GSY-P101 | 0.25 | — | — | B | A | C | Invention |
| 1-25 | Irganox1010 | 0.5 | GSY-P101 | 0.25 | 2-3 | 0.3 | A | A | A | Invention |
| 1-26 | Irganox1010 | 0.5 | GSY-P101 | 0.25 | 2-8 | 0.3 | A | A | A | Invention |
| 1-27 | Irganox1010 | 0.5 | GSY-P101 | 0.25 | 2-28 | 0.3 | B | A | A | Invention |
| 1-28 | Irganox1010 | 0.5 | GSY-P101 | 0.25 | 2-35 | 0.3 | A | A | A | Invention |
| 1-29 | Irganox1010 | 0.5 | GSY-P101 | 0.25 | 2-38 | 0.3 | A | A | A | Invention |
| 1-30 | Irganox1010 | 0.5 | GSY-P101 | 0.25 | 2-45 | 0.3 | A | A | A | Invention |
| 1-31 | Irganox1010 | 0.5 | GSY-P101 | 0.25 | 2-46 | 0.3 | A | A | A | Invention |
| 1-32 | Irganox1010 | 0.5 | GSY-P101 | 0.25 | 2-47 | 0.3 | A | A | A | Invention |
| 1-33 | Irganox1010 | 0.5 | GSY-P101 | 0.25 | 2-48 | 0.3 | B | A | B | Invention |
| 1-34 | Irganox1010 | 0.5 | GSY-P101 | 0.25 | 2-49 | 0.3 | B | A | B | Invention |
| 1-35 | Irganox1010 | 0.5 | GSY-P101 | 0.25 | 2-54 | 0.3 | B | A | B | Invention |
| 1-36 | Irganox1010 | 0.5 | GSY-P101 | 0.25 | 2-55 | 0.3 | B | A | B | Invention |
| 1-37 | Irganox1010 | 0.5 | GSY-P101 | 0.25 | 2-56 | 0.3 | B | A | B | Invention |
| 1-38 | Irganox1010 | 0.5 | GSY-P101 | 0.25 | 2-57 | 0.3 | B | A | A | Invention |
| 1-39 | Irganox1010 | 0.5 | GSY-P101 | 0.25 | 2-58 | 0.3 | B | A | A | Invention |
| 1-40 | Irganox1010 | 0.5 | GSY-P101 | 0.25 | 2-60 | 0.3 | B | A | B | Invention |

*1: Addition amount (mass part)
*2: Compound represented by Formula (2)

(Horseback Defect, Core Set)

TABLE 7

| Sample No. | Antioxidant | *1 | Antioxidant | *1 | *2 | *1 | Wrinkles at start of winding | Horseback defect | Core set | Remarks |
|---|---|---|---|---|---|---|---|---|---|---|
| 1-41 | Irganox1010 | 0.5 | GSY-P101 | 0.25 | 2-65 | 0.3 | B | A | B | Invention |
| 1-42 | Irganox1010 | 0.5 | GSY-P101 | 0.25 | 2-66 | 0.3 | B | A | B | Invention |
| 1-43 | Irganox1010 | 0.5 | GSY-P101 | 0.25 | 2-70 | 0.3 | B | A | B | Invention |
| 1-44 | Irganox1010 | 0.5 | GSY-P101 | 0.25 | 2-71 | 0.3 | B | A | B | Invention |
| 1-45 | Irganox1010 | 0.5 | GSY-P101 | 0.25 | B | 0.9 | A | A | B | Invention |
| 1-46 | Irganox1010 | 0.5 | GSY-P101 | 0.25 | C | 0.9 | A | A | B | Invention |
| 1-47 | Irganox1010 | 0.5 | GSY-P101 | 0.25 | D | 0.9 | A | A | B | Invention |
| 1-48 | Irganox1010 | 0.5 | GSY-P101 | 0.25 | F | 0.9 | A | A | B | Invention |
| 1-49 | Irganox1010 | 0.5 | GSY-P101 | 0.25 | M | 0.9 | B | A | B | Invention |

*1: Addition amount (mass part)
*2: Compound represented by Formula (2)

As shown above, in the present invention, it has been proved that film having excellent windup characteristics with respect to such as wrinkles at the start of winding, a horseback defect and a core set, can be prepared in the case of utilizing a compound represented by formula (2) in addition to a hindered phenol antioxidant and a phosphoric acid antioxidant.

[Preparation of Polarizing Plate]

Polyvinyl alcohol film having a thickness of 120 μm was immersed in an aqueous solution containing 1 mass part of iodine, 2 mass parts of potassium iodide and 4 mass parts of boric acid, and stretched at 50° C. by 4 times to prepare a polarizer.

Samples 1-1-1-17 of the present invention and comparative samples 1-18-1-24 were subjected to an alkaline treatment with a 2.5 M sodium hydroxide aqueous solution at 40° C. for 60 seconds, followed by being washed with water and dried, whereby the surface was subjected to an alkaline treatment.

On the both surfaces of the aforesaid polarizer, the alkaline treated surface of samples 1-1-1-17 of the present invention and comparative samples 1-18-1-24 were pasted up employing a 5% aqueous solution of completely saponificated polyvinyl alcohol as an adhesive, whereby polarizing plates 1-1-1-17 of the present invention and comparative polarizing samples 1-18-1-24, which were provided with protective film, were prepared. Polarizing plates 1-1-1-17 of the present invention were optically and physically superior and provided with a good polarization degree, compared to comparative polarizing samples 1-18-1-24.

[Evaluation as Liquid Crystal Display]

A polarizing plate of 15 Type TFT Color Liquid Crystal Display LA-1529HM (manufactured by NEC Corp.) was peeled off, and each polarizing plate prepared above was cut to fit the size of a liquid crystal cell. Two sheets of polarizing plates prepared as above were pasted up to sandwich a liquid crystal cell so that the polarizing axes did not change from the original direction and were perpendicular to each other, to prepare a 15 Type TFT Color Liquid Crystal Display, and characteristics of cellulose ester film as a polarizing plate were evaluated; polarizing plates 1-1-1-17 of the present invention exhibited high contrast and excellent displaying capability compared to comparative polarizing plates 1-18-1-24. That is, polarizing plates of the present invention have been proved to be excellent as a polarizing plate for image display system such as a liquid crystal display.

Example 2

Cellulose ester film samples were prepared in a similar manner to example 1 adopting the types and the addition amounts of additives described in table 8, and were defined as samples 2-1-2-8 of the present invention and comparative samples 2-9-2-11. Moisture permeability, bleed-out, YI, flatness and stretchability were evaluated in a similar manner to example 1.

The results will be shown in table 9. Herein, permeability was shown as a relative value when the value of sample 2-10 was set to 100. The smaller is the value, the lower is permeability, which is preferable.

TABLE 8

| Sample No. | Compound | *1 | Compound | *1 | *2 | *1 | *2 | *1 | *3 | *1 | Blue dye | *1 | Remarks |
|---|---|---|---|---|---|---|---|---|---|---|---|---|---|
| 2-1 | B-99 | 5 | C-2 | 5 | Irganox1010 | 0.5 | GSY-P101 | 0.5 | P-2 | 2 | S-16 | 0.0005 | Invention |
| 2-2 | B-47 | 8 | C-2 | 5 | Irganox1010 | 0.5 | GSY-P101 | 0.5 | P-2 | 2 | S-16 | 0.0005 | Invention |
| 2-3 | B-49 | 8 | C-2 | 5 | Irganox1010 | 0.5 | GSY-P101 | 0.5 | P-2 | 2 | S-16 | 0.0005 | Invention |
| 2-4 | B-62 | 8 | C-2 | 5 | Irganox1010 | 0.5 | GSY-P101 | 0.5 | P-2 | 2 | S-16 | 0.0005 | Invention |
| 2-5 | B-47 | 8 | C-7 | 5 | Irganox1010 | 0.5 | GSY-P101 | 0.5 | P-1 | 2 | S-16 | 0.0005 | Invention |
| 2-6 | B-99 | 5 | C-7 | 5 | Irganox1010 | 0.5 | GSY-P101 | 0.5 | P-2 | 2 | S-15 | 0.0005 | Invention |
| 2-7 | B-103 | 8 | C-7 | 5 | Irganox1010 | 0.5 | GSY-P101 | 0.5 | P-2 | 2 | S-15 | 0.0005 | Invention |
| 2-8 | B-41 | 8 | C-7 | 5 | Irganox1010 | 0.5 | GSY-P101 | 0.5 | P-2 | 2 | S-16 | 0.0005 | Invention |
| 2-9 | B-99 | 10 | — | — | Irganox1010 | 0.5 | GSY-P101 | 0.5 | P-1 | 2 | S-14 | 0.0005 | Comparison |
| 2-10 | TPP | 10 | — | — | Irganox1010 | 0.5 | GSY-P101 | 0.5 | P-2 | 2 | S-16 | 0.0005 | Comparison |
| 2-11 | TPP | 5 | C-2 | 5 | Irganox1010 | 0.5 | GSY-P101 | 0.5 | P-2 | 2 | S-16 | 0.0005 | Comparison |

*1: Addition amount (mass part)
*2: Antioxidant
*3: UV absorbent

TABLE 9

| Sample No. | Moisture permeability | Bleed-out | YI | Flatness | Stretchability | Remarks |
|---|---|---|---|---|---|---|
| 2-1 | 87 | A | B | A | B | Invention |
| 2-2 | 75 | A | B | A | A | Invention |
| 2-3 | 75 | A | A | A | B | Invention |
| 2-4 | 80 | A | A | A | B | Invention |
| 2-5 | 78 | A | B | A | A | Invention |
| 2-6 | 87 | A | B | A | A | Invention |
| 2-7 | 72 | A | A | A | A | Invention |
| 2-8 | 72 | A | A | A | A | Invention |
| 2-9 | 90 | C | C | D | D | Comparison |
| 2-10 | 100 | C | C | D | D | Comparison |
| 2-11 | 110 | B | c | C | C | Comparison |

It has been proved that samples 2-1-2-8 of the present invention are excellent in moisture permeability, bleed-out, YI, flatness and stretchability to be superior in optical characteristics, compared to comparative samples 2-9-2-11. Further, a polarizing plate was prepared in a similar manner to example 1 and evaluation as a liquid crystal display was made.

A liquid crystal display prepared by employing samples of the present invention exhibited high contrast and excellent displaying capability compared to comparative samples. Thereby, samples of the present invention have been proved to be excellent as a polarizing plate for an image display system such as a liquid crystal display.

Possibility in Practical Use

A manufacturing method of cellulose ester film according to the present invention, a polarizing plate utilizing said cellulose ester film, and a liquid crystal display utilizing said polarizing plate, which are characterized by melt casting

What is claimed is:

1. A method of producing a cellulose ester film comprising the steps of:
melting a film forming material comprising the following A to C; and
melt casting the melted film forming material,
A: a cellulose ester resin;
B: an ester compound obtained by condensing a polyalcohol and an organic acid represented by Formula (1); and
C: an aliphatic polyester or an aliphatic-aromatic co-polyester,

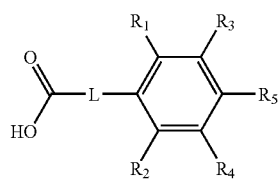

Formula (1)

wherein $R_1$ - $R_5$ each represent a hydrogen atom, an alkyl group, a cycloalkyl group, an aryl group, an aralkyl group, an alkoxy group, a cyclo alkoxy group, an aryloxy group, an aralkyloxy group, an acyl group, a carbonyloxy group, an oxycarbonyl group or an oxycarbonyloxy group, wherein each of these groups may further have a substituent; and L represents a linkage group representing a substituted or unsubstituted alkylene group, an oxygen atom or a bond.

2. The method of claim 1, wherein C comprises both of the aliphatic polyester and the aliphatic-aromatic co-polyester.

3. The method of claim 1, wherein the aliphatic polyester comprises at least one repeating unit selected from the group consisting of Repeating unit (a) and Repeating unit (b):

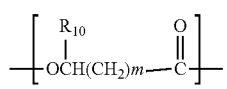

Repeating unit (a)

wherein
m is an integer of 0 to 10, and
$R_{10}$ represents at least one group selected from the group consisting of:
a hydrogen atom;
a non-substituted alkyl group of $C_1$ to $C_{12}$;
an alkyl group of $C_1$ to $C_{12}$ substituted with at least one substituent selected from the group consisting of:
an aryl group of $C_6$ to $C_{10}$, and
an alkoxy group of $C_1$ to $C_4$;
a non-substituted cycloalkyl group of $C_5$ to $C_{10}$; and
a cycloalkyl group of $C_5$ to $C_{10}$ substituted with at least one substituent selected from the group consisting of:
an aryl group of $C_6$ to $C_{10}$, and
an alkoxy group of $C_1$ to $C_4$,

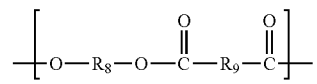

Repeating unit (b)

wherein
$R_8$ represents at least one group selected from the group consisting of:
a non-substituted alkylene group of $C_2$ to $C_{12}$;
an alkylene group of $C_2$ to $C_{12}$, substituted with at least one substituent selected from the group consisting of:
an aryl group of $C_6$ to $C_{10}$, and
an alkoxy group of $C_i$ to $C_4$;
a non-substituted oxyalylene group of $C_2$ to $C_{12}$;
an oxyalylene group substituted with at least one substituent selected from the group consisting of:
an aryl group of $C_6$ to $C_{10}$, and
an alkoxy group of $C_1$ to $C_4$;
a non-substituted cycloalkylene group of $C_5$ to $C_{10}$; and
a cycloalkylene group of $C_5$ to $C_{10}$ substituted with at least one substituent selected from the group consisting of:
an aryl group of $C_6$ to $C_{10}$, and
an alkoxy group of $C_1$ to $C_4$, and
$R_9$ represents at least one group selected from the group consisting of:
a non-substituted alkylene group of $C_2$ to $C_{12}$;
an alkylene group of $C_2$ to $C_{12}$, substituted with at least one substituent selected from the group consisting of:
an aryl group of $C_6$ to $C_{10}$, and
an alkoxy group of $C_1$ to $C_4$;
a non-substituted oxyalylene group of $C_2$ to $C_{12}$;
an oxyalylene group of $C_2$ to $C_{12}$ substituted with at least one substituent selected from the group consisting of:
an aryl group of $C_6$ to $C_{10}$, and
an alkoxy group of $C_1$ to $C_4$;
a non-substituted cycloalkylene group of $C_5$ to $C_{10}$; and
a cycloalkylene group of $C_5$ to $C_{10}$ substituted with at least one substituent selected from the group consisting of:
an aryl group of $C_6$ to $C_{10}$, and
an alkoxy group of $C_1$ to $C_4$.

4. The method of claim 1, wherein the aliphatic polyester is prepared from at least one material capable of forming a polyester selected from the group consisting of:
(i) a hydroxy acid and a derivative of the hydroxy acid capable of forming a polyester;
(ii) a dicarboxylic acid and a derivative thereof; or
(iii) a diol.

5. The method of claim 1, wherein the aliphatic-aromatic co-polyester comprises a repeat unit represented by Repeat unit (c):

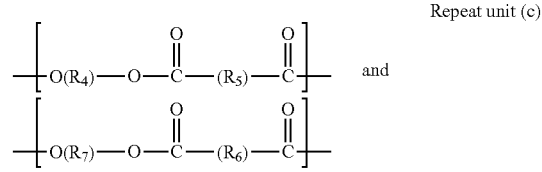

Repeat unit (c)

wherein
R₄ and R₇ each represents at least one group selected from the group consisting of:
a non-substituted alkylene group of $C_2$ to $C_{12}$;
an alkylene group of $C_2$ to $C_{12}$, substituted with at least one substituent selected from the group consisting of:
an aryl group of $C_6$ to $C_{10}$, and
an alkoxy group of $C_1$ to $C_4$;
a non-substituted oxyalylene group of $C_2$ to $C_{12}$;
an oxyalylene group of $C_2$ to $C_{12}$ substituted with at least one substituent selected from the group consisting of:
an aryl group of $C_6$ to $C_{10}$, and
an alkoxy group of $C_1$ to $C_4$;
a non-substituted cycloalkylene group of $C_5$ to $C_{10}$; and
a cycloalkylene group of $C_5$ to $C_{10}$ substituted with at least one substituent selected from the group consisting of:
an aryl group of $C_6$ to $C_{10}$, and
an alkoxy group of $C_1$ to $C_4$,
R₅ represents at least one group selected from the group consisting of:
a non-substituted alkylene group of $C_1$ to $C_{12}$;
an alkylene group of $C_2$ to $C_{121}$ substituted with at least one substituent selected from the group consisting of:
an aryl group of $C_6$ to $C_{10}$, and
an alkoxy group of $C_1$ to $C_4$;
a non-substituted oxyalylene group of $C_2$ to $C_{12}$;
an oxyalylene group of $C_2$ to $C_{12}$ substituted with at least one substituent selected from the group consisting of:
an aryl group of $C_6$ to $C_{10}$, and
an alkoxy group of $C_1$ to $C_4$;
a non-substituted cycloalkylene group of $C_5$ to $C_{10}$; and
a cycloalkylene group of $C_5$ to $C_{10}$ substituted with at least one substituent selected from the group consisting of:
an aryl group of $C_6$ to $C_{10}$, and
an alkoxy group of $C_1$ to $C_4$, and
R₆ represents at least one group selected from the group consisting of:
a non-substituted arylene group of $C_6$ to $C_{10}$ and
an arylene group of $C_6$ to $C_{10}$ substituted with at least one group selected from
an alkyl group of $C_1$ to $C_4$ and
an alkoxyl group of C to $C_4$.

6. The method of claim 1, wherein the aliphatic-aromatic co-polyester is prepared from at least one compound capable of forming a polyester selected from the group consisting of:
(i) a dicarboxylic acid and a derivative thereof; or
(ii) a diol.

7. The method of claim 1, wherein the polyalcohol comprises 2 to 4 hydroxyl groups.

8. The method of claim 1, wherein at least one of R₁ to R₅ of the ester compound comprises an organic acid comprising at least one group selected from:
an alkoxy group, an acyl group, an oxycarbonyl group, a carbonyloxy group and an oxycarbonyloxy group, the ester compound being obtained by condensing a polyalcohol and an organic acid represented by Formula (1).

9. The method of claim 1, wherein the film forming material comprises at least one antioxidant.

10. The method of claim 9, wherein the film forming material comprises at least one hindered phenol antioxidant and at least one phosphorus-containing antioxidant.

11. The method of claim 10, wherein the film forming material further comprises at least one compound represented by Formula (2):

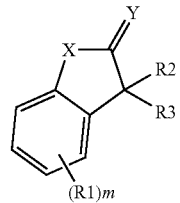

Formula (2)

wherein
X and Y each represent N-R (wherein R represents a hydrogen atom or a substituent), an oxygen atom or a sulfur atom, wherein X and Y may be the same or different;
R₁ represents a substituent;
R₂ and R₃ each represent a hydrogen atom or a substituent, wherein R₂ and R₃ may be combined to form a substituent comprising a double bond;
m represents an integer of 0 to 4, wherein, when m is 2 or more, plural R₁ groups may be the same or different; and
at least one of R₁, R₂ and R₃ may be a group having a polymerizable group as a substructure.

12. The method of claim 11, wherein. X and Y in the compound represented by Formula (2) each are an oxygen atom.

13. The method of claim 1, wherein the film forming material comprises a UV absorbing copolymer prepared by using a UV absorbing monomer.

14. The method of claim 1, wherein the film forming material comprises at least one blue dye.

* * * * *